(12) United States Patent
Ramkumar et al.

(10) Patent No.: US 8,496,909 B2
(45) Date of Patent: Jul. 30, 2013

(54) CALCIUM LOOPING PROCESS FOR HIGH PURITY HYDROGEN PRODUCTION INTEGRATED WITH CAPTURE OF CARBON DIOXIDE, SULFUR AND HALIDES

(75) Inventors: Shwetha Ramkumar, Columbus, OH (US); Liang-Shih Fan, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 73 days.

(21) Appl. No.: 13/123,746

(22) PCT Filed: Oct. 13, 2009

(86) PCT No.: PCT/US2009/060503
§ 371 (c)(1), (2), (4) Date: Apr. 12, 2011

(87) PCT Pub. No.: WO2010/045232
PCT Pub. Date: Apr. 22, 2010

(65) Prior Publication Data
US 2011/0200520 A1 Aug. 18, 2011

Related U.S. Application Data

(60) Provisional application No. 61/104,986, filed on Oct. 13, 2008.

(51) Int. Cl.
*C01B 3/16* (2006.01)
*C01B 3/12* (2006.01)
(52) U.S. Cl.
USPC .......................................... 423/656; 423/655
(58) Field of Classification Search
None
See application file for complete search history.

(56) References Cited

U.S. PATENT DOCUMENTS
4,312,280 A * 1/1982 Shearer et al. ............... 110/347
2009/0263316 A1* 10/2009 Iyer et al. .................... 423/658.3

OTHER PUBLICATIONS

The influence of particle shape on flow modes in pneumatic conveying. J.E. Hilton, P.W. Cleary Chemical Engineering Science vol. 66, p. 231-240.*
KEMI Swedish Chemicals Agency—Information on substances—Calcium Hydroxide 2007.*
The influence of particle shape on flow modes in pneumatic conveying. J.E. Hilton, P.W. Cleary Chemical Engineering Science, vol. 66 (2011), p. 231-240.*
KEMI Swedish Chemicals Agency—Information on Substances—Calcium Hydroxide—2007.*

* cited by examiner

Primary Examiner — Melvin C Mayes
Assistant Examiner — Douglas Call
(74) Attorney, Agent, or Firm — Standley Law Group LLP

(57) ABSTRACT

A process for producing hydrogen comprising the steps of: (i) gasifying a fuel into a raw synthesis gas comprising CO, hydrogen, steam, sulfur and halide contaminants in the form of $H_2S$, COS, and HX, wherein X is a halide; (ii) passing the raw synthesis gas through a water gas shift reactor (WGSR) into which CaO and steam are injected, the CaO reacting with the shifted gas to remove $CO_2$, sulfur and halides in a solid-phase calcium-containing product comprising $CaCO_3$, CaS and $CaX_2$; (iii) separating the solid-phase calcium-containing product from an enriched gaseous hydrogen product; and (iv) regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof.

38 Claims, 51 Drawing Sheets

CALCIUM LOOPING PROCESS FOR HIGH PURITY HYDROGEN PRODUCTION INTEGRATED WITH CAPTURE OF CARBON DIOXIDE, SULFUR AND HALIDES

CROSS-REFERENCE TO RELATED APPLICATIONS

This application is a non-provisional patent application that claims the benefit of priority under 35 U.S.C. 119 to U.S. Provisional Patent Application No. 61/104,986, filed Oct. 13, 2008, which is incorporated by reference as if fully recited herein.

STATEMENT REGARDING FEDERALLY-SPONSORED RESEARCH OR DEVELOPMENT

The present invention was made with United States Government support under Grant No. DE-FC26-03NT41853 by the Department of Energy. The United States Government may have certain rights to this invention under 35 U.S.C. §200 et seq.

TECHNICAL FIELD

The disclosed embodiments of the present invention relate to processes involving the production of high purity hydrogen gas, into which the capture of carbon dioxide, sulfur and halides are integrated.

BACKGROUND OF THE ART AND SUMMARY OF EXEMPLARY EMBODIMENTS OF THE INVENTION

The production of gaseous hydrogen, and particularly, gaseous hydrogen of high purity, is known in the prior art. A variety of feedstocks are known to be useful for these processes, including petroleum, coal, biomass, oil sands, coke, tar, wax oil shales, or combinations of these materials. Depending upon the feedstock selected, the amount of sulfur and halogens present in the feedstock can vary extensively, and many considerations, including catalyst poisoning and the cost of environmental control equipment can be effected by these specific contaminants.

Also, the process used will affect the amount of carbon dioxide produced. As carbon dioxide is associated with global warming, emissions of carbon dioxide must be controlled.

It is therefore an unmet advantage of the prior art to provide a process of this type wherein the carbon dioxide, sulfur and halides are captured as a part of the hydrogen production process.

The rising energy demand coupled with the depleting global oil reserves and the environmental degradation due to emissions has led to extensive research in the field of clean energy production. The total energy use, globally, has been predicted to increase from 421 quadrillion BTU in 2003 to 722 quadrillion BTU in 2030.[1] In the United States, the annual energy consumption is projected to increase by 71% from 2003 to 2030, which is much higher than the predicted increase in the domestic energy production. Currently, the United States is dependent on foreign oil for 56% of its energy needs. This translates to the fact that although the production capacity of petroleum products and natural gas will increase, the US will be dependent on foreign oil for 70% of its energy needs by 2025.[1] On the other front, the energy related $CO_2$ emission has increased at an annual average percentage of 1.3% in the past decade and is projected by the EIA to increase at the same rate till 2030. To add to this, oil prices are expected to soar up by 50% at the end of 2030.[1] Hence, the implementation of energy generation technologies as well as production of "Green" fuels which will reduce the dependence on oil, limit the emissions of $CO_2$, sulfur and other pollutants and be economically feasible are the need of the hour.

This need has led to a global push towards the development of efficient, economical, and reliable carbon capture and sequestration technologies (CCS) for application to fossil fuel based power plants. Coal is present in abundance, about 494 billion tons of reserves in the United States, within which the state of Ohio has 5% or 24 billion tons of reserves. While it gives rise to harmful emissions it can be used to provide a major portion of our energy needs if CCS is implemented in a carbon constrained scenario. The implementation of $CO_2$ capture could be through post combustion capture, oxy-combustion and pre-combustion. These technologies could be applied to either coal, natural gas or biomass based systems. FIG. 1 illustrates these concepts through simplified flow diagrams.

Post combustion capture technology involves the combustion of coal or natural gas to produce hot flue gas which is used to generate steam. The $CO_2$ from the flue gas is then captured using solvents or sorbents. Although coal combustion for power generation is economically viable in a non-carbon constrained scenario, this will not be true when a $CO_2$ regulation is applied. This is because the combustion of coal or natural gas results in the production of large volumes of flue gas in which the $CO_2$ concentration is very low (13-14% for coal combustion and 3-4% for natural gas combustion) and hence the capture of $CO_2$ becomes inefficient and expensive. Addition of $CO_2$ capture results in plant efficiency losses of 8-12% resulting in a net efficiency of 35% for a Super Critical Pulverized Coal Combustion (SC-PCC) plant on an LHV basis.[2] In oxy-combustion, the fuel is burnt in oxygen and recycled flue gas, to produce a concentrated stream containing $CO_2$ and $H_2O$ which is then dried, compressed and transported for sequestration. Although oxy-combustion obviates the need for a separate $CO_2$ capture stage, it requires an Air Separation Unit (ASU) which is energy intensive and expensive. Oxy-combustion also yields in an overall LHV efficiency of 35% for an SC-PCC plant similar to the post combustion capture case.[2] Pre combustion capture involves the gasification of coal or the reforming of natural gas to produce syngas. The syngas is then cleaned and sent to shift reactors (WGSR) to convert the carbon monoxide to $H_2$ and $CO_2$ in the presence of steam. The $CO_2$ is then captured from the shifted syngas and the $H_2$ is either combusted to produce electricity or purified in a Pressure Swing Absorber (PSA) and used for the production of chemicals and liquid fuels. The overall efficiency of an IGCC plant with $CO_2$ capture is 38-40% which is higher than that for post combustion and oxy-combustion systems.[2]

Pre-combustion capture technologies are a potential solution to efficient and economical CCS implementation as gasification results in the production of a lower level of criteria pollutants when compared to combustion and the application of CCS to gasification systems is more efficient and economical when compared to CCS for post combustion systems. It has been estimated that with the implementation of CCS using solvent based systems, the increase in the COE for an IGCC is 25 to 40% while that for PC boilers is 60 to 85%. In a carbon constrained scenario, it has been estimated that the cost of a super critical PC boiler will be $2140/KWe while that of an IGCC will be $1890/KWe. In addition to being more economical and efficient, gasification is also very versatile and capable of producing $H_2$ and liquid fuels in addition to electricity.[3]

Applying $CO_2$ capture to coal gasification requires the addition of shift reactors, a $CO_2$ separation process and $CO_2$ compression and drying. In a typical gasification system, coal is partially oxidized in the presence of steam and oxygen to produce syngas which is then converted to $H_2$, electricity or liquid fuels.

$$\text{Coal Gasification: } CxHy+H_2O=xCO+(\tfrac{1}{2}+1)H_2 \qquad (1)$$

For the implementation of CCS, the CO in syngas needs to be converted to $H_2$ and $CO_2$ via the WGS reaction so that a large fraction of the carbon content can be captured.

$$\text{WGS reaction: } CO+H_2O=CO_2+H_2 \qquad (2)$$

In the conventional scenario, a series of shift reactors with catalysts and excess steam addition is used due to the thermodynamic limitation of the WGS reaction. Depending on the sulfur tolerance of the catalyst, the WGSR can be conducted as a raw syngas (sour) shift or the clean syngas (sweet) shift. Commercially the clean WGSR is carried out in two stages: the high and low temperature shift reactors using iron oxide and copper catalysts respectively. The high temperature shift is conducted to convert the bulk of the carbon monoxide to $H_2$ due to the fast kinetics. The lower temperature shift reaction is carried out as the equilibrium conversion is higher at lower temperatures but the gas stream has to be cooled down to 210 C-240 C which makes the process, energy inefficient.[4] Further, the commercial iron oxide catalyst has a sulfur tolerance of only about 100 ppm and the copper catalyst has a lower tolerance to sulfur (<0.1 ppm) and chloride impurities. Hence syngas clean up is required upstream of the shift reactors to remove sulfur, chloride and other impurities and downstream of the shift operation to remove $CO_2$. Cleanup is achieved using conventional scrubbing technology which is energy intensive due to the cooling and heating requirements. The sour gas shift uses a sulfided catalyst which is resistant to high sulfur concentrations in the syngas stream and operates at a temperature of 250-500 C. By using the raw gas shift, sulfur removal and $CO_2$ removal can be conducted down stream of the shift reactor in an integrated mode. However the extent of CO conversion is lower in the raw gas shift than in the clean gas shift. Addition of the $CO_2$ capture step results in a 25-40% increase in the cost of electricity (COE), 7.2% decrease in the efficiency, 2.1% due to $CO_2$ compression and 0.9% due to $CO_2$ capture.[3]

Conventional pre-combustion capture in a natural gas based plant involves methane reforming which is conducted at temperatures greater than 900 C and is highly energy intensive.[5]

$$\text{Steam Methane Reforming (SMR): } CH_4+H_2O=CO+3H_2 \qquad (3)$$

The syngas obtained is then shifted similar to the operation in the IGCC system and $CO_2$ capture is achieved at low temperatures using physical (eg. selexol, rectisol, chilled ammonia) or chemical (eg. amine solutions) solvents resulting in a large increase in the parasitic energy requirement and related cost of energy. Hence there is a need to improve the energy efficiency and economics by implementing process intensification to reduce the foot print and improve the heat integration within the system.

The Calcium Looping Process (CLP) developed at the Ohio State University[6], as illustrated in FIGS. 2 and 3, improves the efficiency of the coal/natural gas to $H_2$ process by integrating various unit operations into a single stage. The CLP not only aids in curbing $CO_2$ emissions but also improves the efficiency and reduces the $CO_2$ foot print. It utilizes a high temperature regenerable CaO sorbent which in addition to capturing the $CO_2$, enhances the yield of $H_2$ and simultaneously captures sulfur and halide impurities. It also enhances the yield of liquid fuels by reforming the lighter hydrocarbons and unconverted syngas into hydrogen which is used to increase the H2:CO ratio in the syngas to 2 and for hydrotreating the liquid fuel.

FIG. 2 depicts the integration of the CLP in a coal gasification system. Syngas obtained from coal gasification is sent through a particulate capture device to the integrated $H_2$ production reactor. When CaO is injected into the syngas it reacts with the $CO_2$, $H_2S$, COS and HCl to form a mixture containing predominantly $CaCO_3$ and small amounts of calcium sulfide and calcium chloride. The insitu removal of $CO_2$ removes the equilibrium limitation of the WGS reaction thereby obviating the need for a catalyst and excess steam addition. The $CaCO_3$ is subsequently calcined to yield a pure $CO_2$ stream for sequestration and the CaO is recycled back. In this process, naturally occurring limestone which is cheap and abundantly available is used and its capture capacity is maintained at 12.5 moles $CO_2$/Kg of CaO over multiple cycles which is significantly larger than other solvents and sorbents. Thus the CLP integrates several unit operations, such as the WGSR, $CO_2$ capture system, sulfur removal and halide removal in one process module. FIG. 3 shows the integration of the CLP in a natural gas reforming process in which the unit operations namely, reforming, WGS, $CO_2$ capture and sulfur removal are integrated in a single reactor system. Within the $H_2$ production reactor, the natural gas is reformed with steam in the presence of the reforming catalyst and CaO sorbent. The removal of $CO_2$ removes the thermodynamic limitation of the WGSR and the reforming reaction and results in a high conversion of the methane to $H_2$. The $H_2$ production reactor is heat neutral due to the exothermic energy from the WGS and carbonation reactions being equal to the endothermic reforming reaction heat duty. Hence the temperature of operation for the reforming reaction can be reduced from over 900 C to 650 C. The spent sorbent containing $CaCO_3$, CaO and CaS is separated from the $H_2$ and regenerated in a calciner to produce a sequestration ready $CO_2$ stream. The CaO sorbent is then recycled back to the integrated $H_2$ production reactor.

The overall objectives of the CLP are to improve process efficiency and economics by process intensification, produce $H_2$ for electricity generation, chemicals and liquid fuels synthesis with integrated carbon and contaminants capture at high temperatures, produce a sequestration ready $CO_2$ stream, reduce excess steam requirement and obviate the need for a WGS catalyst. Experimental investigation in a bench scale facility reveals that high purity $H_2$ of 99.7% purity with less that 1 ppm sulfur impurity can be produced. Process evaluation using ASPEN Plus® software suggests that the overall efficiency of the coal to $H_2$ process integrated with the CLP is 64% (HHV) which is significantly higher than 57% (HHV) achieved by the state-of-the-art $H_2$ from coal process.

This and other unmet advantages are provided by the device and method described and shown in more detail below.

DETAILED DESCRIPTION OF EXEMPLARY EMBODIMENTS OF THE INVENTION

Figure 1:
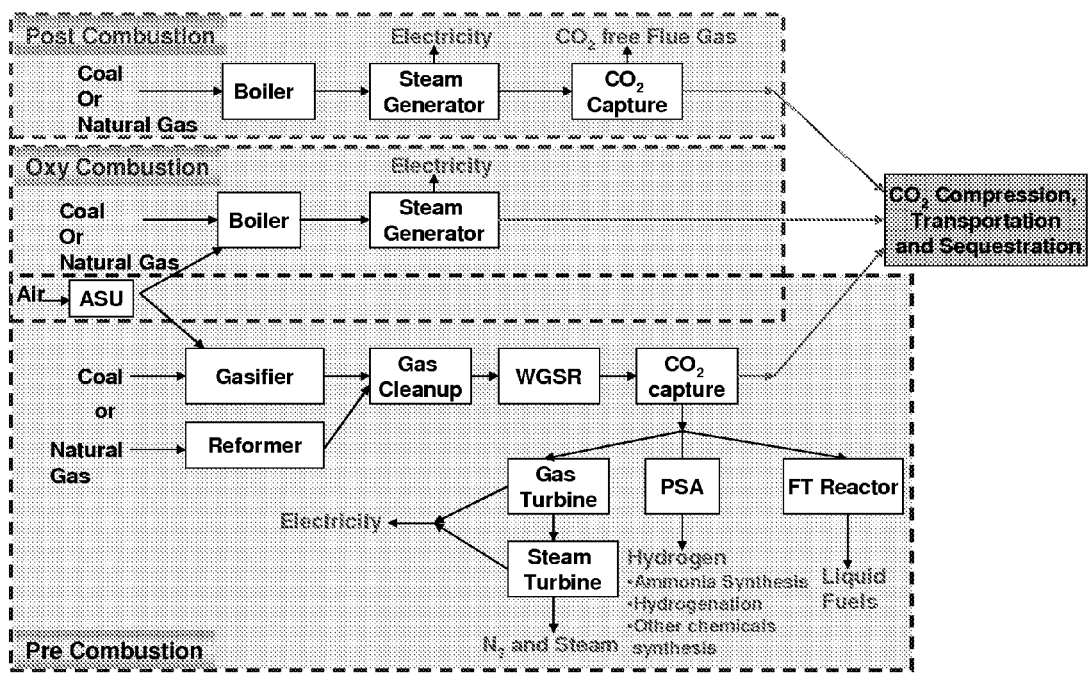
FIG. 1 illustrates one embodiment of the implementation of carbon capture and sequestration (CCS) in fossil fuel based power plants.
Figure 2:
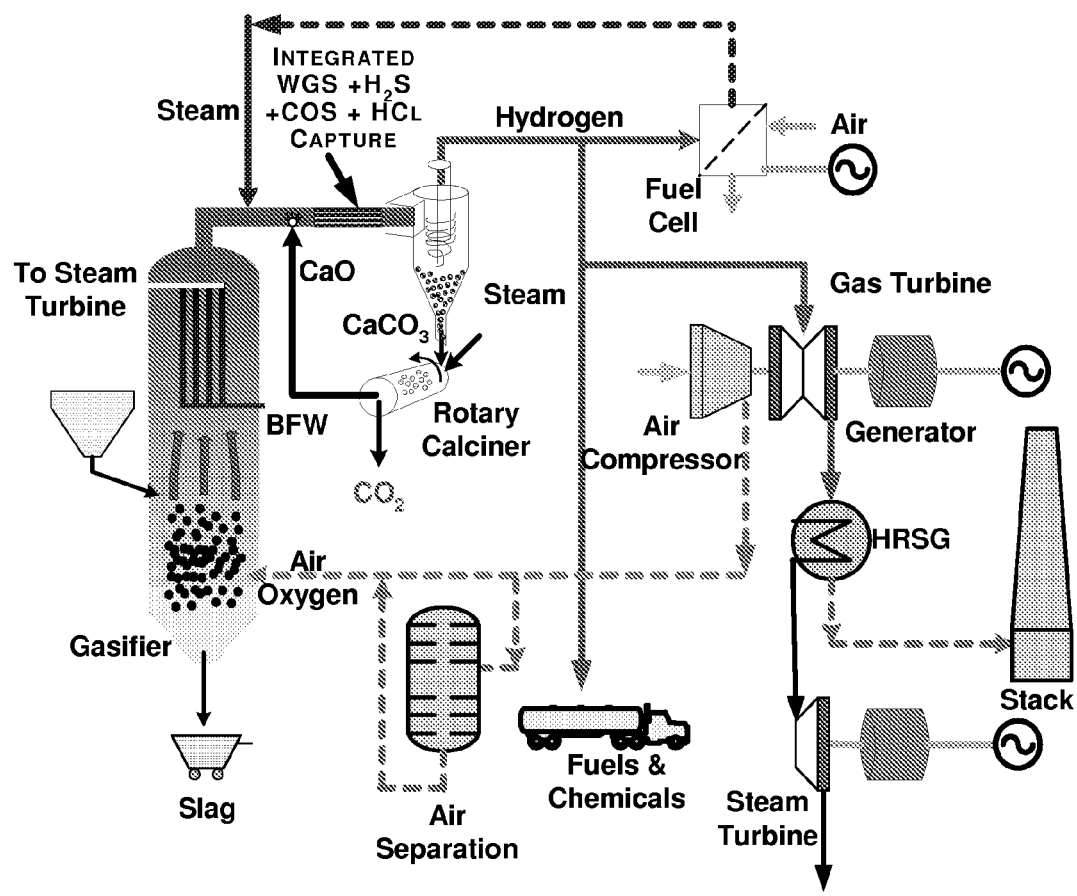
FIG. 2 illustrates one embodiment of the integration of the calcium looping process (CLP) in a coal gasification system.
Figure 3:
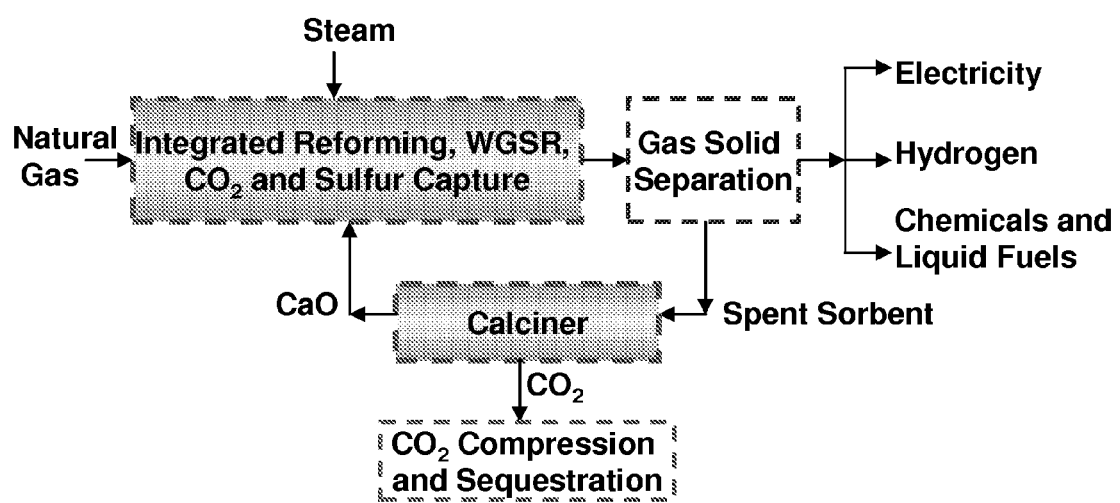
FIG. 3 illustrates one embodiment of the integration of CLP in a natural gas reforming system.

Production of $H_2$ and Electricity from Coal

Existing and Emerging Technologies

As detailed in the previous section, the traditional coal gasification system with solvent aided $CO_2$ capture is very energy intensive and a large fraction of the inefficiencies are due to the equilibrium limited WGSR, the $CO_2$ removal and contaminant capture processes. A slight advancement in the commercial method of $H_2$ production has been to remove the $CO_2$ from the reaction mixture between the two stages of the shift reaction to enhance the WGSR. However solvents operate at ambient temperatures and this method involves severe energy penalties due to cooling and reheating of the reaction gas mixture. In order to shift the equilibrium of the WGSR and enhance $H_2$ generation, an effective technique has been to remove $H_2$ from the reaction mixture which has lead to the development of $H_2$ separation membranes. Kreutz et al have described the integration of these membranes in a commercial coal gasification unit. Here the syngas produced from the gasifier is shifted at a high temperature over a sulfur tolerant catalyst followed by a WGS-$H_2$ membrane reactor which aids in producing more $H_2$ and separating it from the gas mixture. [7] However, ceramic membranes have a very low $H_2$ permeability and intermediate temperature composites in spite of having a high $H_2$ flux are difficult to fabricate and are very susceptible to poisoning. The cermet membranes are superior to the other two classes of membranes but again they are susceptible to poisoning and are expensive.[8] In addition, a large sweep stream consisting of steam is required to improve the flux of $H_2$. Donghao Ma and Carl R. F. Lund[9] have reported the investigation of a Pd membrane reactor system packed with high temperature WGS catalyst. For optimum performance, these reactors require 2 stages and a high S:C ratio of 3. These reactors also suffer from inhibition effects of $CO_2$ which reduces the yield of $H_2$ from 90% to 50%.[9]

Advancements in the high temperature sorbent-enhanced $H_2$ production technology will aid in simplifying the $H_2$ production process, due to its capability to operate at high temperatures. There has been extensive research on the development of high temperature sorbents for $CO_2$ removal[10-13] and some of the processes developed on this concept are the ZECA, HyPr-RING, Alstom and GE as explained below.[14-17]

1) In the ZECA process $H_2$ is used to gasify coal to produce a methane rich stream, which is then reformed using steam in the presence of a calcium based sorbent to produce $H_2$. The sorbent removes the $CO_2$ produced during the reforming reaction thereby shifting the equilibrium in the forward direction and since carbonation is exothermic it also provides energy for the reforming reaction.[14] Although this process precludes the need for an Air Separation Unit (ASU) it uses half the $H_2$ produced and hence results in more coal consumption when compared to coal gasification.

2) In the HyPr-RING process coal is gasified with steam in the presence of $CaO/Ca(OH)_2$ sorbent. These systems operate at very high pressures (70 bar) and require excess steam[18] At high temperatures and long holding times there is considerable solid-solid interaction between the $CaO/Ca(OH)_2$ and the coal included minerals which reduces the $CO_2$ capturing ability of the sorbent.[19] Steam also increased the interaction of the sorbent with the coal minerals at high temperatures and pressures.[20]

3) The Alstom and GE systems are primarily for new plants and do not have the capability to be retrofitted in existing IGCC system. Both processes have two unproven concepts a) coal gasification loop b) $CO_2$ capture loop which makes their commercial viability more difficult. In the Alstom chemical looping process calcium based sorbents are used to carry oxygen and heat in three loops.[16] The GE process involves two loops, an oxygen transfer loop and a carbon transfer loop and three reactors.[17]

An emerging technology for the production of decarbonized fuel by integrating the WGSR and $CO_2$ removal is the sorption enhanced reaction process developed by Air Products and Lehigh University which utilizes hydrotalcite sorbents for $CO_2$ removal.[21] But these sorbents have a very low $CO_2$ sorption capacity of 0.33 moles/Kg of the sorbent which is 38 times lower than the $CO_2$ capture capacity of CaO. Hence these systems require large reactors or if operated in a PSA mode, short cycle times adding to the parasitic energy of the process due to the pressurization and depressurization involved. These systems will also suffer from huge pressure drop losses in the PSA mode of operation. In addition, the effect of syngas constituents and sulfur impurities has not yet been investigated on the performance of the sorbent and an upstream sulfur removal system is required. These systems require a large amount of steam for the regeneration of the sorbent thereby increasing the parasitic energy of the process. The kinetics of $CO_2$ removal by these sorbents is not fast enough to enhance the WGS reaction and hence requires a WGS catalyst which adds to the operating costs.

Figure 4:
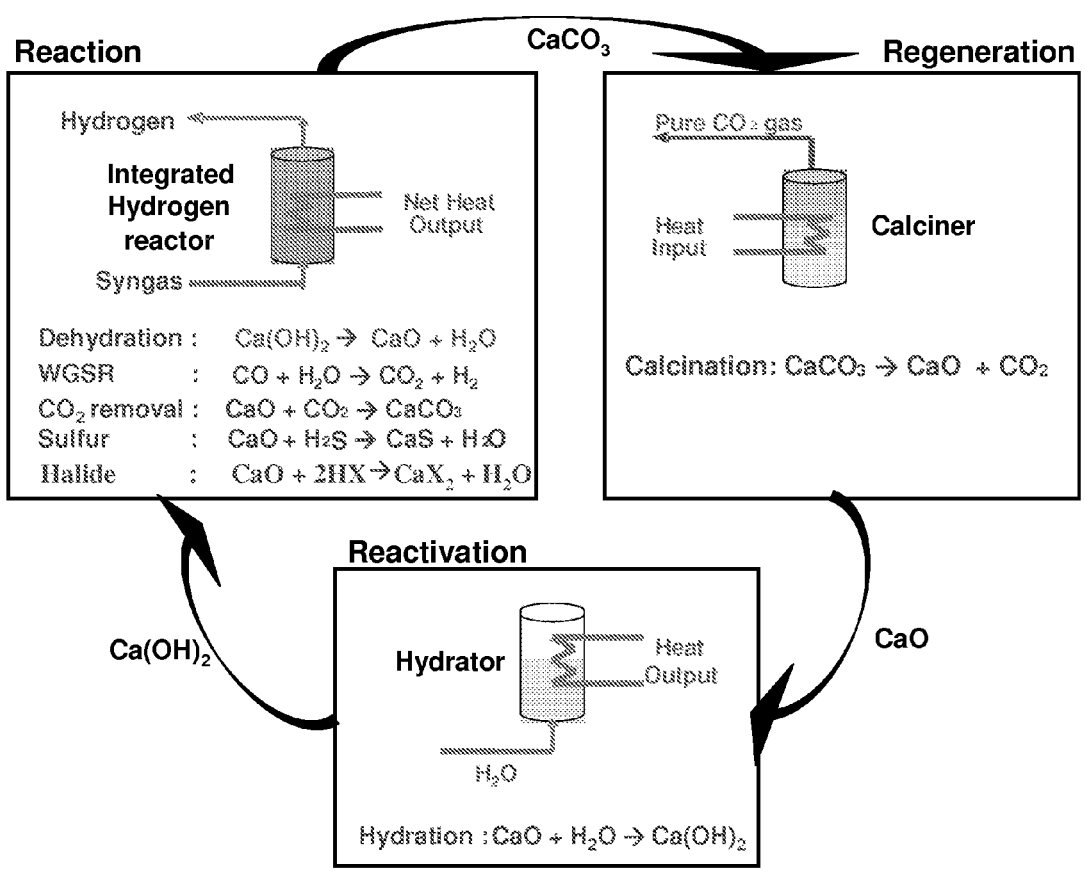
FIG. 4 is a schematic of one embodiment of the calcium looping process.

Calcium Looping Concept and Thermodynamic Analysis:

In contrast, the CLP is a very innovative technology and the only one that addresses the enhancement in the WGSR, $CO_2$ removal, sulfur and chloride removal in a single reactor system. It obviates the need for excess steam requirement there by tremendously reducing the parasitic energy consumption of the process and produces a sequestration ready $CO_2$ stream. The calcium sorbent possesses a very high $CO_2$ capture capacity and kinetics fast enough for operation in the absence of a catalyst. Since the $CO_2$ capture is achieved at high temperatures there is no cooling or reheating required for the gas stream. The CLP can be easily retrofitted in an existing coal gasification plant or developed for new plants. As shown in FIG. 4, the CLP comprises of three reactors; the carbonation reactor where high-purity $H_2$ is produced while contaminant removal is achieved, the calciner where the calcium sorbent is regenerated and a sequestration-ready $CO_2$ stream is produced and the hydrator where the sorbent is reactivated. Thermodynamic analyses were conducted for the reactions occurring in each reactor using the HSC Chemistry v 5.0 (Outokumpu Research Oy, Finland) software. All reactions shown in FIG. 4 were found to be thermodynamically spontaneous but reversible and the extent of each of these reactions depends on the partial pressure of the respective gas species and the reaction temperature.

$H_2$ Reactor

Figures 5A, 5B:
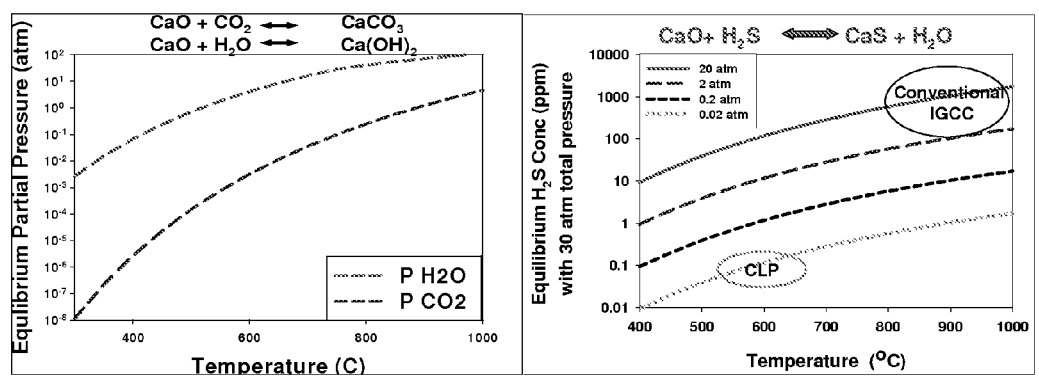
FIG. 5a presents thermodynamic curves for carbonation.
FIG. 5b presents thermodynamic curves for hydration sulfidation with $H_2S$.
Figures 6A, 6B:
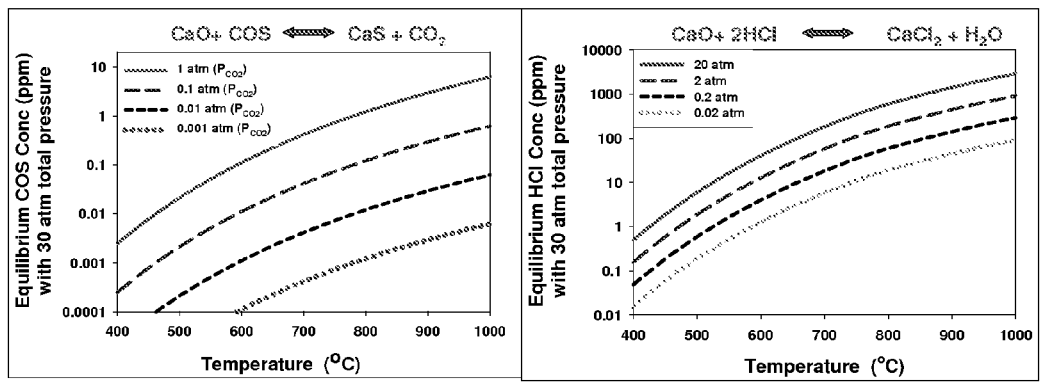
FIG. 6a presents thermodynamic curves for sulfidation with COS.
FIG. 6b present thermodynamic curves for chloridation with HCl.

The $H_2$ reactor comprises of either a fluidized bed or an entrained flow reactor operated at 550-600 C and the exothermic heat released from it can be used to generate electricity or steam in order to meet the parasitic energy requirement of the overall process. In the $H_2$ reactor, the thermodynamic constraint of the WGS reaction is overcome by the concurrent removal of the $CO_2$ product from the reaction mixture which enhances $H_2$ production. In addition, the CaO sorbent is also capable of reducing the concentration of sulphur and halides in the outlet stream to ppb levels. The in-situ removal of $CO_2$ removes the equilibrium limitation of the WGS reaction thereby obviating the need for a catalyst and excess steam addition. Thermodynamics predicts that in the temperature range of 550-600 C greater than 99% of the $CO_2$ is removed from the gas mixture as shown in FIG. 5a. The reversible sulfidation and chloridation reactions shown in FIGS. 5b and 6b are inhibited by the presence of steam. Hence in the traditional coal gasification system with $CO_2$ capture, CaO cannot be utilized for $H_2S$ and HCl capture as the steam in the quenched syngas thermodynamically limits removal to about 1000 to 100 ppm in the outlet stream. However in the CLP, $H_2S$ and HCl removal is achieved during the WGSR in the absence of excess steam addition and hence the impurities are removed to as low as <1 ppm. The removal of COS is also enhanced in the WGS and carbonation reactor as the product $CO_2$ formed in the reaction of COS with CaO is removed insitu and the partial pressure of $CO_2$ in the reactor is very low as shown in FIG. 6a. The reactions occurring in the carbonation reactor are as follows:

WGSR: $CO+H_2O \rightarrow H_2+CO_2$ (2)

Carbonation: $CaO+CO_2 \rightarrow CaCO_3$ (4)

Sulfur capture($H_2S$): $CaO+H_2S \rightarrow CaS+H_2O$ (5)

Sulfur capture(COS): $CaO+COS \rightarrow CaS+CO_2$ (6)

Halide capture(HCl): $CaO+2HCl \rightarrow CaCl_2+H_2O$ (7)

Calcination Reactor

The spent sorbent, consisting mainly of $CaCO_3$, is regenerated back to CaO in the calciner. The calciner is operated at atmospheric pressure in a rotary or a fluidized bed system. The heat can be supplied directly or indirectly using a mixture of fuel and oxidant. From thermodynamics, calcination is found to occur at temperatures above 900 C in the presence of 1 atm $CO_2$ as shown in FIG. 5a. Dilution of $CO_2$ in the calciner by using steam or combustion of syngas in a direct fired calciner will permit the calcination reaction to be conducted at temperatures lower than 900 C. The regenerated sorbent produced from the calciner is then conveyed back into the high-pressure carbonation reactor through a lock hopper system. The reaction occurring in the calciner is:

Calcination: $CaCO_3 \rightarrow CaO+CO_2$ (8)

Hydrator

The calcination process causes sintering of the sorbent which results in a reduction in its reactivity. The hydration process reverses this effect by increasing the pore volume and surface area available for reaction with the gas mixture. FIG. 5a shows the partial pressure of steam required for hydration of the sorbent at various temperatures. At high temperatures of 500 to 600 C hydration occurs at a steam partial pressure greater than 4 atms.

Hydration: $CaO+H_2O=Ca(OH)_2$ (9)

A stoichiometric S:C ratio is used for the hydration of CaO and the calcium hydroxide calcines in the $H_2$ reactor to produce high reactivity CaO and steam. The steam obtained from the dehydration reaction is used for the WGSR. Since a calcium to carbon ratio of about 1.5 is used in the $H_2$ reactor the S:C ratio is also 1.5 which is much lower than that used for a tradition WGSR. Hence no excess steam is used for the process as the steam required for the WGSR is supplied to the hydrator.

Figure 7:
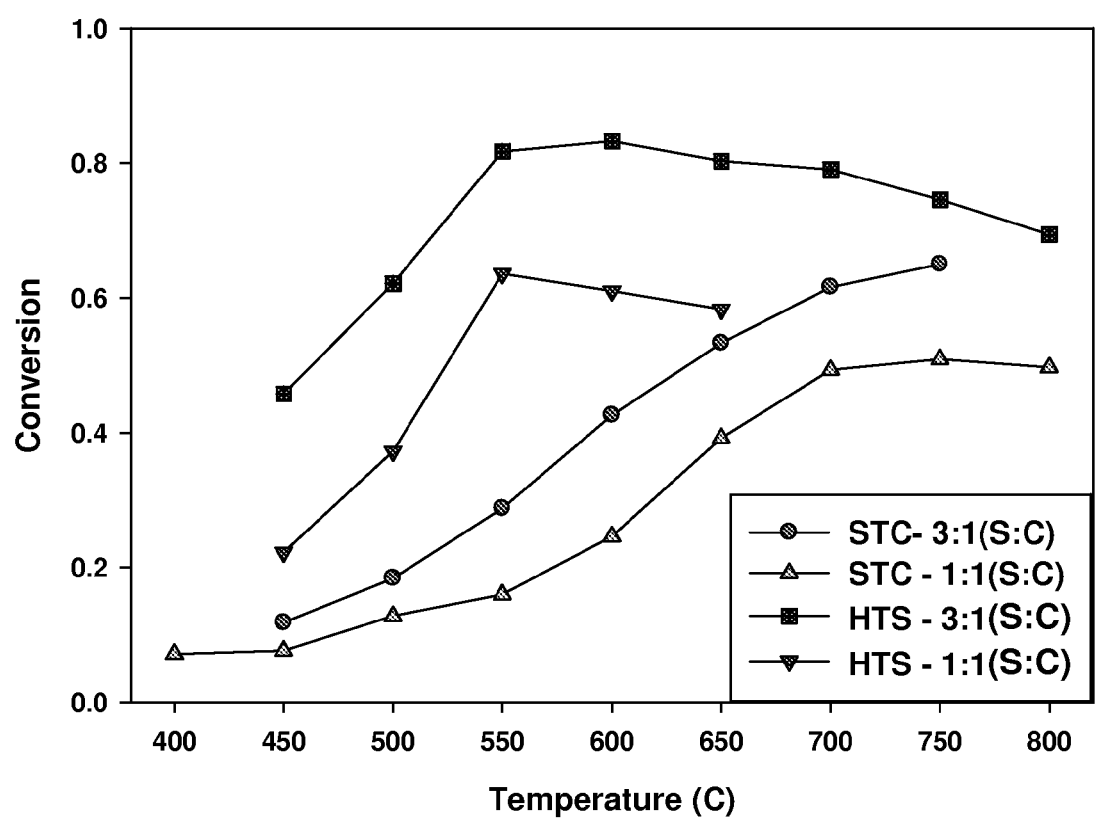
FIG. 7 presents the effect of steam to carbon ration (S:C) and temperature on CO conversion during the water gas shift reaction in the presence of sulfur tolerant catalyst (STC) and high temperature shift (HTS) catalyst.

Investigation of $H_2$ Production From Syngas:

Kinetics of the Water Gas Shift Catalysis:

The water gas shift reaction was conducted in the presence of the High Temperature Shift Catalyst (HTS) and the Sulfur Tolerant Catalyst (STC) at a range of temperatures(400-800 C), pressures (0-300 psig) and steam to carbon ratios(S:C) (1:1-3:1). As illustrated in FIG. 7, it was found that there is an increase in the CO conversion with an increase in the steam to carbon ratio for both the sulfur tolerant catalyst as well as the high temperature shift catalyst. It was also found that at temperatures below 650 C the CO conversion in the presence of the HTS catalyst is higher that the CO conversion obtained in the presence of the STC. 550 C-650 C is found to be the optimum temperature of operation in the presence of the HTS catalyst and 700-800 C is found to the optimum temperature of operation for the STC.

Figure 8:
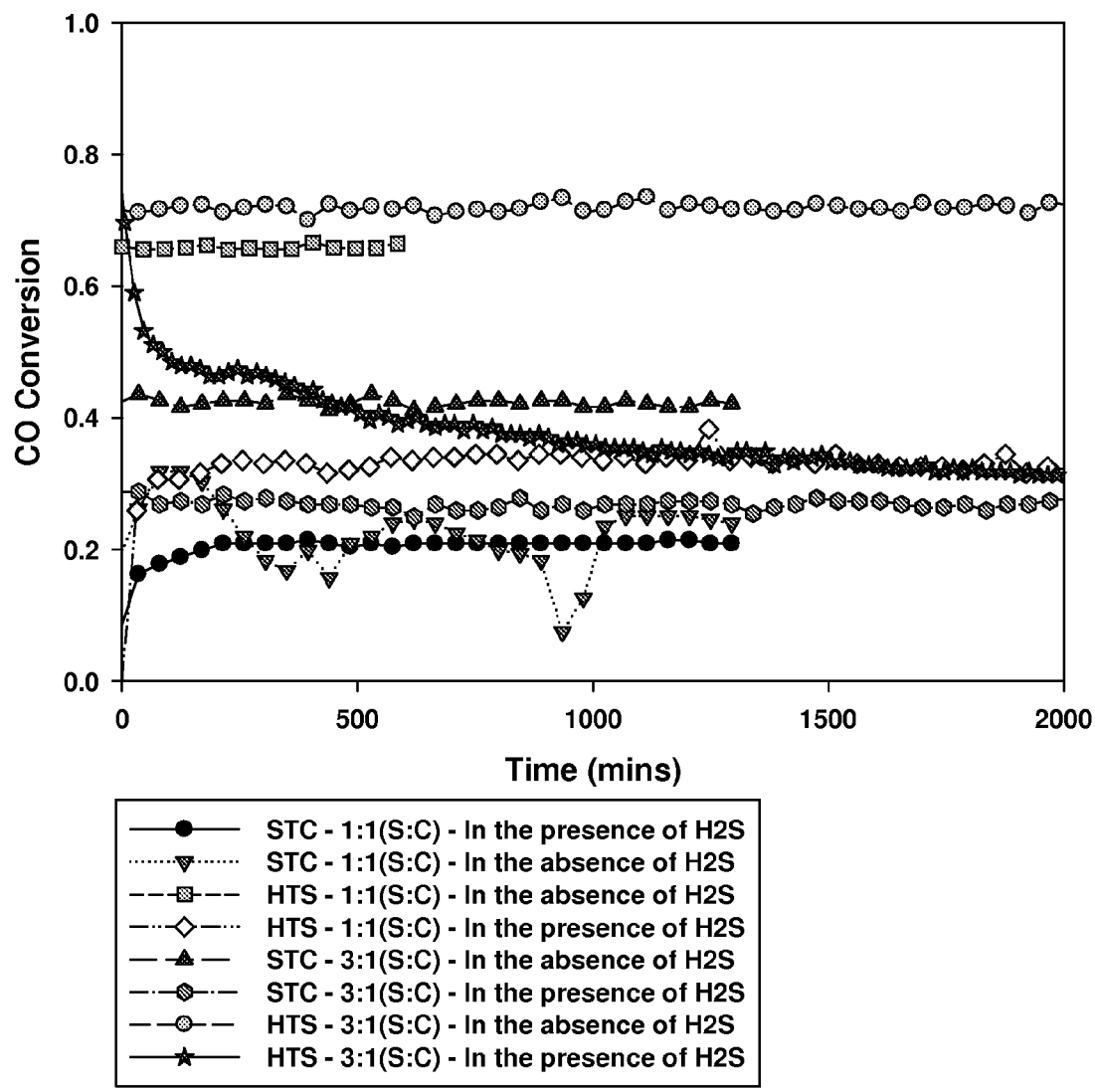
FIG. 8 presents the effect of steam to carbon ratio (S:C) and type of catalyst on CO conversion during the water gas shift reaction in the presence or absence of $H_2S$.

FIG. 8 depicts the comparison in CO conversion achieved at atmospheric pressure in the presence and absence of H2S in the inlet gas steam. Although most of the experiments were conducted for 20 hours only the first portion of the data is shown as the CO conversion remains stable beyond the point shown in the FIG. 8. It was found that at 650 C the CO conversion decreases in the presence of H2S for both the HTS catalyst and the STC catalyst although the decrease in the conversion obtained in the presence of the STC catalyst is very low when compared to that in the HTS catalyst. It was found that even in the presence of H2S the HTS catalyst shows higher CO conversion at a temperature of 650 C.

Figure 9:
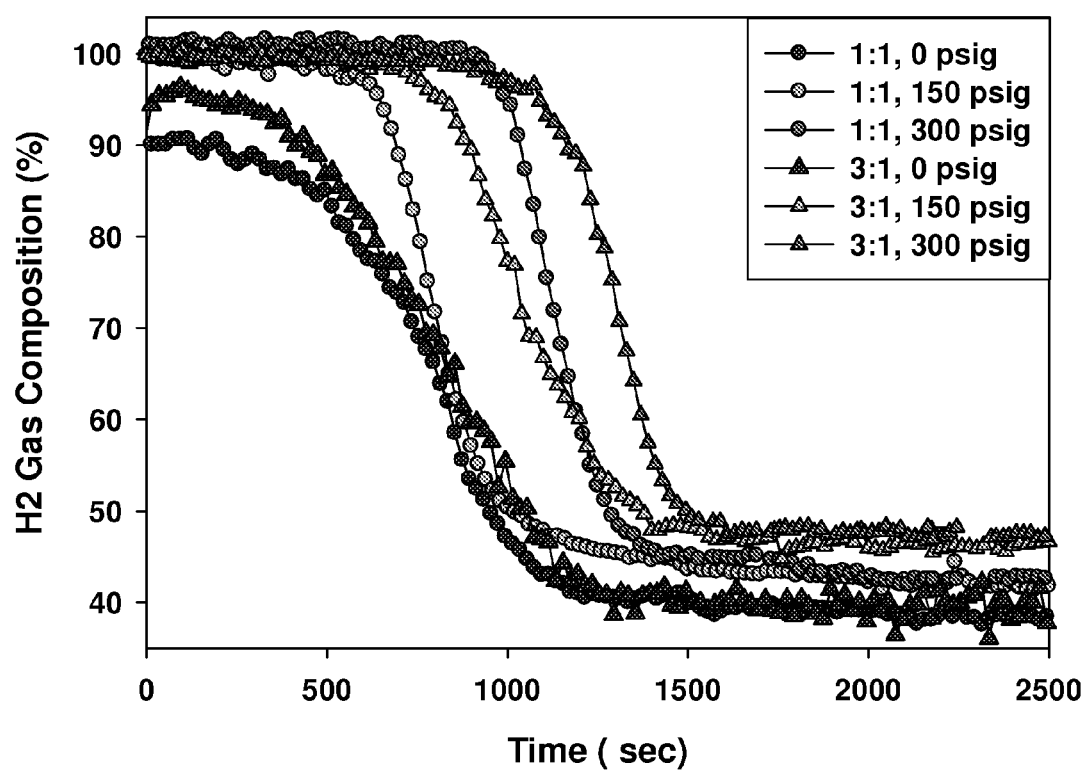
FIG. 9 presents the effect of steam to carbon ration and pressure on the purity of hydrogen obtained in the presence of the HTS catalyst and calcium oxide sorbent (T=600 C, Total flow=0.725 slpm, 0.25 g HTS, 0.25 g CaO).

Enhanced Hydrogen Production:

Integrated Water Gas Shift, Carbonation and Sulfidation:

The maximum CO conversion achievable in the presence of a catalyst was found to be 80% for a steam to carbon ratio(S:C ratio) of 3:1. On reducing the S:C ratio to the stoichiometric amount, the CO Conversion was found to reduce even further. The thermodynamic constraint of the water gas shift reaction at high temperatures restricts the complete conversion of CO and reduces the purity of hydrogen produced. This constraint is removed by the calcium looping process in which the CO2 is removed by a calcium based sorbent during the water gas shift reaction and the equilibrium is shifted in the forward direction towards the production of high purity hydrogen. The addition of the calcium based sorbent has been found to drive the water gas shift reaction to completion even for a stoichiometric S:C ratio of 1:1. FIG. 9 illustrates the effect of pressure and S:C ratio on the hydrogen purity achieved in the presence of the HTS catalyst and calcium oxide sorbent. Pressure was found to have a stronger effect on the purity of hydrogen than S:C ratio. Hydrogen purity was found to increase from 90% to >99% for an increase in pressure from 0 psig to 300 psig. In the pre breakthrough region of the curve, the S:C ratio was found to have an effect on the purity of hydrogen only at lower pressures. While at 0 psig, the purity of hydrogen was found to increase from 90% to 95% for an increase in the S:C ratio from 1:1 to 3:1, at higher pressures of 150 psig and 300 psig, S:C ratio was found to have no effect on the purity of hydrogen. Hence ~100% hydrogen purity can be achieved even for a stoichiometric S:C ratio by operating at high pressures.

Figure 10:
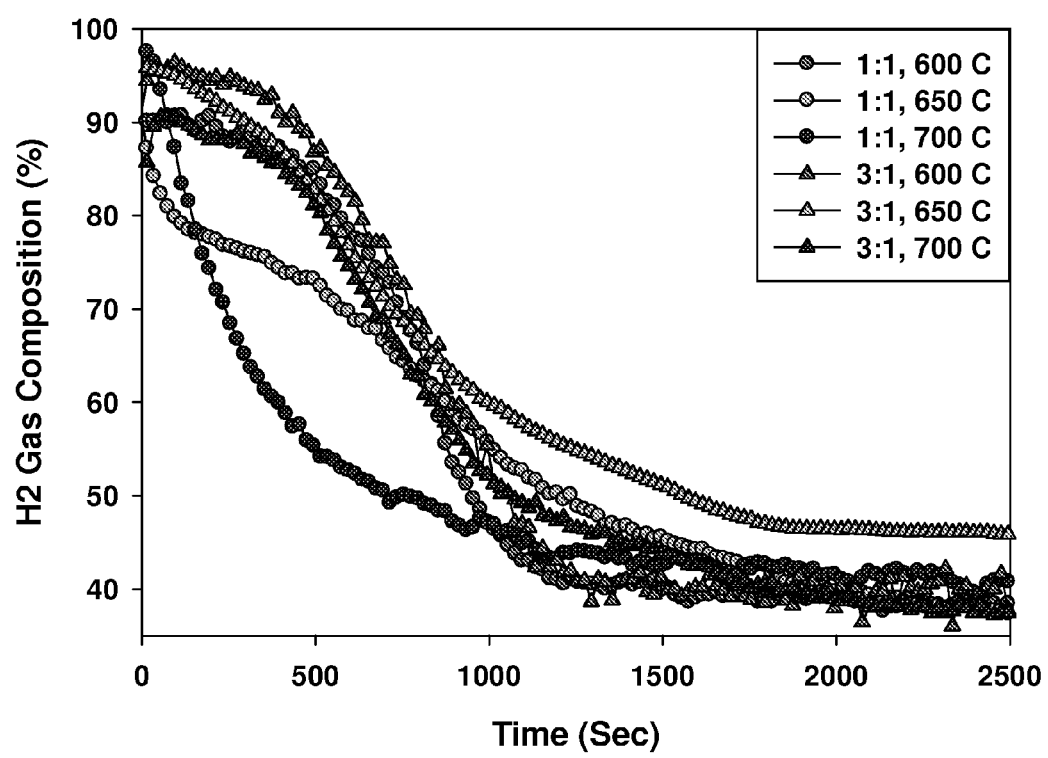
FIG. 10 presents the effect of steam to carbon ratio and temperature on the purity of hydrogen obtained in the presence of the HTS catalyst and calcium oxide sorbent. (Pressure=0 psig, Total flow=0.725 slpm, 0.25 g HTS, 0.25 CaO).

FIG. 10 illustrates the effect of temperature on hydrogen purity at different steam to carbon ratios at atmospheric pressure. At both S:C ratios of 3:1 as well as 1:1, the hydrogen purity was found to decrease with an increase in temperature. This is because the thermodynamics as well as the kinetics of the carbonation reaction is optimum at a temperature of 600 C.

Figure 11:
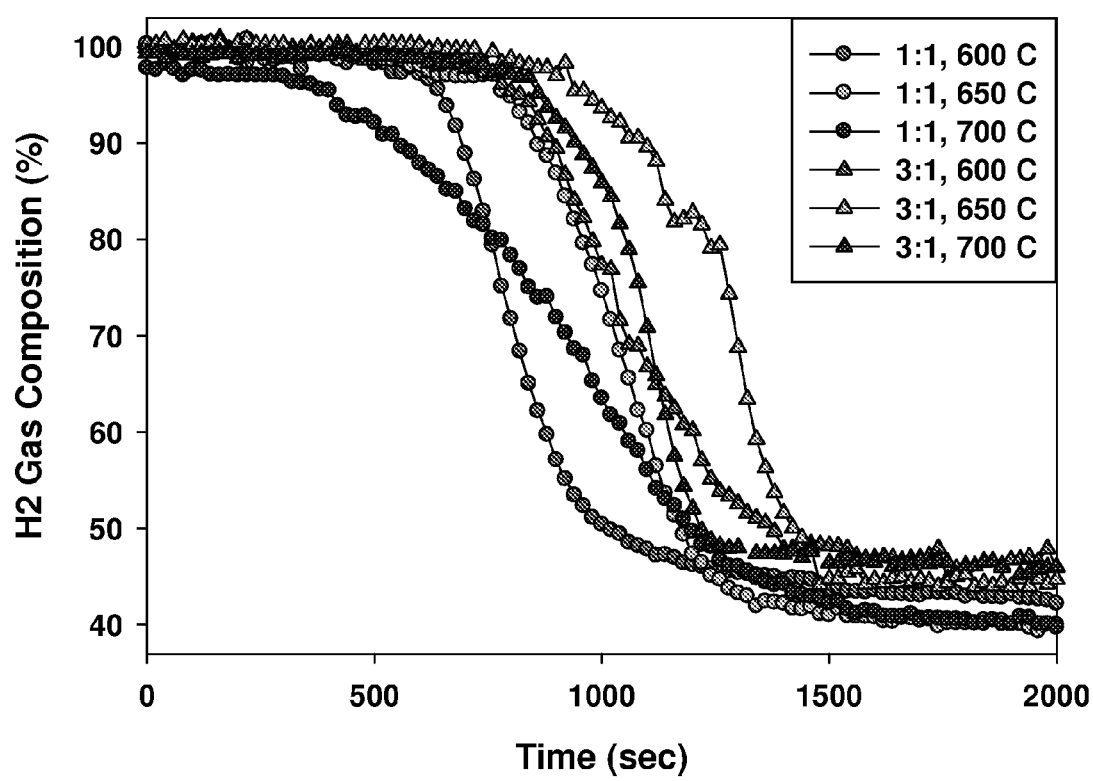
FIG. 11 presents the effect of steam to carbon ratio and temperature on the purity of hydrogen obtained in the presence of the HTS catalyst and calcium oxide sorbent. (Pressure=150 psig, Total flow=0.725 slpm, 0.25 g HTS, 0.25 CaO).

At a higher pressure of 150 psig, >99% hydrogen purity was obtained for temperatures of 600 C and 650 C in the pre breakthrough region of the curve shown in FIG. 11. The hydrogen purity was found to decrease with an increase in the temperature beyond 650 C. At 700 C, the purity of hydrogen was found to be 99% for a steam to carbon ratio of 3:1 and 98% for a steam to carbon ratio of 1:1.

Figure 12:
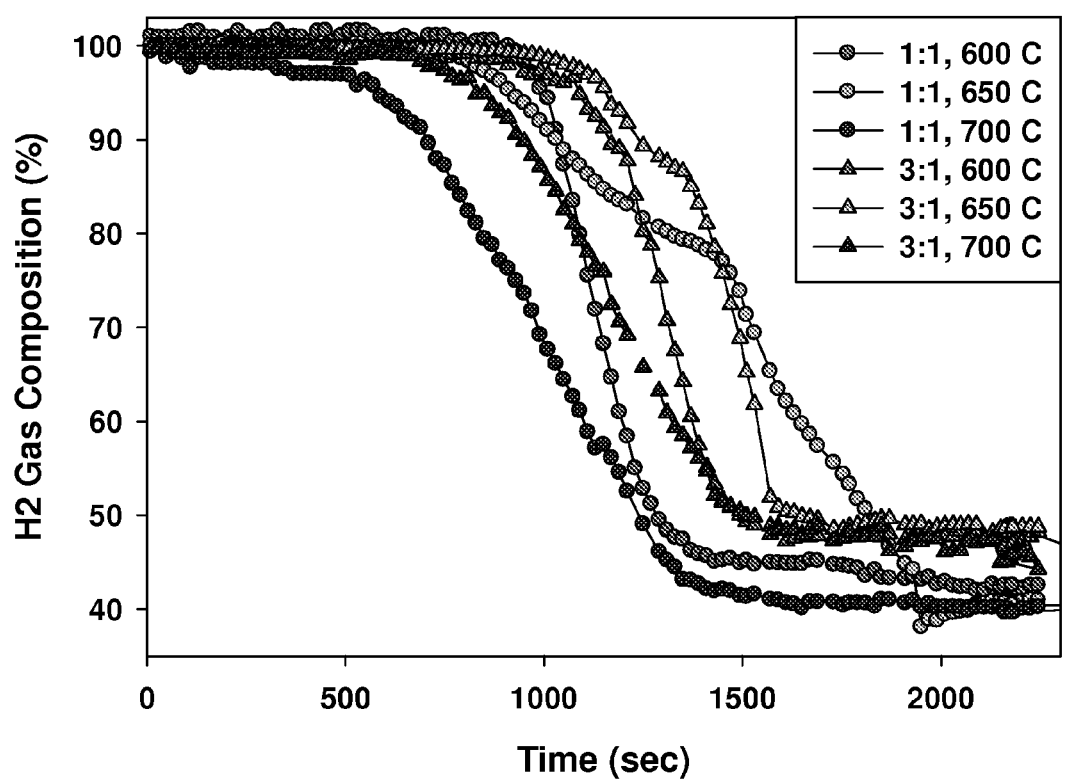
FIG. 12 presents the effect of steam to carbon ration and temperature on the purity of hydrogen obtained in the presence of the HTS catalyst and calcium oxide sorbent. (Pressure=300 psig, Total flow=0.725 slpm, 0.25 g HTS, 0.25 g CaO).

At 300 psig, temperature was found to have a weak effect on the purity of hydrogen produced while S:C ratio was found to have almost no effect. Very high hydrogen purity of above 99% was observed for a temperature of 600 C as illustrated in FIG. 12. The hydrogen purity was found to decrease with the increase in temperature and a CO Conversion of 98% was obtained at a temperature of 700 C. Hence it can be inferred that by operating at a pressure of 300 psig and a temperature of 600 C it is possible to obtain a hydrogen purity of 99.7% even at a stoichiometric S:C ratio.

Figure 13:
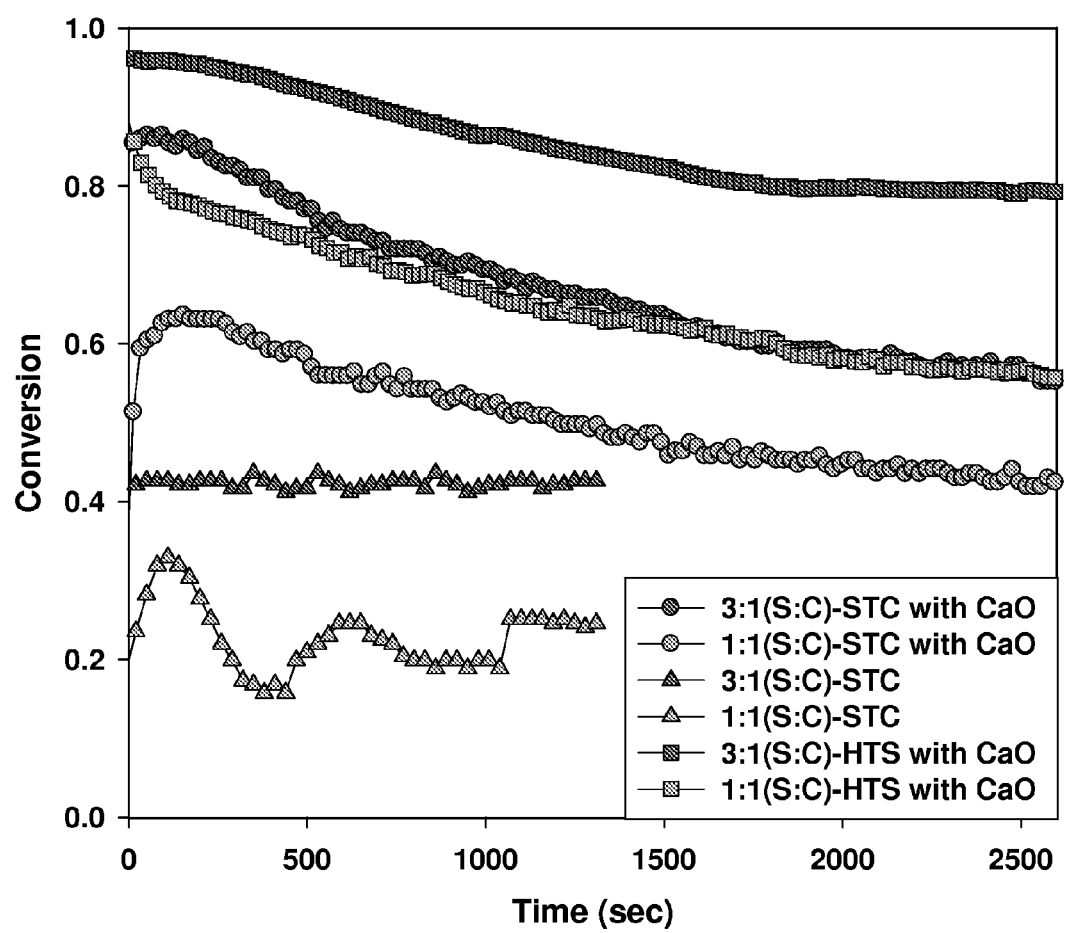
FIG. 13 is a comparison in the CO conversion obtained at different S:C rations for different sorbent and catalyst mixtures. (Pressure=0 psig, Temperature=650 C, Total flow=0.725 slpm, 0.25 g STC, 0.25 HTS, 2.5 g CaO).

FIG. 13 illustrates the comparison in CO Conversion obtained in the presence of the STC, a mixture of STC and calcium oxide and a mixture of HTS and calcium oxide at atmospheric pressure. At a particular S:C ratio, the CO Conversion was found to be the highest in the presence of the HTS and calcium oxide sorbent. Although the CO conversion is increased by the addition of calcium oxide to the STC it is still lower than the conversion obtained in the presence of the mixture of HTS and calcium oxide sorbent. From the Water Gas Shift catalysis study it is known that the temperature at which the highest CO Conversion is obtained in the presence of the HTS catalyst lies within the temperature window of the carbonation reaction (550-650). Hence the optimum in the kinetics and thermodynamics of the water gas shift reaction lies within the same temperature range for the mixture of the HTS catalyst and the calcium oxide sorbent and very high CO Conversion is obtained. In the case of the sulfur tolerant catalyst, the optimum CO Conversion occurs at a temperature higher than 700 C where the CO2 partial pressure required for the carbonation reaction to occur is very high. Hence the carbonation reaction does not occur at these temperatures and no breakthrough curve is obtained. The equilibrium is in favor of lower temperatures (550-650 C) while the kinetics in the presence of the catalyst is in favor of higher temperatures (>700 C) and hence the optimum CO Conversion obtained is low.

Figure 14:
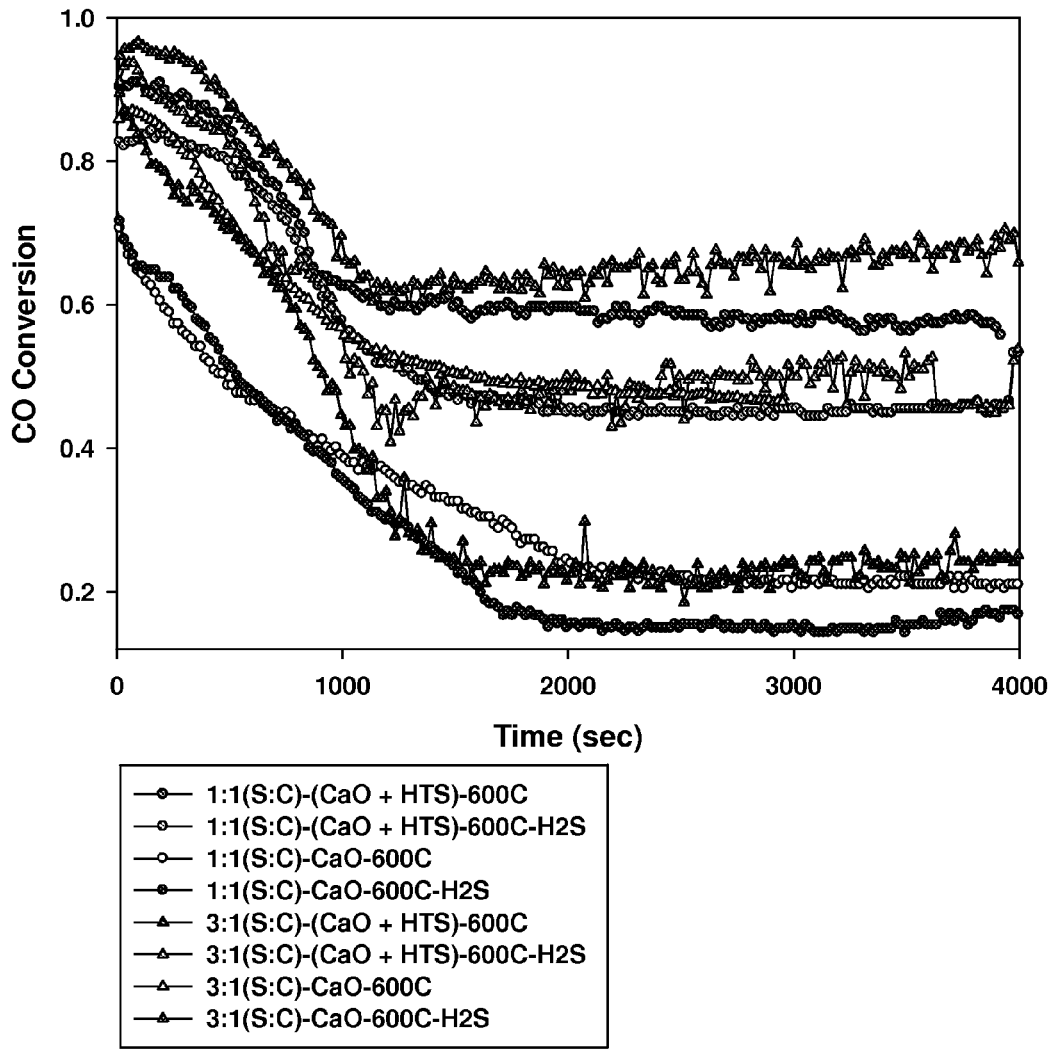
FIG. 14 presents the effect of S:C ratio and the presence of $H_2S$ on the CO conversion obtained for different sorbent and catalyst mixtures. (Pressure=0 psig, Temperature=600 C, Total flow=0.725 slpm, 0.25 g STC, 0.25 g HTS, 2.5 g CaO).

Since the CO Conversion was found to be higher in the presence of the HTS catalyst than in the presence of the STC catalyst (both in the absence and presence of sorbent as well as in the absence and presence of H2S), the HTS catalyst was chosen for further testing. The effect of H2S on the CO Conversion obtained for the combined water gas shift and carbonation reaction in the presence of the HTS catalyst and calcium oxide sorbent was investigated. As shown in FIG. 14, at a particular S:C ratio, the CO conversion obtained in the presence of H2S was lower than that obtained in the absence of H2S. Since this observation is true for both S:C ratios shown in FIG. 14, the deactivation of the catalyst in the presence H2S during the combined water gas shift and carbonation reactions is evident. The effect of S:C ratio both in the presence and absence of H2S was found to be similar to the previous observations and the CO Conversion increased with the increase in S:C ratio. To eliminate issues related to the deactivation of the catalyst and its frequent replacement which would add to the cost of hydrogen production, the non catalytic water gas shift reaction in the presence of calcium oxide sorbent was investigated. At atmospheric pressure 87% CO conversion was obtained at an S:C ratio of 3:1 and 70% CO Conversion was obtained at an S:C ratio of 1:1 in the presence of only calcium oxide. Even in the absence of a catalyst, the removal of CO2 from the reaction gas mixture drives the reaction equilibrium to such an extent that the CO conversion increases from 20% to 70% in the pre breakthrough region of the curve at an S:C ratio of 1:1. This conversion obtained in the presence of the sorbent alone is however lower than the CO Conversion obtained in the presence of the catalyst and sorbent. Another observation was that the presence of H2S in the reactant gas does not have any effect on the CO Conversion. This was found to be true for both S:C ratios of 3:1 and 1:1. The effect of S:C ratio on CO Conversion was found to be more predominant in the case of the non catalytic combined reaction than the catalytic combined reaction at atmospheric pressure. While the CO conversion decreased by only 6% with the decrease in S:C ratio from 3:1 to 1:1 in the case of the catalytic combined reaction, it fell by 17% in the non catalytic combined reaction. This effect was observed both in the presence and absence of H2S in the feed stream. Hence the disadvantage associated with decreasing the S:C ratio is higher for the non catalytic combined reaction mode at atmospheric pressure. This is perceived as an important factor as the reduction in S:C ratio aids in lowering the parasitic energy consumption of the process and reduces the inhibiting effect of steam on the removal of H2S by the calcium oxide sorbent.

Figure 15:
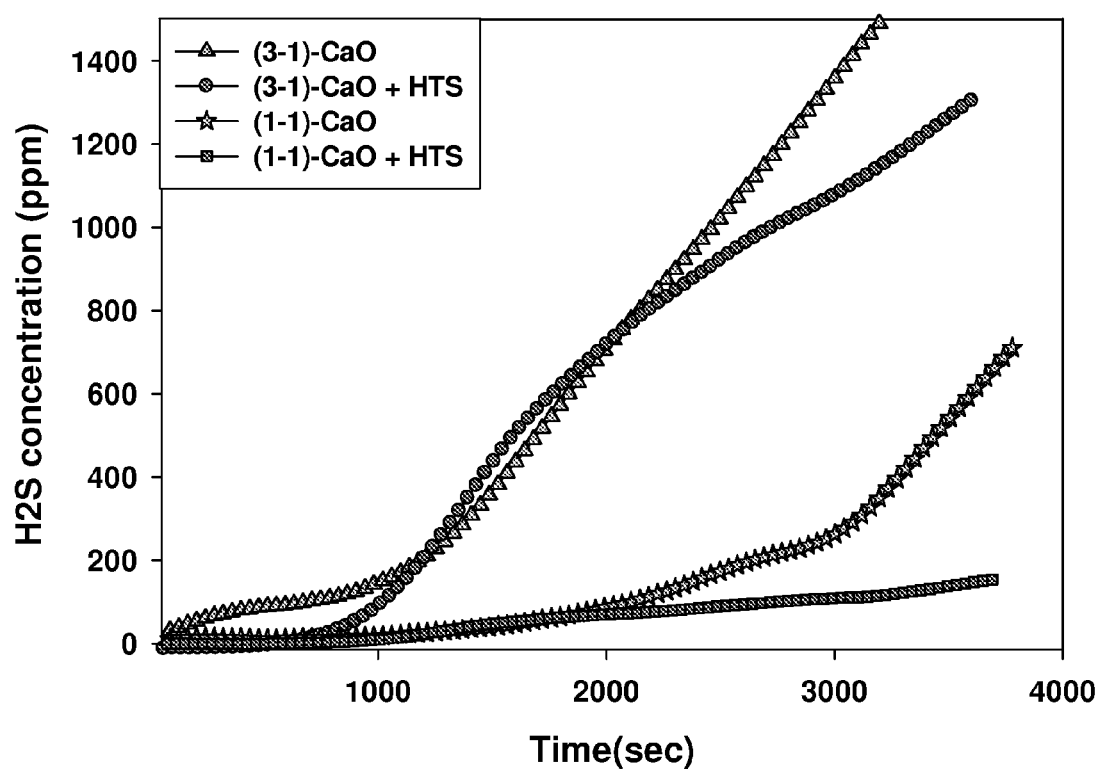
FIG. 15 shows the effect of S:C ration and presence of HTS catalyst on the extent of $H_2S$ removal. (Pressure=0 psig, Temperature=600 C, Total flow=0.725 slpm, 0.25 g HTS, 2.5 g CaO).

Since the calcium oxide functions as a multipollutant capture sorbent in the calcium looping process, the extent of H2S removal was determined for the catalytic and non catalytic combined reactions. As shown in FIG. 15, the concentration of H2S in the outlet product stream followed a breakthrough curve. For the non catalytic combined reaction, the H2S in the outlet was found to be higher for an S:C ratio of 3:1 when compared to that for an S:C ratio of 1:1. This proves the inhibiting effect of steam on the reaction of CaO with H2S. It was also found that at an S:C ratio of 1:1 the extent of removal of H2S was the same (~10 ppm) in the presence and absence of the catalyst. At the end of the pre breakthrough region of the curve the calcium oxide sorbent gets converted to a mixture consisting mainly of CaCO3 and a small amount of CaS. During the breakthrough region the H2S reacts with the CaCO3 to form CaS but the equilibrium concentration of H2S for this reaction in the product gas for this reaction is higher than that for the reaction of CaO with H2S. Hence the concentration of H2S increases in the product stream. The H2S concentration in the breakthrough region of the curve was found to be higher for an S:C ratio of 3:1 than 1:1 due to the greater inhibiting effect of steam on the reaction between CaCO3 and H2S.

Figure 16:
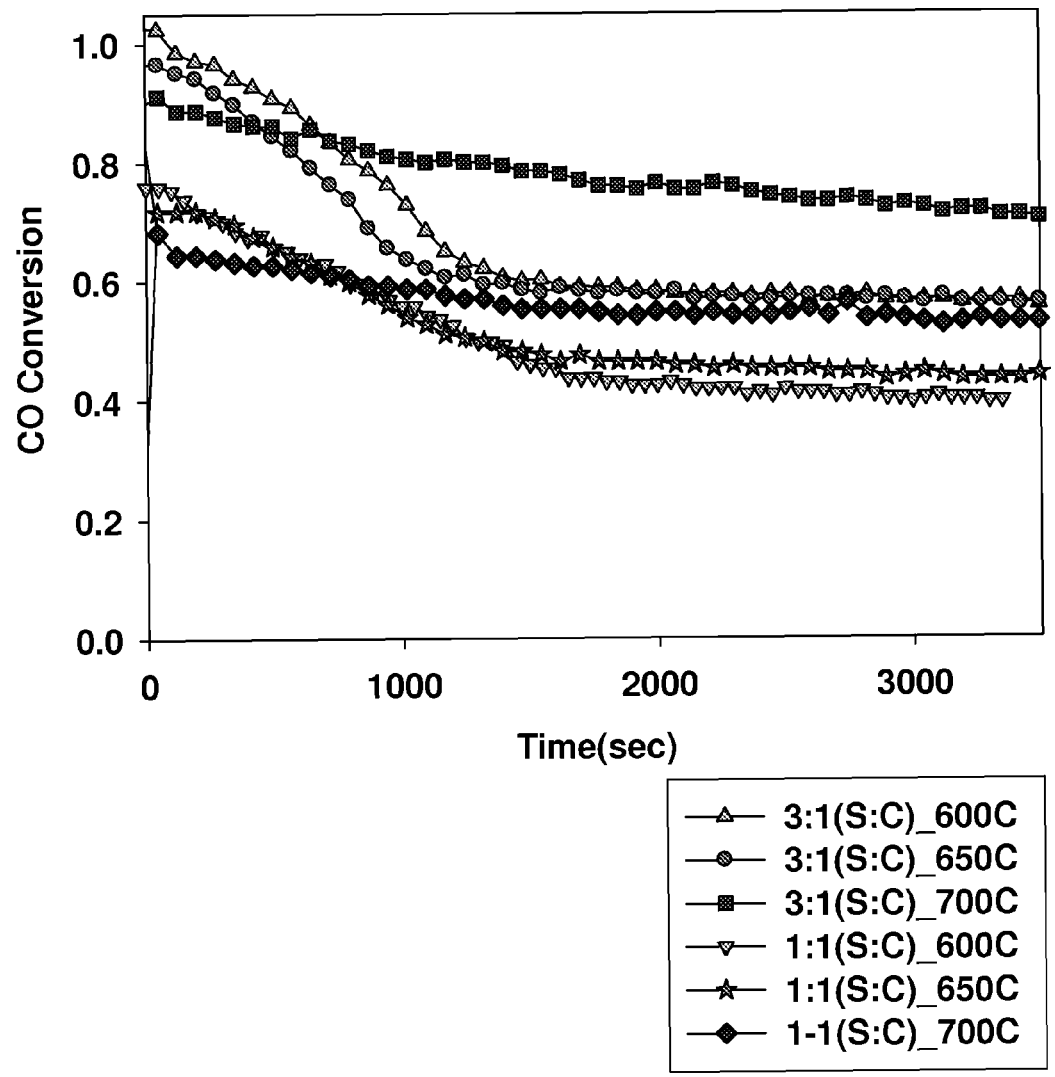
FIG. 16 presents the effect of S:C ration and temperature on the CO conversion obtained in the presence of CaO sorbent only. (Pressure=0 psig, Total flow=0.725 slpm, s.5 g CaO).

The non-catalytic combined water gas shift and carbonation reaction was investigated for a range of temperatures and S:C ratios at atmospheric pressure. As illustrated in FIG. 16, the effect of S:C ratio on CO Conversion was found to be larger than that of temperature. In the pre breakthrough region of the curves the CO Conversion was found to be highest for a temperature of 600 C and was found to decrease with the increase in temperature for both S:C ratios of 3:1 and 1:1. As observed earlier in FIG. 14, the CO Conversion at all the temperatures in FIG. 16 was found to decrease by ~16% with the decrease in S:C ratio from 3:1 to 1:1.

Figure 17:
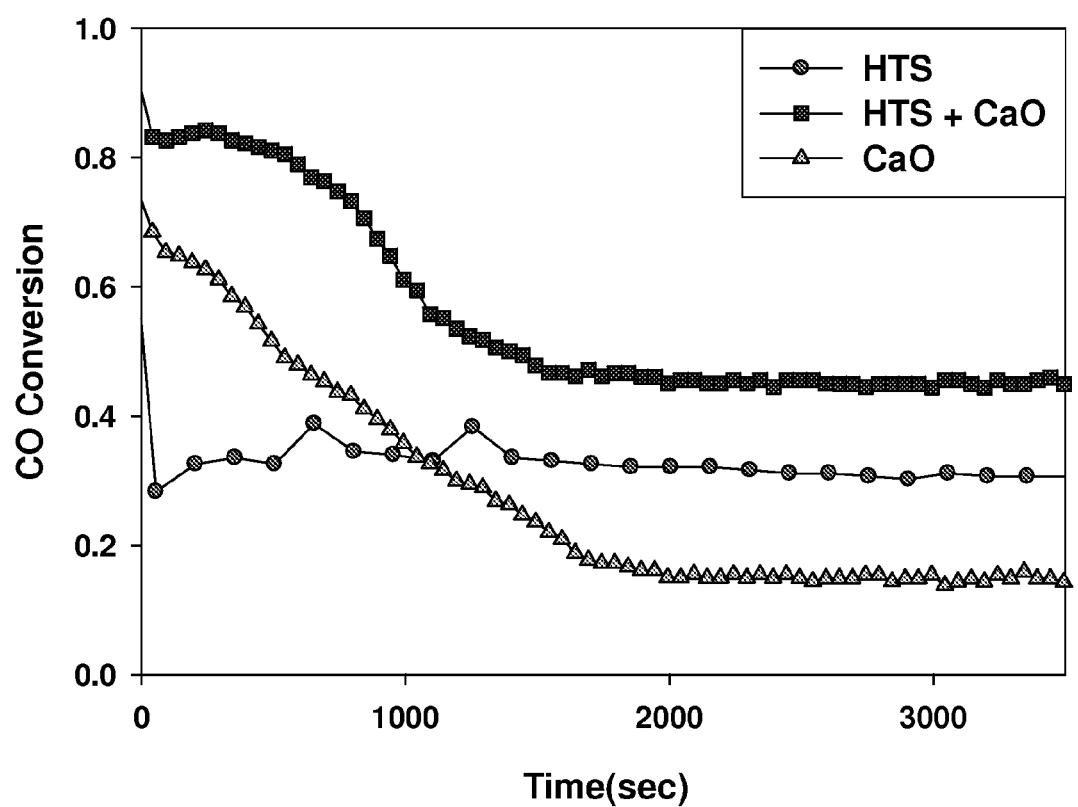
FIG. 17 is a comparison in the CO conversion obtained for different mixtures of the CaO sorbent and HTS catalyst. (Pressure=0 psig, Temperature=600 C, Total flow=0.725 slpm, 0.25 g HTS, 2.5 CaO).

As illustrated in FIG. 17, the CO Conversion obtained for the non catalytic combined water gas shift and carbonation reaction (70%) was found to be greater than that obtained in the presence of the catalyst only (40%) and the CO Conversion obtained for the catalytic combined reaction (84%) was greater than that for the non catalytic combined reaction at atmospheric pressure.

Figure 18:
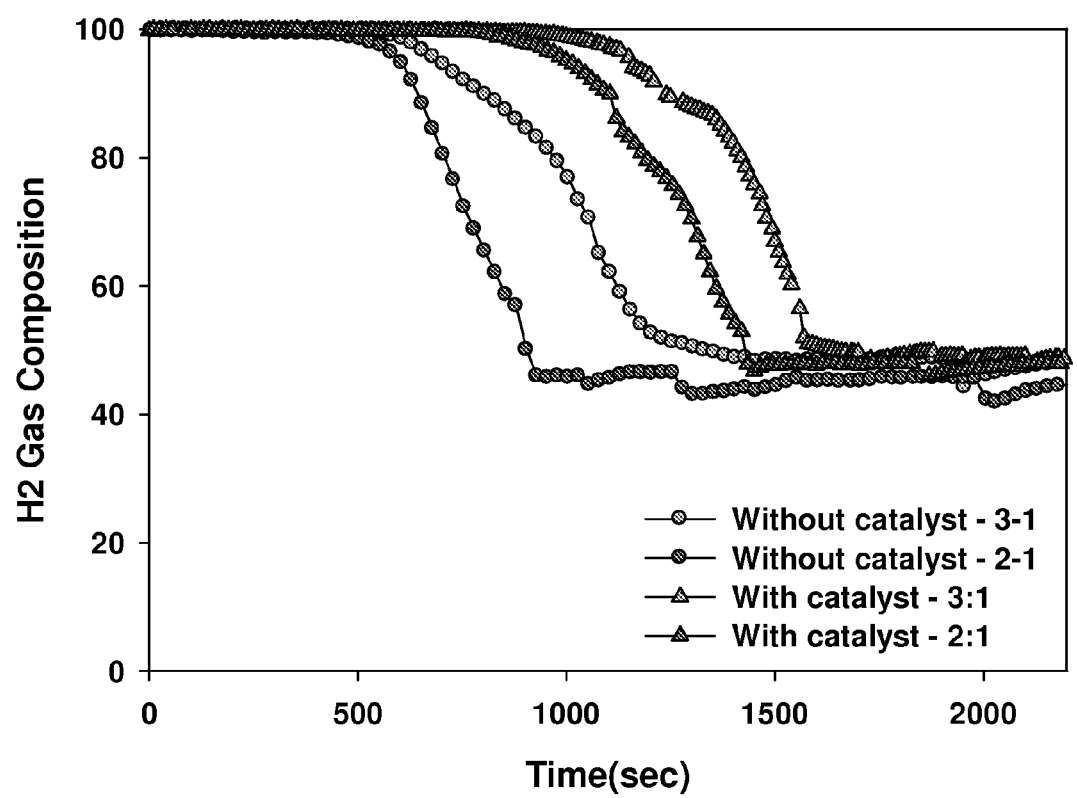
FIG. 18 presents the effect of S:C ration and presence of HTS catalyst on purity of hydrogen produced in the presence of CaO sorbent. (Pressure—300 psig, Temperature=600 C, Total flow=0.725 slpm, 0.25 g HTS, 2.5 g CaO).

The effect of pressure was investigated on the purity of hydrogen produced in the presence of a mixture of sorbent and catalyst and in the presence of the sorbent alone. The hydrogen purity obtained has been shown in FIG. 18. At a higher pressure of 300 psig, the CO Conversion obtained in the presence of the sorbent alone was found to be equal to that obtained in the presence of the sorbent and catalyst. Hence by operating at high pressures high purity hydrogen (>99%) can be produced even in the absence of a catalyst. At higher pressures, the reduction in S:C ratio was found to have no effect on the purity of hydrogen produced. Hence at higher pressures, high purity hydrogen can be produced in the absence of a catalyst even at stoichiometric S:C ratios.

Figure 19:
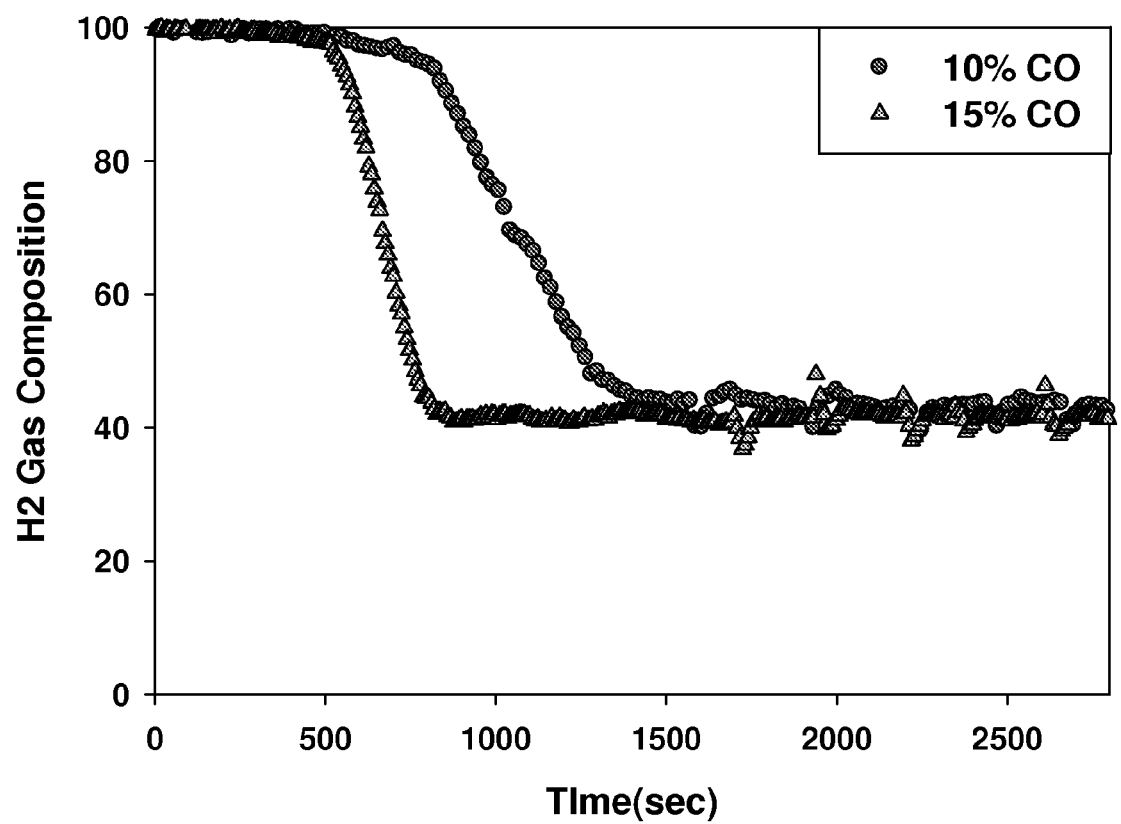
FIG. 19 presents the effect of CO concentration in the feed on the purity of hydrogen produced in the presence of CaO sorbent. (Pressure—150 psig, Temperature=600 C, S:C ratio=3:1, Total flow=0.725 slpm, 2.5 g CaO).

The effect of CO concentration in the reactant gas was investigated at a pressure of 150 psig on the purity of hydrogen produced. As shown in FIG. 19, high purity hydrogen was produced for both 10% and 15% CO in the feed stream. With an increase in the CO concentration the pre breakthrough region of the curve becomes shorter. This is due to the higher flow rate of CO2 produced by the water gas shift reaction which causes the CaO bed to get converted to CaCO3 faster.

Figure 20:
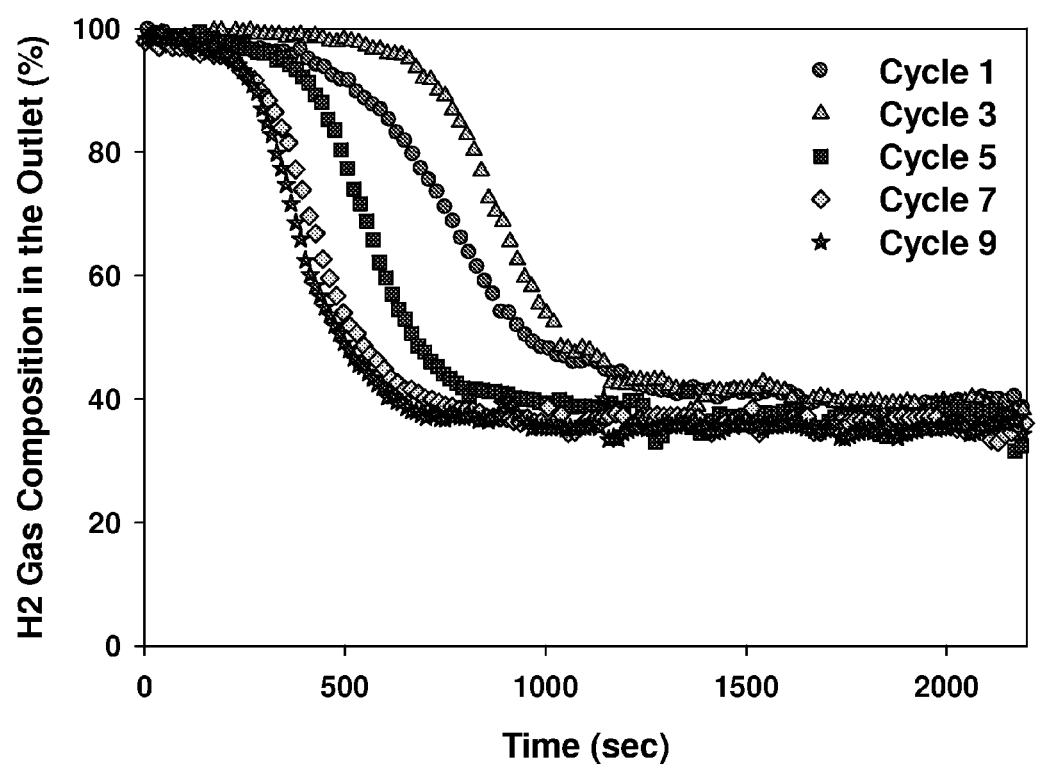
FIG. 20 presents the purity of hydrogen produced for multiple reaction-regeneration cycles in the presence of CaO sorbent. (Pressure=50 psig, Temperature=650 C, S:C ratio=3:1, Total flow=0.725 slpm, 2.5 g CaO)

Multiple reaction and regeneration cycles were conduced to determine the effect of the number of cycles on the purity of hydrogen produced. FIG. 20 describes the multicyclic reaction regeneration curves obtained at an operating pressure of 50 psig. The hydrogen purity was found to decrease with the increase in the number if cycles. The time for which the pre breakthrough region of the curve lasted was also found to decrease with the increase in cycle number. This is due to the sintering of the sorbent over multiple reaction regeneration cycles leading to a decrease in the CO2 capture capacity of the sorbent over time.

Figure 21:
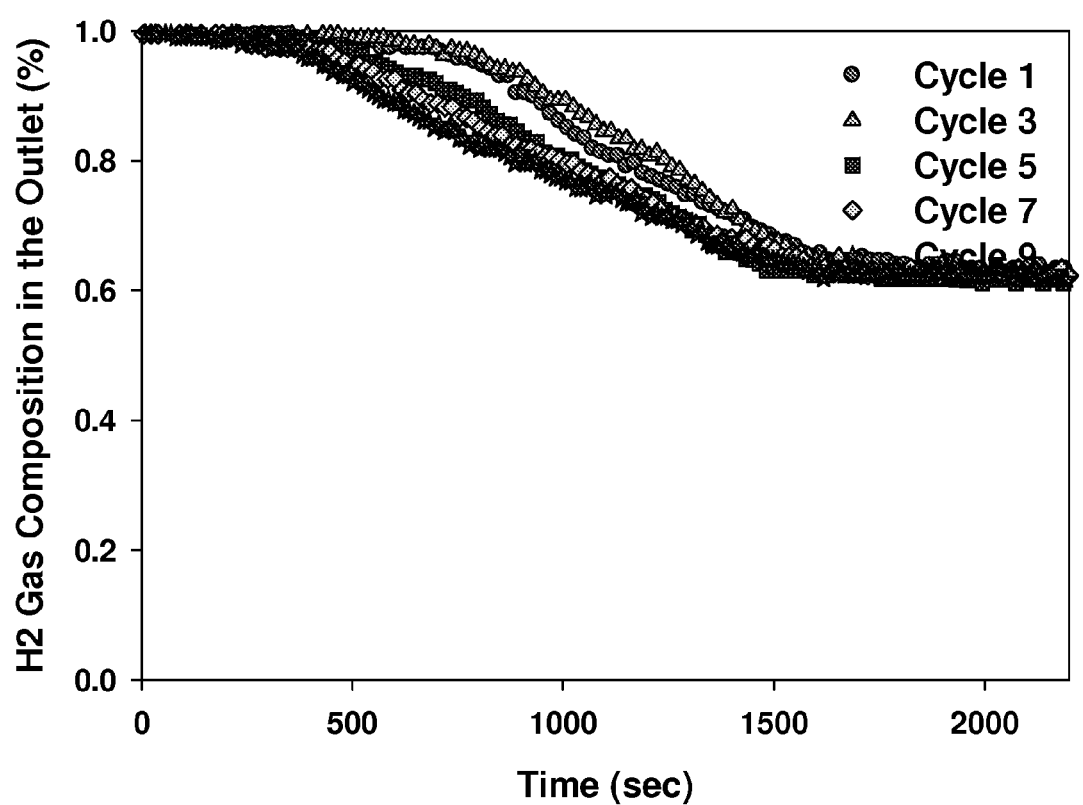
FIG. 21 presents the purity of hydrogen produced for multiple reaction-regeneration cycles in the presence of CaO sorbent. (Pressure=300 psig, Temperature=650 C, S:C ratio=3:1, Total flow=0.725 slpm, 2.5 CaO).

FIG. 21 illustrates the multiple reaction regeneration cycles obtained at an operating pressure of 300 psig. The purity of hydrogen remained almost constant with the increase in the number of cycles unlike the curves obtained at 50 psig. However, the time for which the pre breakthrough region lasted decreased with the increase in the cycle number but to a lower extent than at 50 psig. Hence a method of reactivation of the sorbent is required to maintain the purity of hydrogen a constant over multiple cycle.

Figure 22:
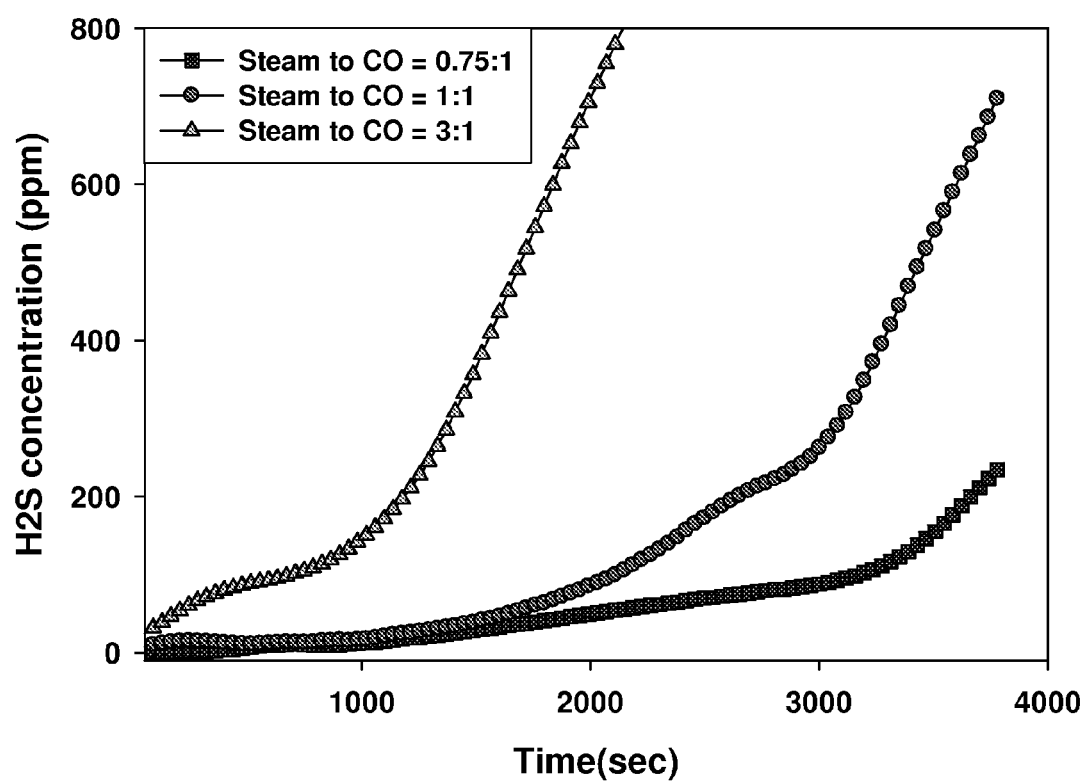
FIG. 22 presents the effect of S:C ration on the extent of $H_2S$ removal during the combined water gas shift, carbonation and sulfidation reaction in the presence of CaO sorbent. (Pressure=0 psig, Temperature=600 C, 5000 ppm $H_2S$, Total flow=0.725 slpm, 2.5 CaO).
Figure 23:
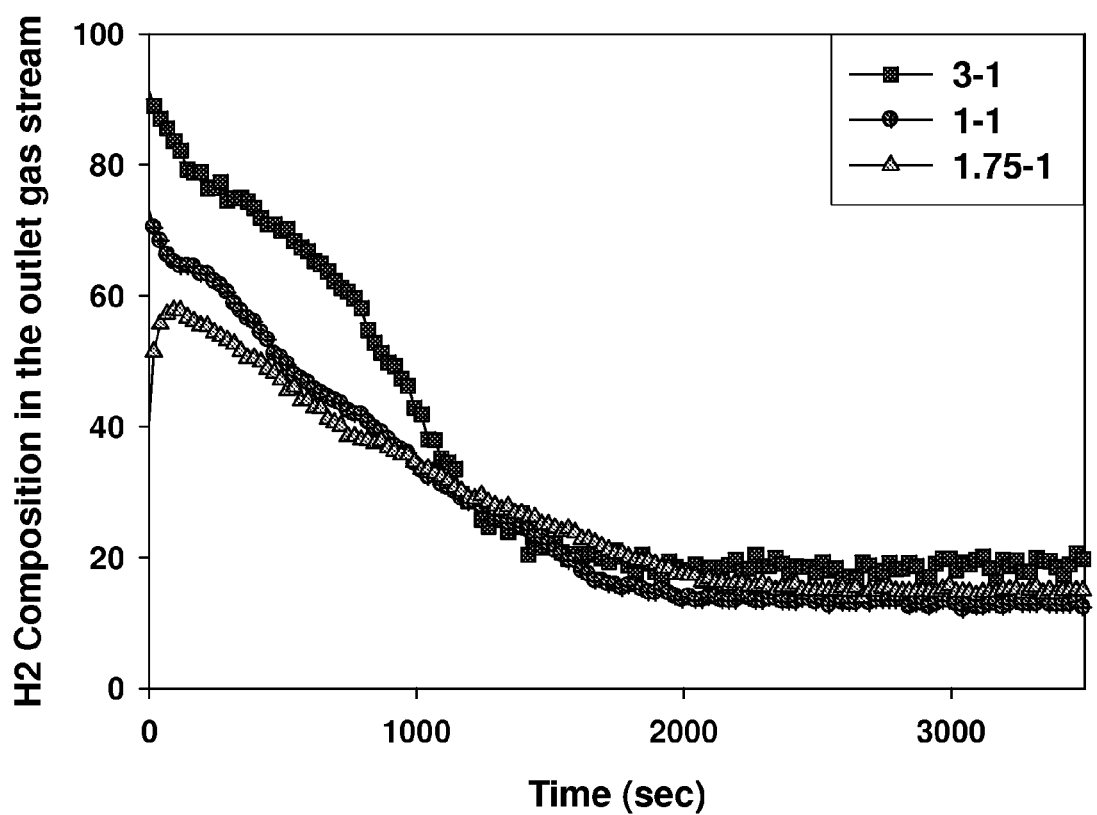
FIG. 23 presents the effect of S:C ratio on the purity of hydrogen produced during the combined water gas shift, carbonation and sulfidation reaction in the presence of CaO sorbent. (Pressure=0 psig, Temperature=600 C, 5000 ppm $H_2S$, Total flow=0.725 slpm, 2.5 g CaO).

In the Calcium Looping process, the calcium oxide in addition to driving the water gas shift reaction also assumes the role of a multipollutant capture sorbent. Hence influence of various process variables like temperature, S:C ratio and pressure on the purity of hydrogen produced and the extent of H2s removed during the combined water gas shift, carbonation and sulfidation reaction was determined. FIGS. 22 and 23 illustrate the effect of varying S:C ratio on the extent of H2S removal and the purity of hydrogen produced in the combined water gas shift, carbonation and sulfidation reaction. S:C ratio was found to have a very strong effect on the extent of H2S removal as shown in FIG. 22. With the decrease in S:C ratio from 3:1 to 1:1, the concentration of H2S in the produced stream was found to decrease from 100 ppm to <1 ppm. This decrease in H2S is due to a reduction in the inhibiting effect of steam on the reaction between H2S and CaO. This is one of the most important rationale for operating at lower S:C ratios.

The effect of the change in S:C ratio on the purity of hydrogen is illustrated in FIG. 23 at atmospheric pressure. Similar to observations made earlier, at atmospheric pressure the purity of hydrogen was found to decrease with the decrease in S:C ratio during the pre breakthrough region of the curves.

Figure 24:
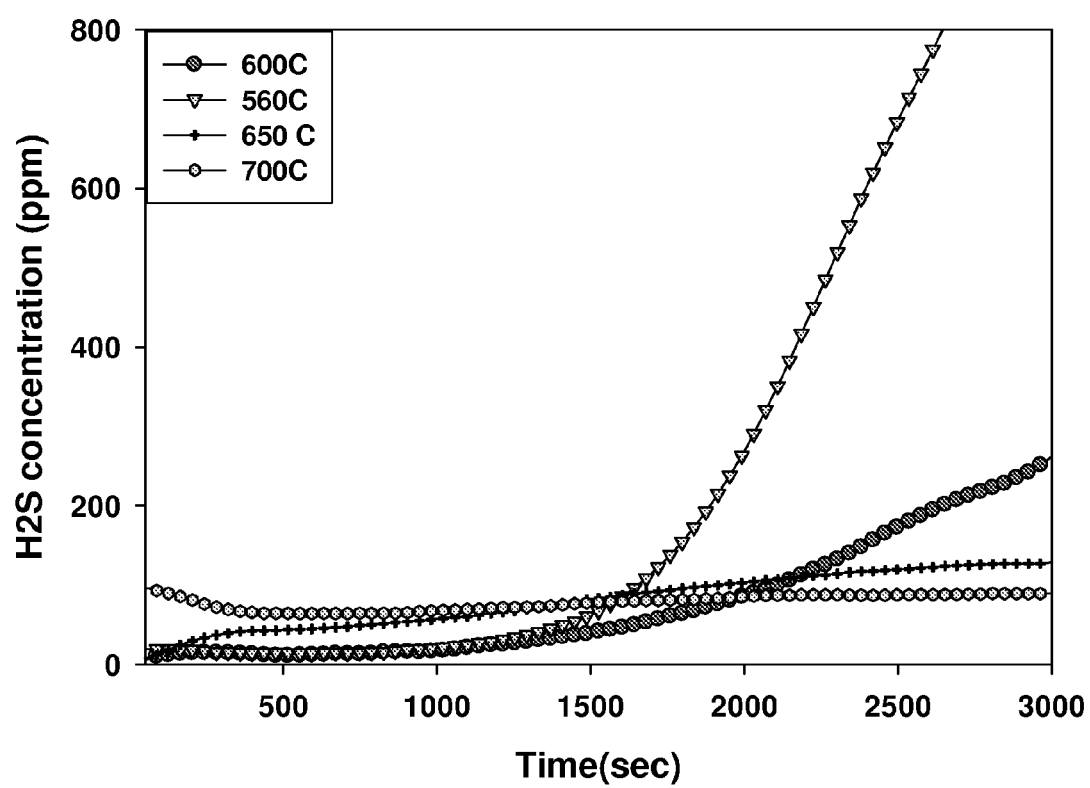
FIG. 24 provides the Effect of temperature on the extent of H2S removal during the combined water gas shift, carbonation and sulfidation reaction in the presence of CaO sorbent (Pressure=0 psig, S:C ratio=1:1, 5000 ppm H2S, Total Flow=0.725 slpm, 2.5 g CaO)
Figure 25:
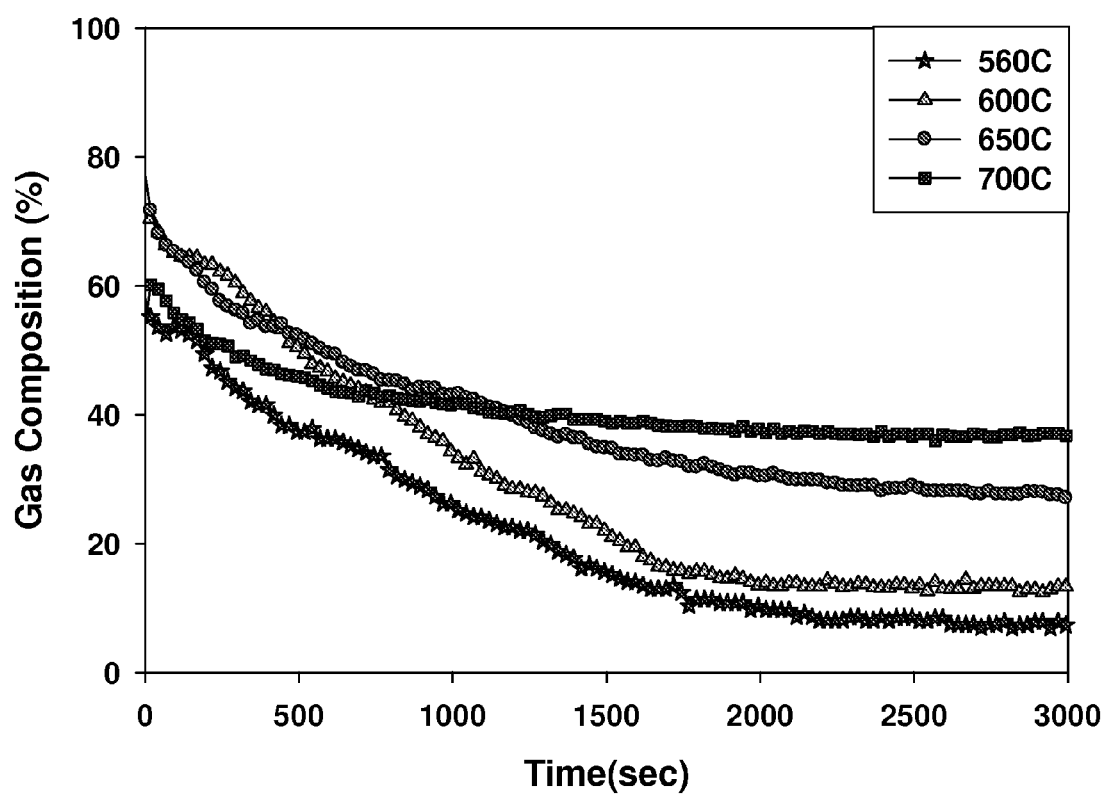
FIG. 25 shows the Effect of temperature on the purity of hydrogen produced during the combined water gas shift, carbonation and sulfidation reaction in the presence of CaO sorbent (Pressure=0 psig, S:C ratio=1:1, 5000 ppm H2S, Total Flow=0.725 slpm, 2.5 g CaO)

FIGS. 24 and 25 illustrate the effect of temperature on the extent of H2S removal and the purity of hydrogen produced respectively. A low concentration of H2S in the order of ~10 ppm was detected in the outlet hydrogen stream at temperatures ranging from 560 to 600 C. With the increase in the temperature above 600 C, the H2S concentration in the outlet was found to increase to 50 ppm at 650 C and 90 ppm at 700 C.

The effect of temperature on the purity of hydrogen has been illustrated in FIG. 25. The Hydrogen purity was found to be the highest (70%) within the temperature range of 600-650 C. The purity of hydrogen was found to decrease to 60% with the decrease in temperature to 560 C. A similar effect was observed with the increase in temperature to 700 C. Hence from FIGS. 24 and 25, it can be inferred that the optimum temperature of operation for the simultaneous hydrogen production and H2S removal reaction is ~600 C.

Figure 26:
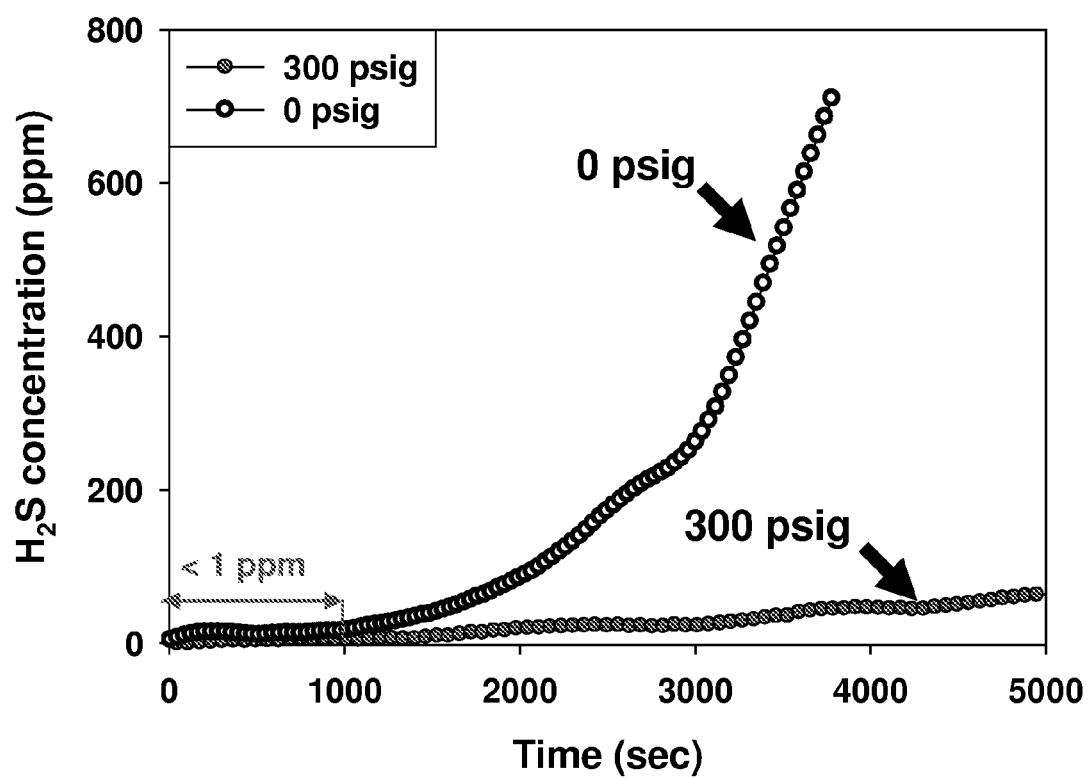
FIG. 26 provides the Effect of pressure on the extent of H2S removal during the combined water gas shift, carbonation and sulfidation reaction in the presence of CaO sorbent (S:C ratio=1:1, Temperature=600 C, 5000 ppm H2S, Total Flow=0.725 slpm, 2.5 g CaO)
Figure 27:
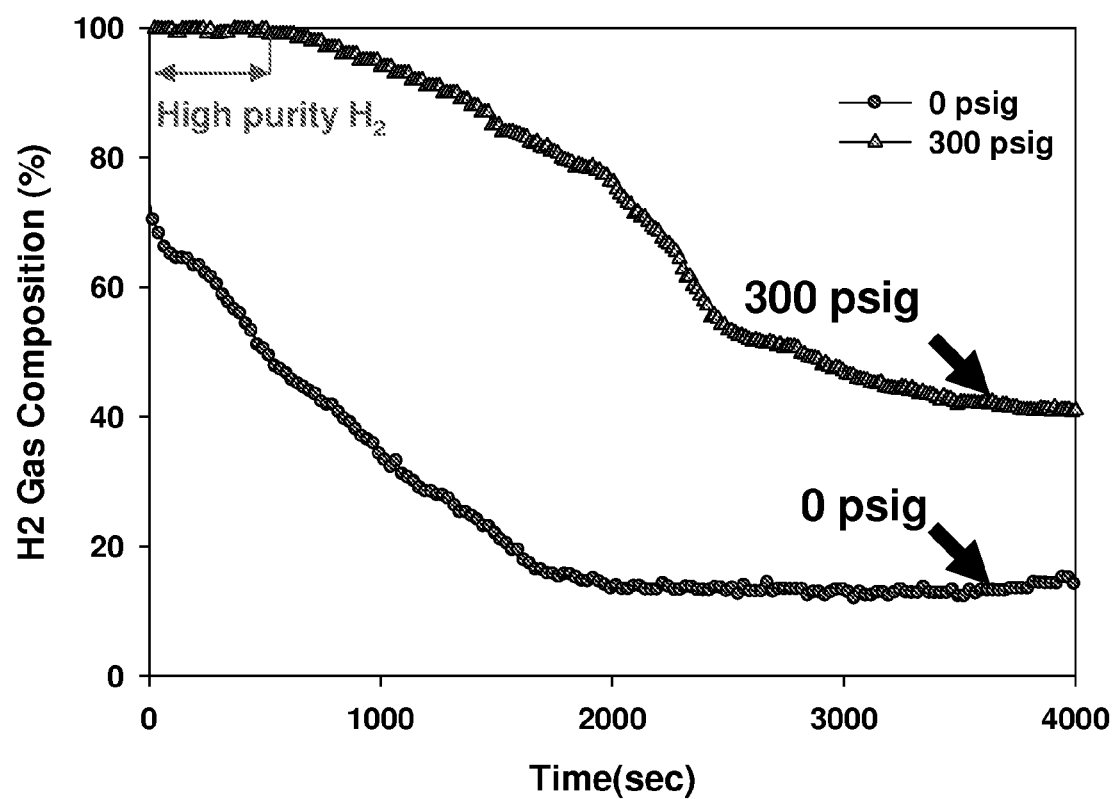
FIG. 27 provides the Effect of pressure on the purity of hydrogen produced during the combined water gas shift, carbonation and sulfidation reaction in the presence of CaO sorbent (S:C ratio=1:1, Temperature=600 C, 5000 ppm H2S, Total Flow=0.725 slpm, 2.5 g CaO)

Pressure has been found to be a very important variable for the non catalytic production of high purity hydrogen at low S:C ratios. The effect of the increase in pressure on the extent of H2S removal and the purity of hydrogen produced is illustrated in FIGS. 26 and 27. The concentration of H2S in the product hydrogen stream was found to decrease from 10 ppm to <1 ppm when the pressure was increased from 0 psig to 300 psig. Hence the combined effect of operating at a low S:C ratio and high pressure results in the production of a hydrogen stream with <1 ppm of sulfur impurities.

FIG. 27 illustrates the effect of the increase in pressure on the purity of hydrogen produced during the combined water gas shift, carbonation and sulfidation reaction. At a temperature of 600 C and a stoichiometric S:C ratio, the purity of hydrogen was found to increase from 70% to >99% with the increase in pressure of 0 psig to 300 psig. Hence the calcium looping process is capable of producing high purity hydrogen (>99%) with <1 ppm of sulfur impurities in it. The calcium looping process offers an integrated one stage process for producing high purity, high temperature and high-pressure hydrogen with carbon management and sulfur removal incorporated in it. Besides, it obviates the need for a catalyst and excess steam requirement thereby reducing the parasitic energy consumption and making the coal to hydrogen process economical and energy efficient.

Production of H$_2$ From Hydrocarbons

Figure 28:
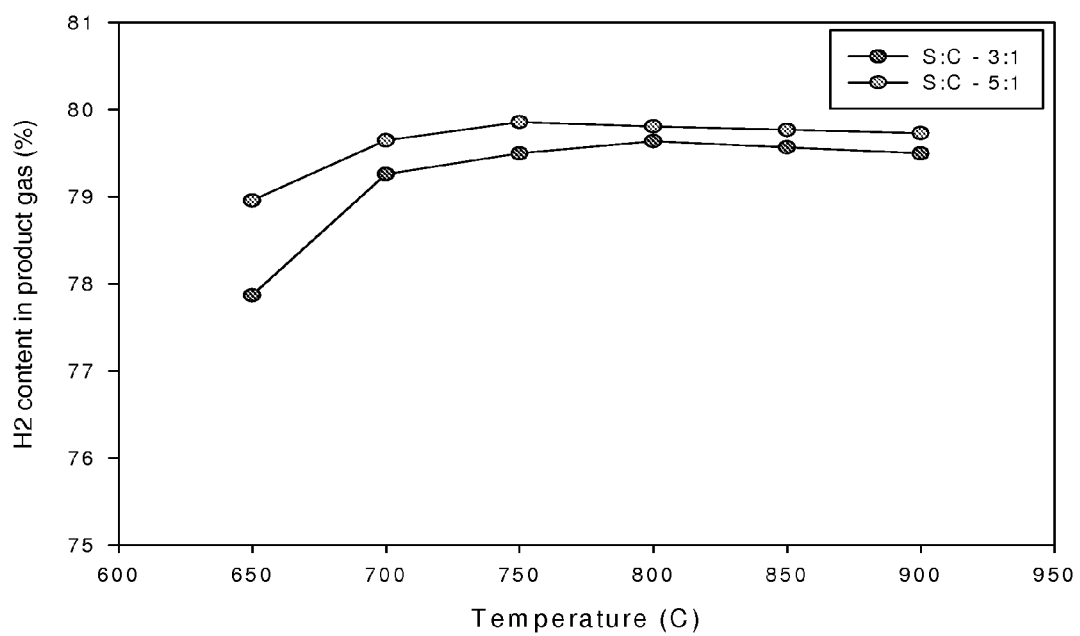
FIG. 28 provides the Effect of temperature and steam to carbon ratio on hydrogen purity from reforming of methane in the presence of Ni based reforming catalyst FIG. 29 provides the Breakthrough curve in the composition of the product gases obtained during the simultaneous reforming, water gas shift and carbonation reaction at 650 C and atmospheric pressure FIG. 30 provides the Methane conversion obtained during the simultaneous reforming, water gas shift and carbonation reaction conducted at 650 C and at atmospheric pressure

FIG. 28 shows that only 80% pure hydrogen can be produced in the presence of a Ni-based reforming catalyst even at high steam to carbon ratios of 5:1 and atmospheric pressure. At higher pressures the purity of hydrogen further decreases according to Le Chatliers principle.

Figure 29:
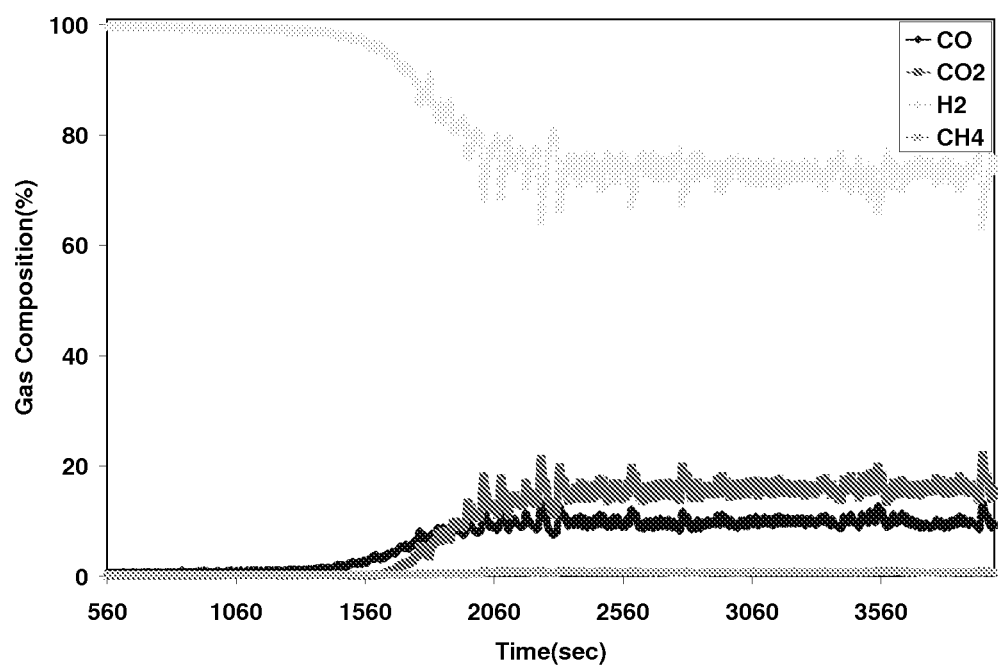

FIG. 29 depicts the concentration of hydrogen, CO, CO$_2$ and methane in the product gas at the outlet of the reactor when calcium oxide sorbent is present in the reactor along with reforming catalyst. It was found that >99% pure hydrogen can be obtained in the pre-breakthrough region of the curve. It was also found that the methane is almost completely converted and the concentration of methane, CO and CO$_2$ in the product stream is only a few ppms. The removal of CO$_2$ by the calcium oxide sorbent enhances the water gas shift reaction and the reforming reaction resulting in the production of a pure hydrogen product stream.

Figure 30:
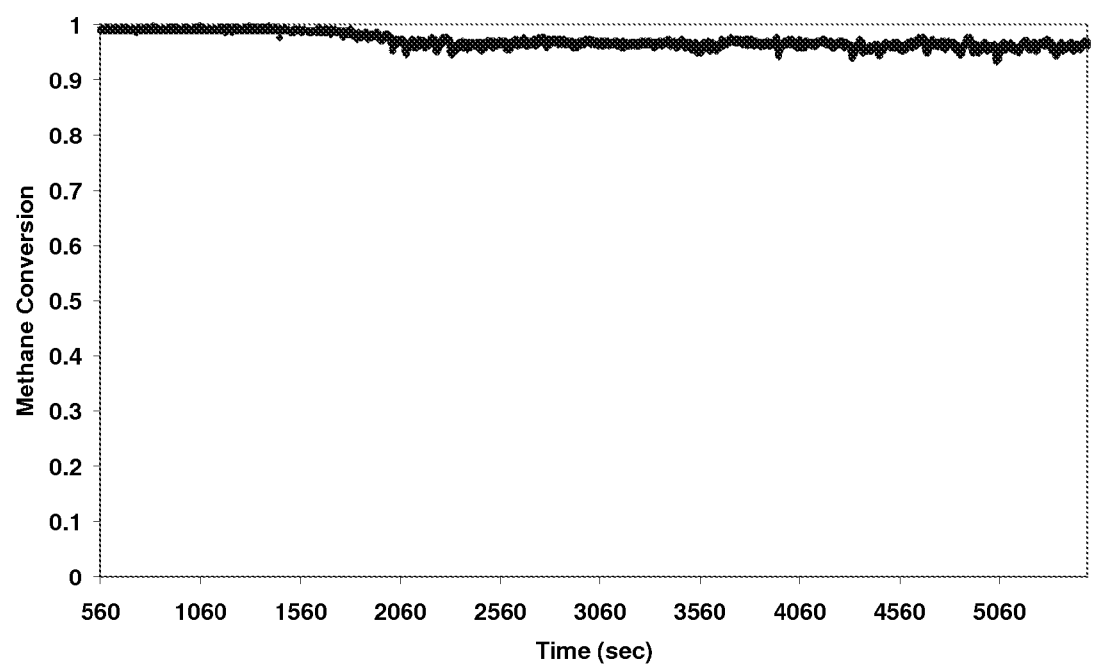

As illustrated in FIG. 30, it can be seen that >99% conversion of methane can be obtained during the pre-breakthrough period of the combined reforming, water gas shift and reforming reaction. As the sorbent gets consumed, the conversion of methane decreases forming the breakthrough region of the curve.

During the post breakthrough period, the sorbent is in the form of calcium carbonate and the reforming reaction takes place in the presence of the catalyst alone.

Figure 31:
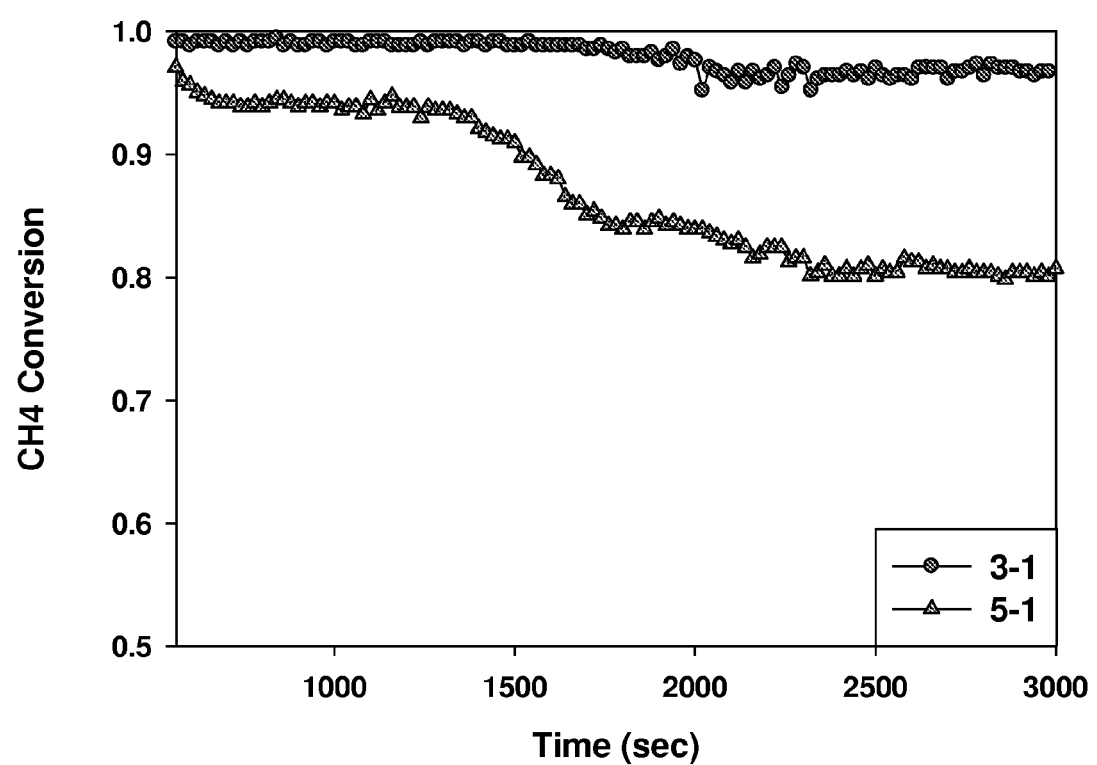
FIG. 31 shows the Effect of steam to carbon ratio on the methane conversion during the simultaneous reforming, water gas shift and carbonation reaction

FIG. 31 illustrates the effect of steam to carbon ratio on the conversion of methane during the combined reforming, water gas shift and carbonation reaction. With the decrease in steam to carbon ratio from 5:1 to 3:1 the conversion of methane decreases from >99% to 95%. By decreasing the steam to carbon ratio the parasitic energy required for the generation of steam can be reduced and sulfur and halide removal can also be enhanced.

Figure 32:
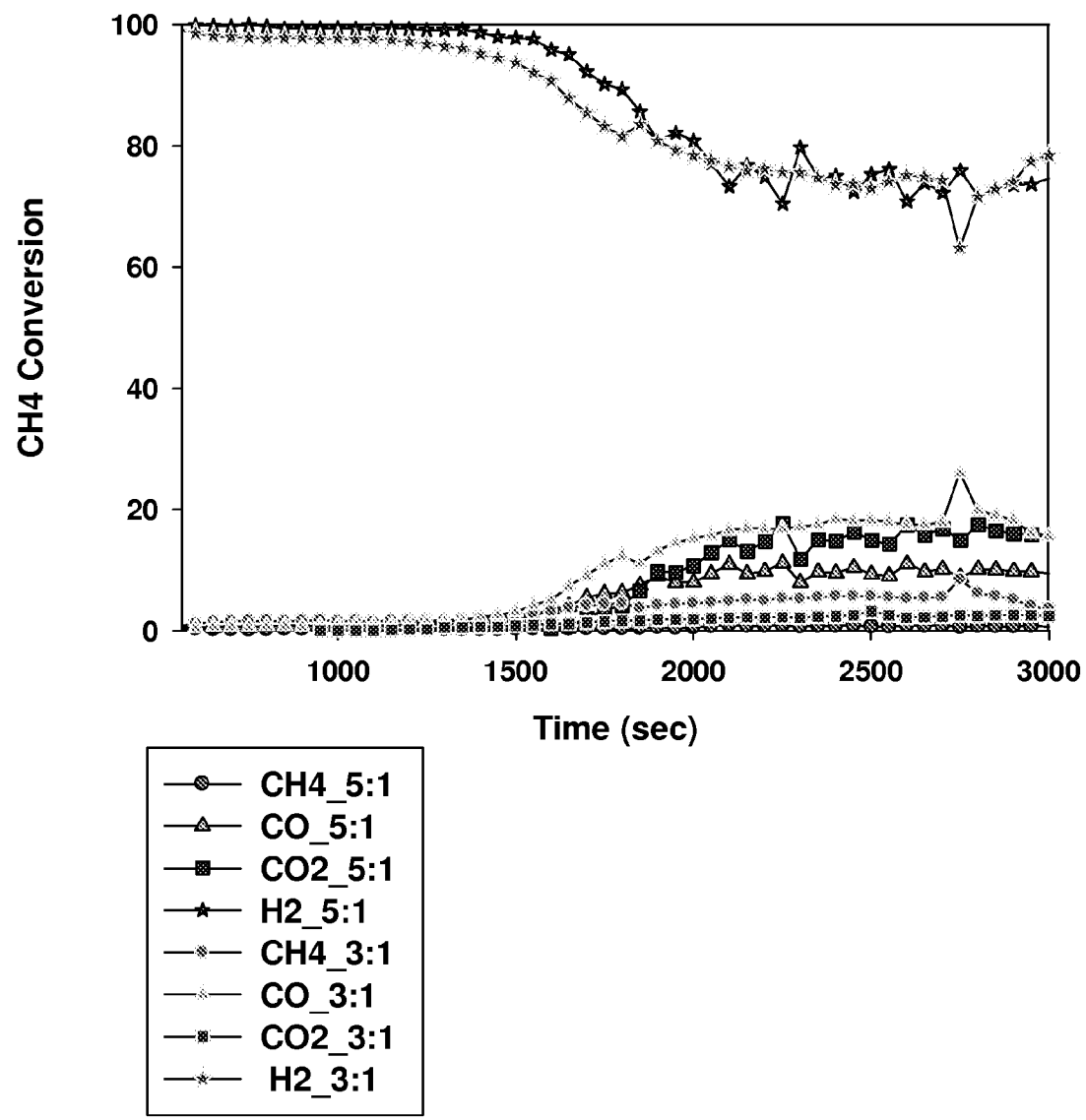
FIG. 32 shows the Effect of steam to carbon ratio on the composition of the product gas containing hydrogen, carbon monoxide and carbon dioxide.

With the decrease in steam to carbon ratio from 5:1 to 3:1 the purity of hydrogen is reduced from >99.5% to 98% in the prebreakthrough region of the curve shown in FIG. 32. Methane in the product stream also increases from a few ppm to 2%. For a steam to carbon ratio of 3:1 the CO and CO2 were found to be less than 1%.

Figure 33A:
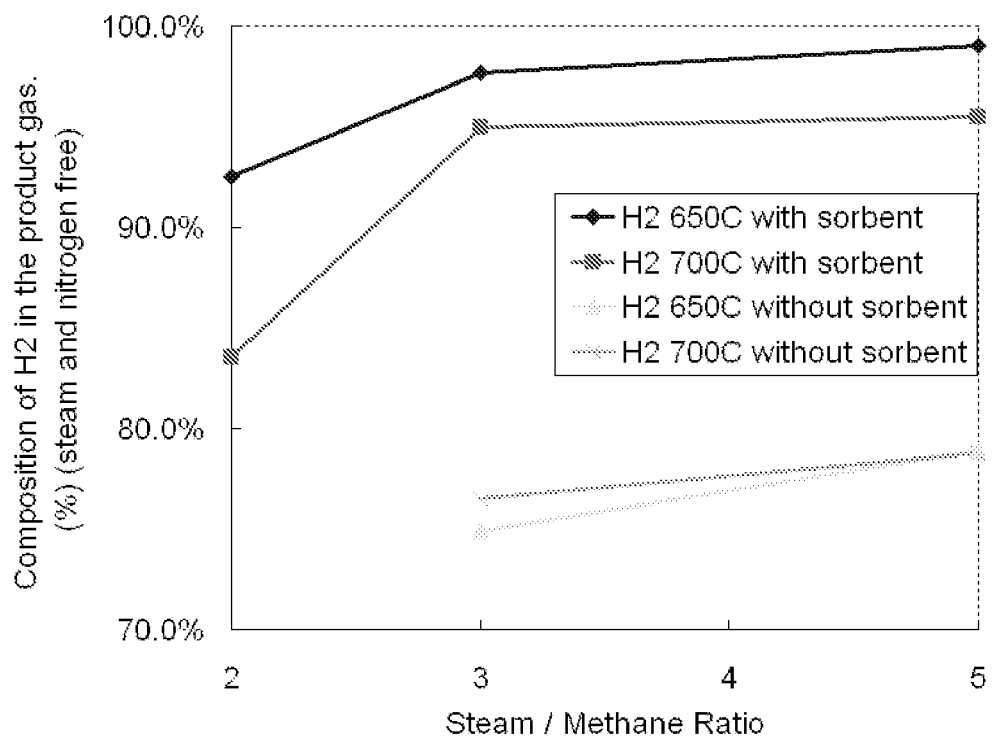
FIG. 33a shows the effect of temperature and S:C ration on $H_2$ purity.
Figure 33B:
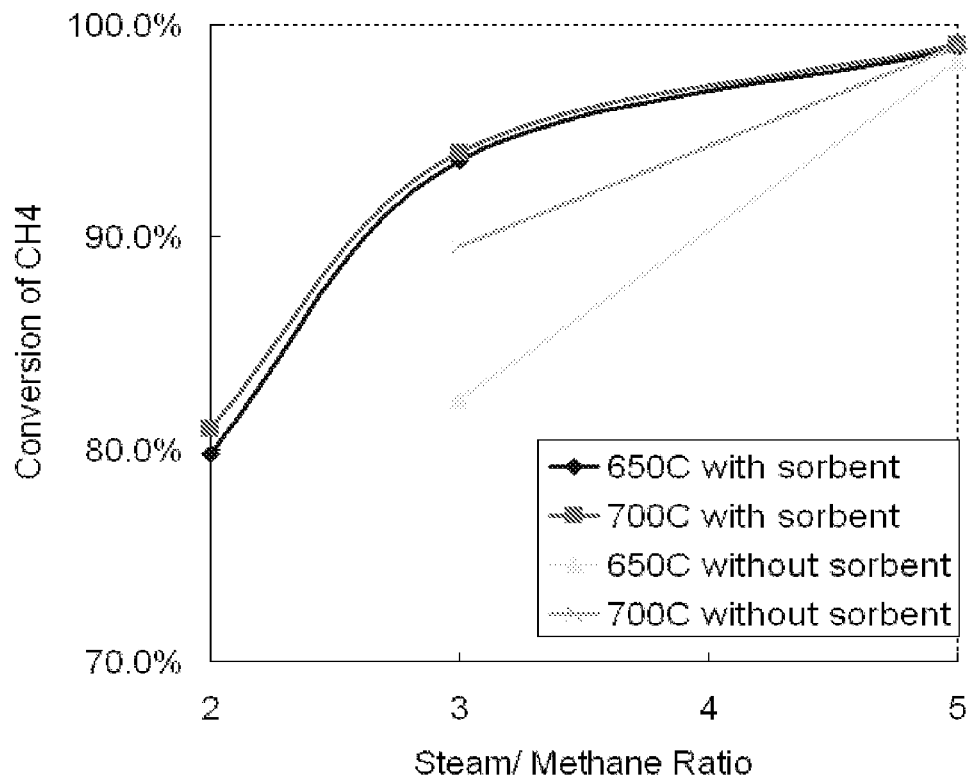
FIG. 33b shows the effect of temperature and S:C ration on $CH_4$ conversion.

The purity of H$_2$ from reforming of hydrocarbons is greatly enhanced by the presence of the sorbent as shown in FIG. 33(a). Purity of H$_2$ increases from <80% in the presence of the reforming catalyst alone to >90% in the presence of the catalyst and sorbent. Higher H$_2$ purity is obtained at 650 C than at 700 C due to the favorable thermodynamics of the CO$_2$ removal and the WGS reaction at 650 C. As shown in FIG. 33(b), the conversion of methane increases with the increase in S:C ratio for both temperatures of 650 and 700 C and the conversion is higher in the presence of sorbent and catalyst mixture when compared to catalyst alone.

Figures 34A, 34B:
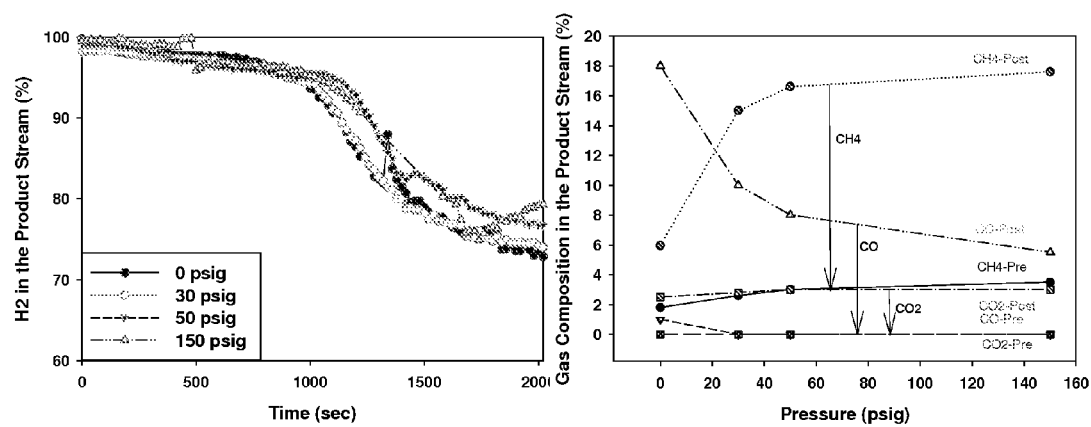
FIG. 34a shows the effect of pressure on hydrogen purity.
FIG. 34b shows the effect of pressure on prebreakthrough and postbreakthrough concentrations of impurities like CO, CO2 and CH4

The effect of pressure was also investigated on the combined reforming, water gas shift and carbonation reaction as shown in FIG. 34 and it was found that in the presence of the sorbent, high purity hydrogen with >95% purity was obtained even at high pressures of 150 psig. Methane concentration in the outlet gas was always maintained at below 4% and CO and CO2 concentrations were in the ppm level.

Sorbent Reactivity Studies
Choice of a Suitable Sorbent for the CLP

TABLE 1

Comparison in capture capacity

| Sorbent | CO$_2$ Capture Capacity (moles of CO$_2$/Kg sorbent) |
|---|---|
| Amine solution | 3.64 |
| CaO | 12.50 |
| Dolomite | 7.95 |
| Li$_4$SiO$_4$ | 6.14 |
| Hydrotalcite | 0.33 |
| NaOH/CaO sorbent | 3.00 |
| Amine sorbents | 2.00 |

Figure 35:
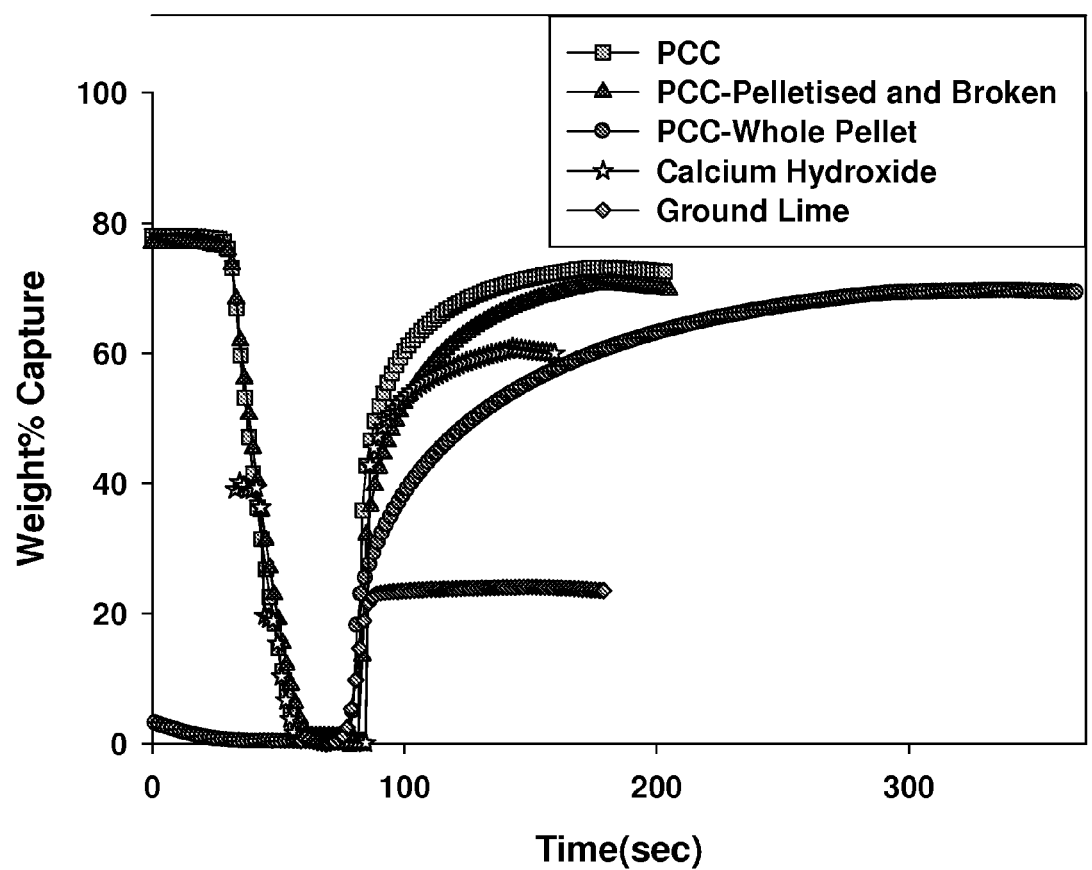
FIG. 35 is a Comparison in the $CO_2$ capture capacity of CaO sorbents obtained from different precursors.

The maximum theoretical CO$_2$ capture capacity of CaO is 17.86 moles/Kg or 0.785 g of CO$_2$/g of CaO (78.5%) while the actual CO$_2$ capacity of the sorbent used in the CLP is 12.5 moles CO$_2$/Kg of CaO over multiple cycles of reaction and regeneration. A comparison of the actual CO$_2$ capture capacities of various high temperature sorbents and solvents is listed in Table 1 and it can be seen that CaO has the maximum CO$_2$ capture capacity. This is very advantageous because it reduces the solids loading and solids transfer and also reduces the size of the reactor. A comparison of CaO sorbent from various precursors has been shown in FIG. 35 and it can be seen that the OSU patented Precipitated CaCO$_3$ sorbent (PCC) has the highest capacity due to its superior morphology, followed by the CaO obtained from calcium hydroxide sorbent. Although calcium hydroxide sorbent has a slightly lower capacity it is cheap when compared to the PCC sorbent and might be the more economical option.

Sorbent Recyclability Studies
Emerging Processes for Sorbent Pretreatment and Reactivation The regenerability of CaO sorbent has been the major draw back of high temperature calcium based CO$_2$ capture processes. CaO oxide sorbents are prone to sintering during to the regeneration step which is conducted at high temperatures. Over multiple cycles sintering progressively increases and reduces the CO$_2$ capture capacity of the sorbent. Sintering results in an increase in solid circulation and make up rate. Research has been conducted to develop methods to reduce the sintering of the sorbent. Pretreatment methods have been developed at the CANMET Energy Center which involve powdering the sorbent and preheating it in a nitrogen atmosphere but these do not completely restore sorbent activity.[22] A method of complete reactivation of the sorbent by hydrating the calcined sorbent has been developed at the Ohio State University. The complete reactivation of the sorbent during every cycle reverses the effect of sintering and the history of the number of cycles is completely lost. Hence, this process minimizes the amount of solids circulation in the system. Two modes of hydration have been investigated, namely ambient hydration with water and high temperature high pressure hydration. High pressure hydration does not require the cooling and reheating of the sorbent thereby reducing the parasitic energy consumption of the process. It is conducted at a high temperature of 600 C making it viable to use the exothermic energy of hydration for the energy required for dehydration. Experiments have been conducted at the lab, bench and sub-pilot scale and the complete regeneration of the sorbent has been observed for a number of cycles. ASPEN simulations have shown that with water hydration, the efficiency of the CLP is 57% which is the same as the state-of-the-art $H_2$ process, while with pressure hydration, the CLP efficiency is 64%.

Effect of Realistic Calcination and Reactivation of the Sorbent

Figure 36A:
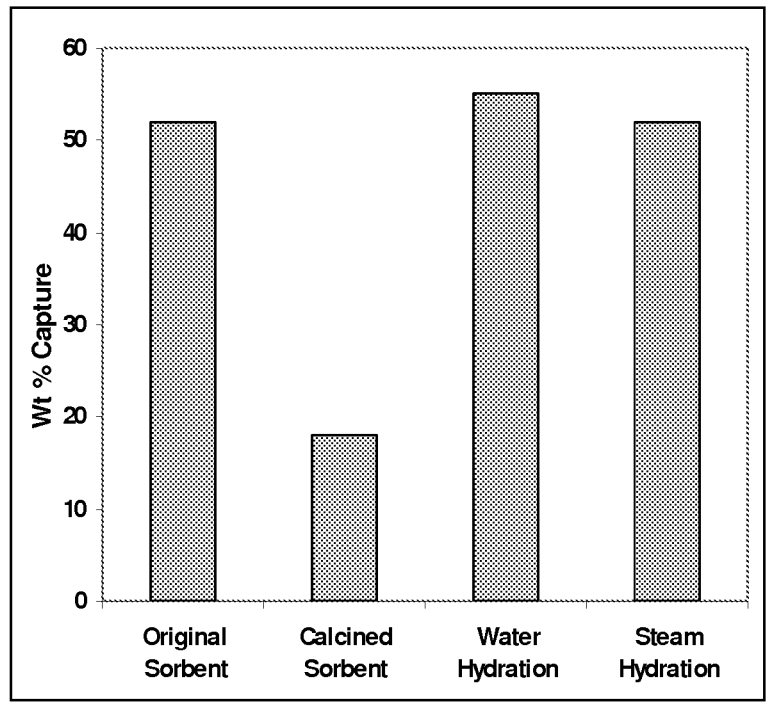
FIG. 36a presents the Effect of water and steam hydration.
Figure 36B:
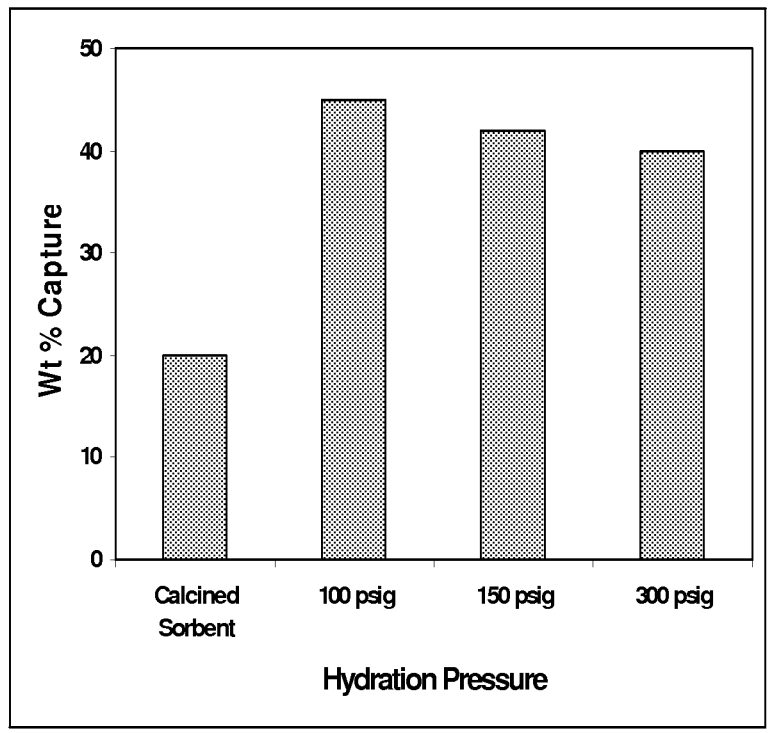
FIG. 36b presents the effect of Pressure hydration on the $CO_2$ capture capacity of lime sorbent obtained by calcination under realistic conditions

Bench scale hydration results in FIG. 36a show that the capture capacity of the sorbent calcined in realistic conditions increased from 30% (6.8 moles/Kg CaO) to >55% (12.5 moles/Kg CaO) on hydration with water. Hydration at atmospheric pressure, in the presence of steam at 150 C yielded a sorbent with 52 wt % (11.8 moles/Kg CaO) capture. FIG. 36b shows the effect of pressure hydration at 600 C for pressures ranging from 100 psig to 300 psig. It was found that the reactivity of the sorbent increases from 18% to 45% by pressure hydration at 600 C and 100 psig. The reactivity of the sorbent was found to increase with decreasing pressures while the extent of hydration remained the same at all pressures.

Process Evaluation of the Calcium Looping Process for High Purity Hydrogen Production with Simultaneous Carbon Dioxide and Sulfur Capture:

Effect of the Cogeneration of Electricity on the Efficiency of the Calcium Looping Process:

A thorough process analysis was conducted to determine the efficiency of hydrogen production from coal through the Calcium Looping Process. All the schemes for the Calcium Looping Process have been simulated using ASPEN Plus® software. The entire process from coal to hydrogen has been simulated for two different applications: production of high purity fuel cell grade hydrogen (99.999%) with the help of a PSA and the production of a 94-98% pure hydrogen stream without a PSA. For both the above mentioned schemes, the efficiency calculations have been conducted for a plant producing hydrogen as the final product and for a plant with cogeneration of electricity and hydrogen. In the process simulation where hydrogen is the only saleable product, all the energy produced in the process is used internally for the parasitic energy requirement. In the simulation of the process for the cogeneration of hydrogen and electricity, excess steam is produced in the process which is used to generate electricity in addition to the hydrogen product. All simulations under this section have been conducted for the production of 280 tonnes/day of hydrogen from Illinois #6 coal using a shell gasifier.

Production of Fuel Cell Grade Hydrogen Having a Purity of 99.999%—With a PSA

Figure 37:
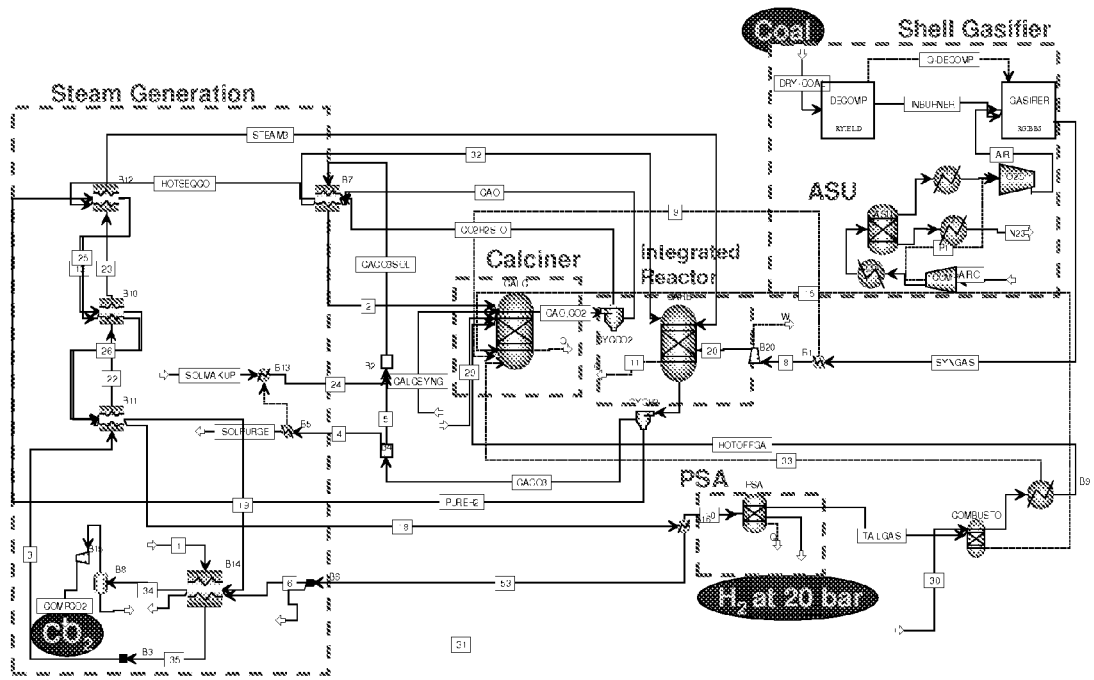
FIG. 37 presents an ASPEN simulation for the production of high purity hydrogen using the calcium looping process (in combination with a PSA)

Production of Hydrogen With Internal Heat Integration:

The ASPEN flow sheet for the Calcium Looping Process for fuel cell grade hydrogen production has been illustrated in FIG. 37. The entire process comprises of 5 major blocks: the gasifier and the ASU, the integrated reactor where the production and purification of hydrogen, and pollutants capture occur, the calciner where the calcium sorbent is regenerated and the sequestration ready $CO_2$ stream is produced, the PSA where high purity hydrogen is produced and the steam generation block where the heat from various streams is used to generate steam for the process. A Shell gasifier has been used to gasify 2190 tonnes/day of Illinois #6 coal in the presence of oxygen supplied by the Air Separation Unit. The properties of the coal have been illustrated in Table 2.

TABLE 2

Physical and Chemical Properties of Illinois #6 coal

| Proximate Analysis | Wt % (As-Received) | dry | Ultimate | Wt % |
|---|---|---|---|---|
| Moisture | 17.6 | | ASH | 10.8 |
| Fixed Carbon | | 45 | CARBON | 69 |
| Volatiles | | 44.2 | HYDROGEN | 4.9 |
| Ash | | 10.8 | NITROGEN | 1 |
| | | | SULFUR | 4.3 |
| HHV (Btu/lb) | 10,300 | 12,500 | OXYGEN | 10 |

The Shell gasifier produces 847,200 cum/day of syngas at a temperature of 1811K and a pressure of 36 bar. Due to the high content of sulfur in the coal, the syngas contains 1.15% of H2S and 848 ppm of COS. Since the Calcium Looping Process is capable of insitu sulfur capture during the production of hydrogen, it can handle high sulfur coals effectively. The composition of syngas produced at the outlet of the gasifier is listed in Table 3. 88.7 mole % of the syngas produced at the outlet of the gasifier is fed to the integrated reactor for the production of high purity hydrogen while 11.3 mole % of the syngas is combusted in the calciner to provide the energy required for the endothermic calcination reaction.

TABLE 3

Syngas exiting the Shell gasifier (for the calcium looping process in combination with a PSA):

| SYNGAS | Mole % |
|---|---|
| $H_2O$ | 2.5 |
| $N_2$ | 4.1 |
| $O_2$ | 0 |
| $H_2$ | 27.6 |
| CO | 61.3 |
| $CO_2$ | 2.2 |
| Ar | .8 |
| COS (ppm) | 848 |
| $H_2S$ | 1.15 |
| $CH_4$ | .1 |
| Temperature (K) | 1811 |
| Pressure (bar) | 36 |
| Mass Flow Rate (Kg/hr) | 177038 |

The hot syngas is cooled in a radiant heater and is fed to the integrated reactor along with high temperature and high pressure steam (steam to carbon ratio=3:1) and PCC-calcium oxide sorbent. In the integrated reactor, hydrogen production, purification and sulfur removal are achieved by the integrated water gas shift reaction, carbonation and sulfidation of the calcium oxide sorbent at a temperature of 600 C and pressure of 20 bar. The hydrogen rich product stream is then further purified in a PSA to produce 99.999% hydrogen which can be used either in hydrogen fuel cells or for the production of fuels and chemicals. The spent sorbent which is separated from the hydrogen product in a cyclone, is regenerated in the calciner at 850 C to produce a sequestration ready $CO_2$ stream. At this stage, 8% of the spent sorbent is purged and a make up of PCC sorbent is added to maintain the high reactivity of the sorbent mixture towards $CO_2$ and sulfur capture. In this process, a pure hydrogen stream is produced at a high pressure of 20 bar and the $CO_2$ is compressed to a pressure of 2000 psi for transportation to the sequestration site. A calcium to carbon ratio of 1.3 is used to achieve almost 100% carbon and sulfur capture and sequestration from coal. This process leads to the production of 280 tonnes/day of hydrogen with an efficiency of 63% from coal.

Cogeneration of Hydrogen and Electricity:

The process layout for this mode of operation is similar to the previous case where hydrogen is the only product obtained. In this scenario, for the cogeneration of hydrogen and electricity, 2463 tonnes/day of coal is used for the production of 280 tonnes/day of hydrogen. In this case, all the energy required for the calcination of the sorbent is supplied by the combustion of the syngas in the calciner. The heat produced in the carbonation reactor through the exothermic water gas shift and carbonation reactions is used to produce high temperature and high pressure steam which is used to generate electricity. 280 tonnes/day of hydrogen is produced with an efficiency of 55.6% and 81MW electricity is produced with an efficiency of 10.9% from coal.

The two scenarios for the production of hydrogen from coal by the Calcium Looping Process followed by a Pressure Swing Absorber have been summarized in Table 4:

TABLE 4

Summary of Hydrogen from Coal (for calcium looping process in combination with a PSA)

|  | Hydrogen | Hydrogen and electricity |
|---|---|---|
| Coal feed (tonnes/day) | 2190 | 2463 |
| Carbon Capture (%) | 100 | 100 |
| Hydrogen (tonnes/day) | 280 | 280 |
| Net Power (MW) | — | 81 |
| Overall Efficiency (% HHV) | 62.3 | 66.5 |

Production of Hydrogen Having a Purity of 94-98%—Without a PSA

Figure 38:
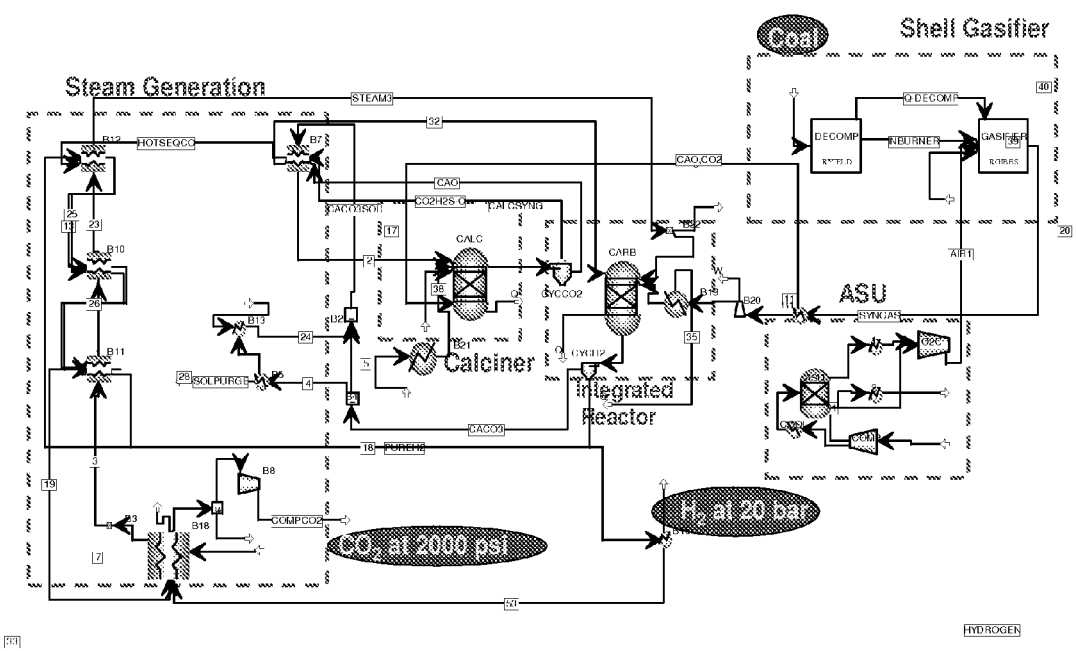
FIG. 38 presents an ASPEN simulation for the production of high purity hydrogen using the calcium looping process

Production of Hydrogen With Internal Heat Integration:

The ASPEN flow sheet for the Calcium Looping Process for 94-98% pure hydrogen has been illustrated in FIG. 38. The process comprises of 4 blocks: the gasifier and the ASU, the integrated reactor where the production and purification of hydrogen, and contaminant capture occur, the calciner where the calcium sorbent is regenerated and the sequestration ready $CO_2$ stream is produced and the steam generation block where the heat from various streams is used to generate steam for the process. A Shell gasifier has been used to gasify 2190 tonnes/day of Illinois #6 coal in the presence of oxygen supplied by the Air Separation Unit.

The Shell gasifier produces syngas at a temperature of 1811K and a pressure of 36 bar. Due to the high content of sulfur in the coal, the syngas contains 1.15% of H2S and 848 ppm of COS. Since the Calcium Looping Process is capable of insitu sulfur capture during the production of hydrogen, it can handle high sulfur coals effectively. The composition of syngas produced at the outlet of the gasifier is listed in Table 5. 81% of the syngas produced at the outlet of the gasifier is fed to the integrated reactor for the production of high purity hydrogen while 19% of the syngas is combusted in the calciner to provide the energy required for the endothermic calcination reaction.

TABLE 5

Syngas exiting the Shell gasifier(for the case without the PSA):

| SYNGAS | Mole % |
|---|---|
| $H_2O$ | 2.5 |
| $N_2$ | 4.1 |
| $O_2$ | 0 |
| $H_2$ | 27.6 |
| CO | 61.3 |
| $CO_2$ | 2.2 |
| Ar | .8 |
| COS (ppm) | 848 |
| $H_2S$ | 1.15 |
| $CH_4$ | .1 |
| Temperature (K) | 1811 |
| Pressure (bar) | 36 |
| Mass flow rate (Kg/hr) | 177120 |

The hot syngas is cooled in a radiant heater and is fed to the integrated reactor along with high temperature and high pressure steam(steam to carbon ratio=3:1) and PCC-calcium oxide sorbent. In the integrated reactor, hydrogen production, purification and sulfur removal are achieved by the integrated water gas shift reaction, carbonation and sulfidation of the calcium oxide sorbent at a temperature of 600 C and pressure of 20 bar. The hydrogen rich product stream is then further purified in a PSA to produce 99.99999% hydrogen which can be used either in hydrogen fuel cells or for the production of fuels and chemicals. The spent sorbent which is separated from the hydrogen product in a cyclone, is regenerated in the calciner at 850 C to produce a sequestration ready $CO_2$ stream. At this stage, 8% of the spent sorbent is purged and a make up of PCC sorbent is added to maintain the high reactivity of the sorbent mixture towards $CO_2$ and sulfur capture. In this process, the pure hydrogen stream is produced at a high pressure of 20 bar and the $CO_2$ is compressed to a pressure of 2000 psi for transportation to the sequestration site. A calcium to carbon ratio of 1.3 is used to achieve almost 100% carbon and sulfur capture and sequestration from coal. This process also leads to the production of 280 tonnes/day of hydrogen with an efficiency of 63% from coal.

Cogeneration of Hydrogen and Electricity:

The process layout for this mode of operation is similar to the previous case where hydrogen is the only product obtained. In this scenario, for the cogeneration of hydrogen and electricity, 2420 tonnes/day of coal is used for the production of 280 tonnes/day of hydrogen. In this case, all the energy required for the calcination of the sorbent is supplied by the combustion of the syngas in the calciner. The heat produced in the carbonation reactor through the exothermic water gas shift and carbonation reactions is used to produce high temperature and high pressure steam which is used to generate electricity. 280 tonnes/day of hydrogen is produced with an efficiency of 57.45% and 67.56 MW electricity is produced with an efficiency of 8.5% from coal.

The two scenarios for the production of hydrogen from coal by the Calcium Looping Process have been summarized in Table 6:

TABLE 6

Summary of Hydrogen from Coal (for the case without the PSA)

|  | Hydrogen | Hydrogen and electricity |
|---|---|---|
| Coal feed (tonnes/day) | 2190 | 2420 |
| Carbon Capture (%) | 100 | 100 |
| Hydrogen (tonnes/day) | 280 | 280 |
| Net Power (MW) | 0 | 67.56 |

TABLE 6-continued

Summary of Hydrogen from Coal (for the case without the PSA)

|  | Hydrogen | Hydrogen and electricity |
|---|---|---|
| Overall Efficiency (% HHV) | 63 | 66.3 |

On comparing the case in the presence of the PSA with the case where the PSA is eliminated it can be seen that for a plant producing only hydrogen the efficiency of the process is the same in both cases. For the cogeneration of hydrogen and electricity too, the overall efficiency of the process is similar in the presence of the PSA and in the absence of the PSA but the hydrogen and electricity generation efficiency vary in the two cases. In the presence of the PSA the hydrogen generation efficiency(55.6%) is lower than in the absence of the PSA(57.45%) but more electricity is produced in the presence of the PSA(81 MW) than in the absence of the PSA (67.5 MW).

A comparison in the efficiencies obtained for the integration of the calcium looping process with different gasifiers is shown below. The major factors influencing the efficiency are the composition of the Syngas obtained from the different gasifiers, the conditions of the Syngas(temperature and pressure) and the efficiency of the gasifiers.

|  | Hydrogen | Hydrogen and electricity |
|---|---|---|
| Shell | 62.3% | 66% (81 MW) |
| Lurgi (BGL) | 55% | 56 (32 MW) |
| GE | 60% | 63.6 (104.2 MW) |

A comparison in the efficiencies obtained for different steam to carbon ratios used in the combined water gas shift and carbonation reaction is given below.

|  | Hydrogen | Hydrogen and electricity |
|---|---|---|
| 3:1 | 60% | 63.6 (104.2 MW) |
| 2:1 | 59.6% | 61.5 (86 MW) |
| 1:1 | 59% | 60 (96.8 MW) |

Figure 39:
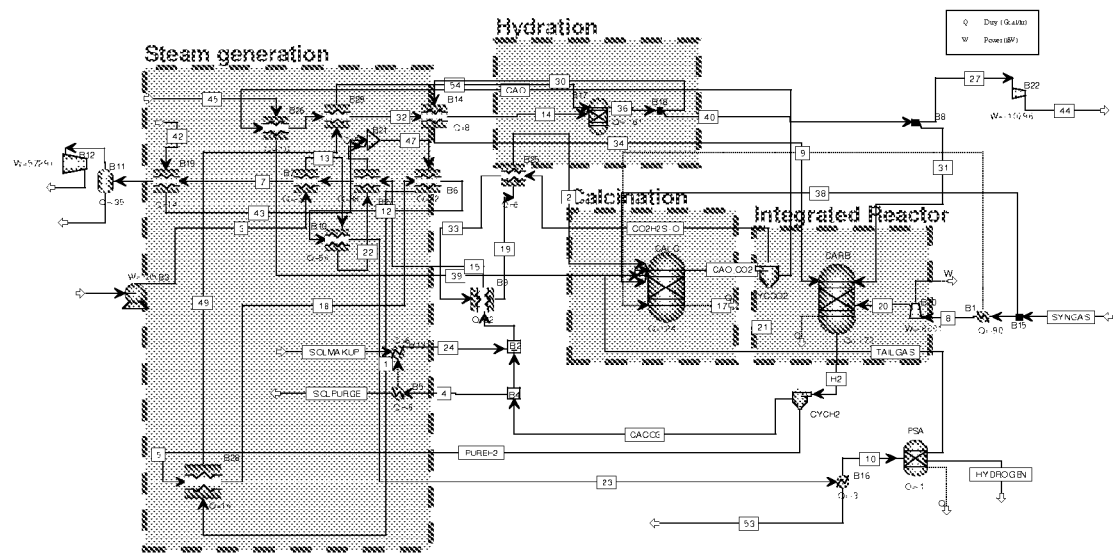
FIG. 39 presents an ASPEN simulation of the calcium looping process with sorbent reactivation by hydration.

The calcium looping process with sorbent reactivation by hydration was also simulated using ASPEN plus as shown in FIG. 39. It was found that when the hydration is conducted at high temperatures of 600 C and steam pressures of >6 bar, the efficiency of the coal to hydrogen process is 62-64% which is much higher than the 56% efficiency for the conventional process using amine solvents. The addition of hydration to the calcium looping process does not increase the parasitic energy consumption of the process significantly.

Calcium Looping Process—Process Flow Diagrams and Heat Integration Strategies

Figure 40:
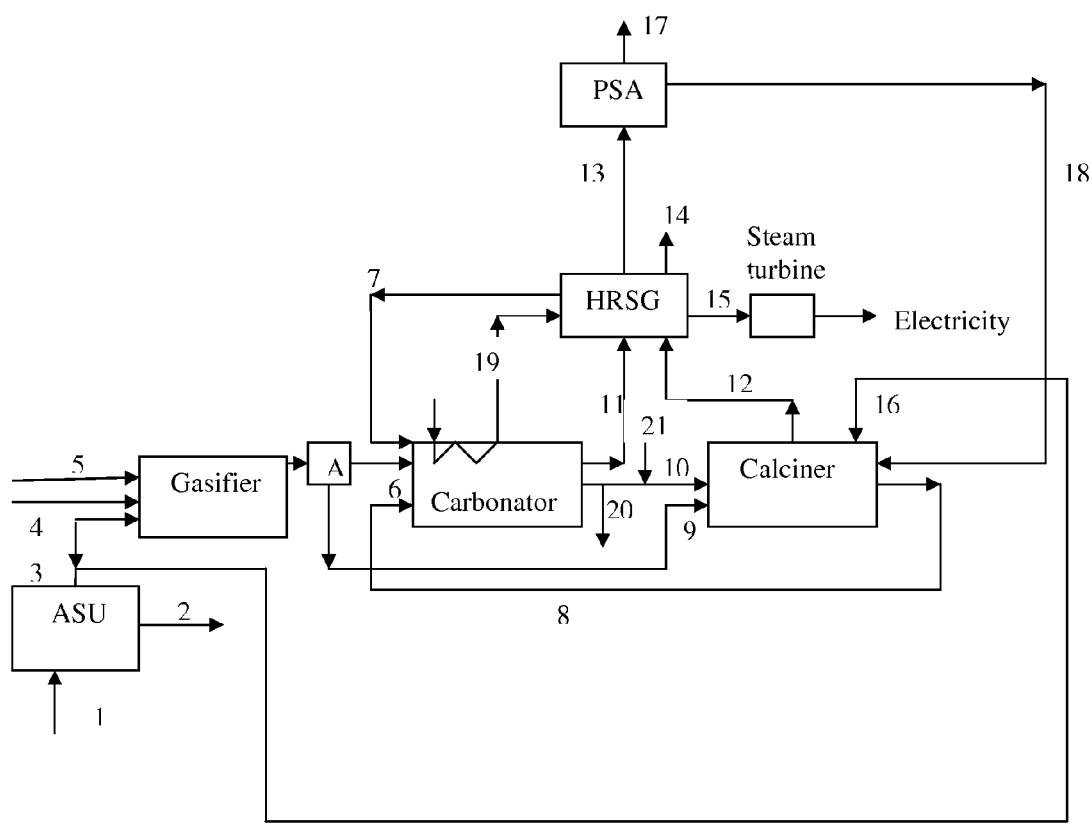
FIG. 40 illustrates the calcium looping process for the production of high purity hydrogen and electricity.

FIG. 40 illustrates the calcium looping process for the production of high purity hydrogen and electricity. Air (Stream 1) is fed to the Air Separation Unit to produce pure oxygen (Stream 2) which is sent to the gasifier (Stream 3) and the calciner (Stream 16) and another stream (Stream 2) containing predominantly nitrogen. Coal (Stream 5) and the required amount of steam (Stream 4) depending on the type of gasifier used are also fed to the gasifier. The Syngas produced from the gasifier is then cooled to 600 C and depressurized to 20 atm in block A and is sent to the carbonator to produce more hydrogen. A part of the Syngas from the gasifier is sent to the calciner to provide energy for the calcination reaction (Stream 8). The calcined calcium oxide sorbent (Stream 8) exiting the calciner is fed into the carbonator to remove the CO2 produced by the water gas shift reaction and aid in the production of high purity hydrogen. Steam (Stream 7) is also fed into the carbonator for the water gas shift reaction. The pure hydrogen produced in the carbonator is at 600 C (Stream 11) and is cooled down in a heat recovery steam generator and fed to a Pressure Swing Absorption unit (PSA) (Stream 1). Since the purity of hydrogen fed to the PSA is very high (97%) the foot print of the PSA as well as the energy consumed by the PSA is very small. Fuel cell grade hydrogen is produced from the PSA having a purity of 99.999% (Stream 17). The spent sorbent from the carbonator (Stream 10) is sent to the calciner where it is regenerated and the active calcium oxide sorbent is sent back to the carbonator (Stream 8). The calcium sorbent is prone to sintering during the high temperature calcination reaction which reduces the activity of the sorbent over multiple cycles. In addition to this dead burnt sorbent, the calcium sulfide which is formed in the carbonator during H2S capture does not get completely converted to calcium oxide during the calcination reaction and hence its concentration keeps increasing with the number of cycles. In order to maintain the average activity of the sorbent at a constant value over multiple cycles and decrease the amount of solids in circulation, a purge stream of the sorbent is removed (Stream 20) after the carbonator and fresh sorbent is injected into the system before the calciner (Stream 21). The tail gas from the PSA (Stream 18) is also fed to the directly heated calciner where it is combusted along with the Syngas (Stream 9) in oxygen (Stream 16) to supply energy for the calcination reaction. The $CO_2$ produced from the calciner (Stream 12) which is at a temperature of >850 C is cooled down to ambient temperature and is pressurized for transportation and sequestration. The heat obtained from cooling the CO2 stream and the hydrogen stream before it is sent to the PSA is used to generate steam. The exothermic heat obtained from the combined water gas shift and carbonation reaction is used to produce additional steam. A portion of this steam is used for the water gas shift reaction and the remaining amount is used to produce electricity in a steam turbine. A portion of this electricity is used to for the parasitic energy requirement of the process for the units like the ASU, PSA, etc. Hence this process does not require an external source of energy or steam and is self sufficient.

Figure 41:
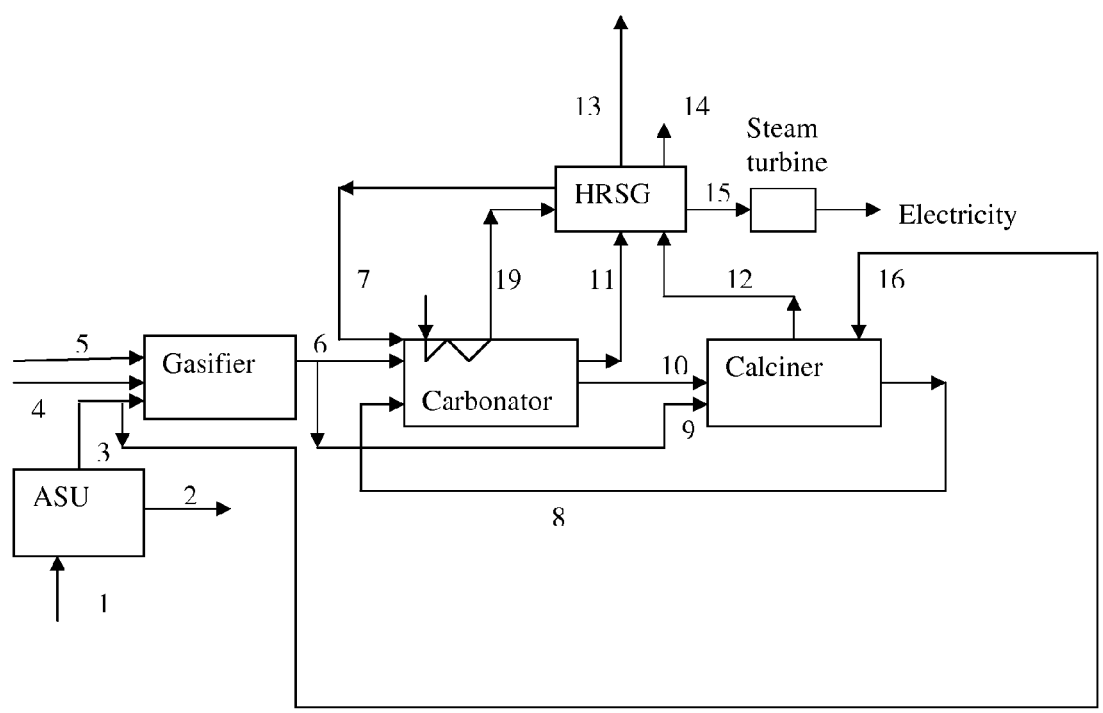
FIG. 41 depicts the calcium looping process for the production of >95% purity hydrogen which finds applications in the production of chemicals and for the hydro treating of heavy hydrocarbons in refineries.

FIG. 41 depicts the calcium looping process for the production of >95% purity hydrogen which finds applications in the production of chemicals and for the hydro treating of heavy hydrocarbons in refineries. By operating at a high pressure of >50 psig the calcium looping process is capable of producing hydrogen with a purity of >95% (Stream 13) in the presence and absence of a catalyst. In this scenario, the energy for the calciner is supplied by direct burning of Syngas with oxygen from the air separation unit.

Figure 42:
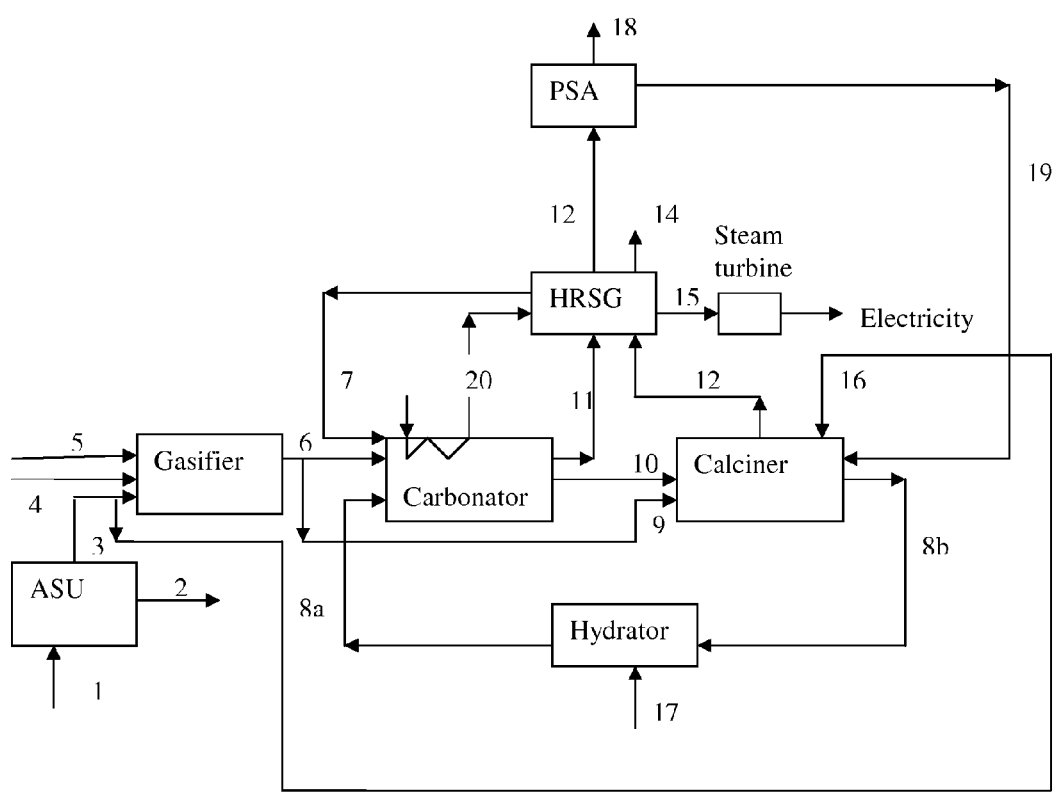
FIG. 42 illustrates the calcium looping process for the production of high purity hydrogen with the integration of a sorbent reactivation mechanism to improve the activity of the sorbent during every cycle.

FIG. 42 illustrates the calcium looping process for the production of high purity hydrogen with the integration of a sorbent reactivation mechanism to improve the activity of the sorbent during every cycle. The regenerated sorbent from the calciner (Stream 8b) is reactivated by hydration before it is circulated back to the carbonator (Stream 8a). The hydration could be done at higher temperatures of 150-400 C using steam or at ambient temperature using water. The hydration reaction aids in reactivating the dead burnt sorbent produced at the outlet of the calciner and hence in reducing the purge and make of solids required for the process. Since it improves the average activity of the sorbent the calcium to carbon ratio required for the carbonation reaction can also be reduced and hence the amount of solids in circulation can be reduced. The calcium hydroxide produced in the hydrator may be added to the carbonator directly. Since the carbonator is operated at 600 C the calcium hydroxide will calcine to give steam which will then be consumed in the water gas shift reaction. Hence the external addition of steam to the carbonator can be reduced or eliminated (for a stoichiometric steam to carbon ratio).

Figure 43:
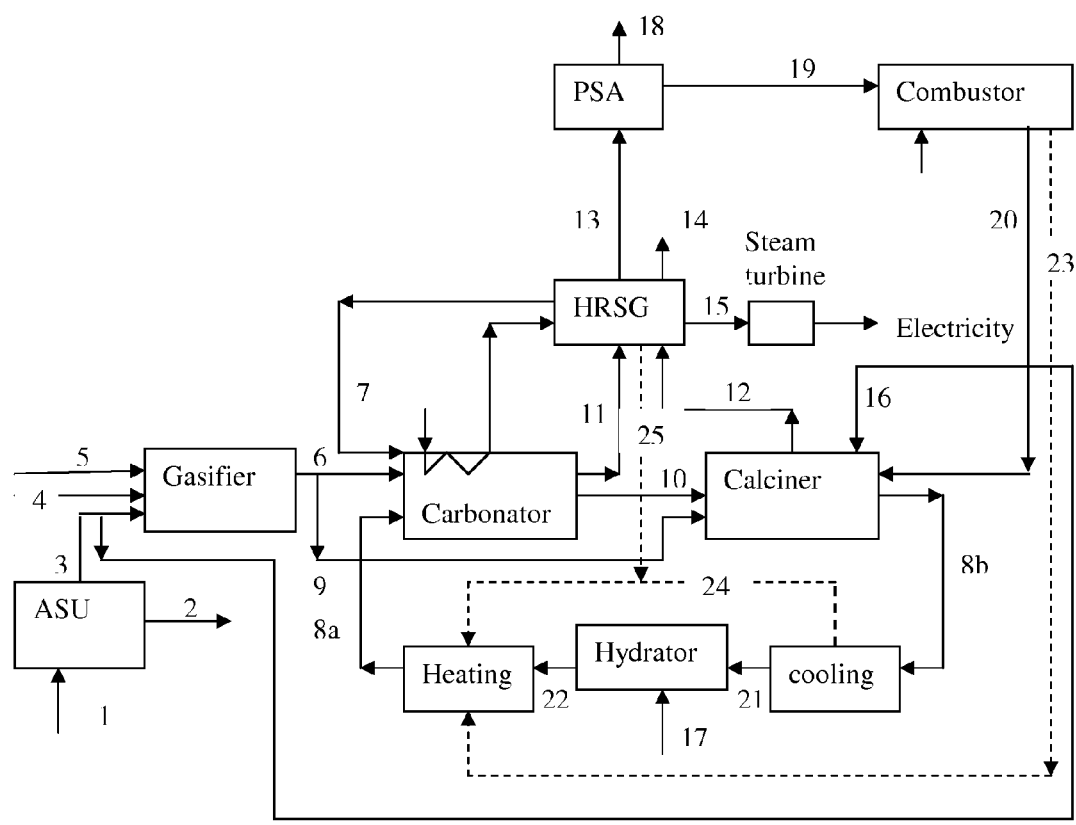
FIG. 43 shows the heat integration for the calcium looping process.

FIG. 43 shows the heat integration for the calcium looping process. The hot solids from the calciner (Stream 8b) are cooled down and fed to the hydrator. The energy obtained from cooling the solids (Stream 24) in addition to the energy obtained from the combustion of the PSA tail gas (Stream 23) is used to heat the solids back to 600 C to be fed into the carbonator (Stream 8a). In addition to this, the energy (Stream 25) obtained from cooling the CO2, hydrogen or the exothermic energy of carbonation may also be used to raise the temperature of the solids before they enter the carbonator.

Figure 44:
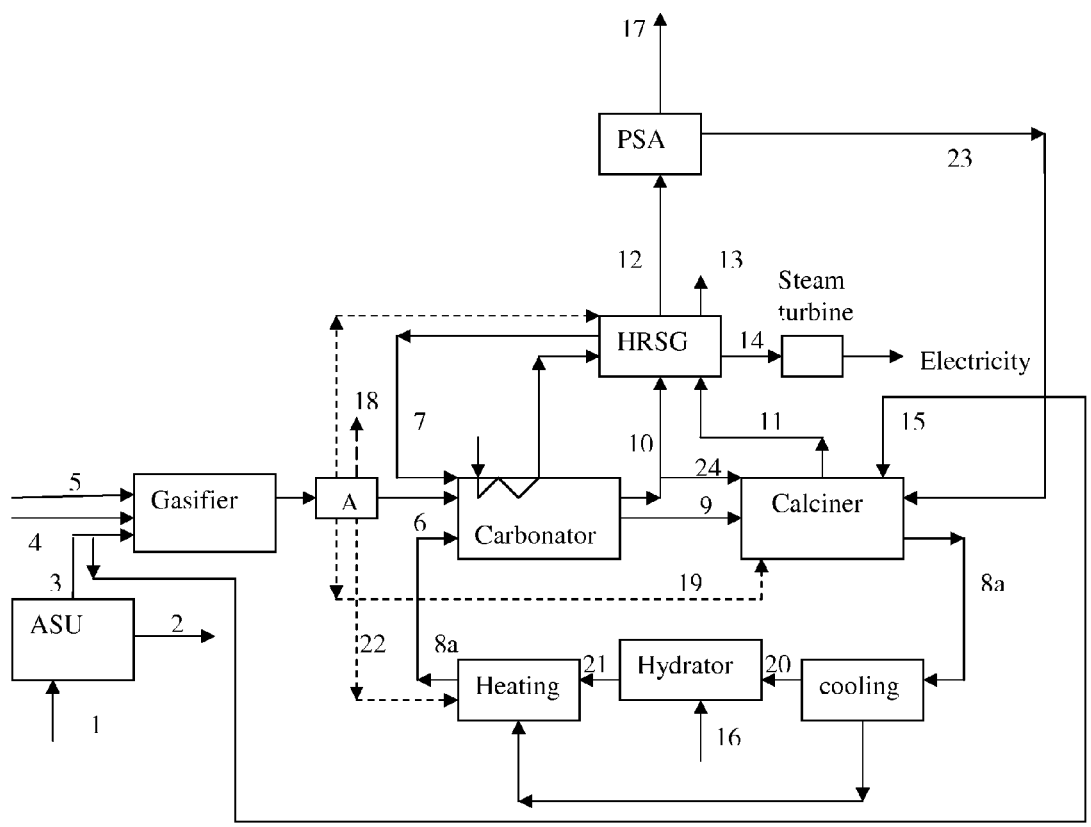
FIG. 44 illustrates the case for the production of hydrogen in which the energy for calcination is obtained by the direct combustion of a part of the hydrogen product (Stream 24) with oxygen or air.

FIG. 44 illustrates the case for the production of hydrogen in which the energy for calcination is obtained by the direct combustion of a part of the hydrogen product (Stream 24) with oxygen or air. The tail gas from the PSA (Stream 23) is also combusted in the calciner to provide energy for calcination. The Syngas obtained from the gasifier is cooled down to 600 C and sent to the carbonator. The energy obtained from the cooling of Syngas (block A) may be used for heating the hydrate (Stream 21) to 600 C before being sent to the carbonator, for the calcination of spent lime or for the generation of steam.

Figure 45:
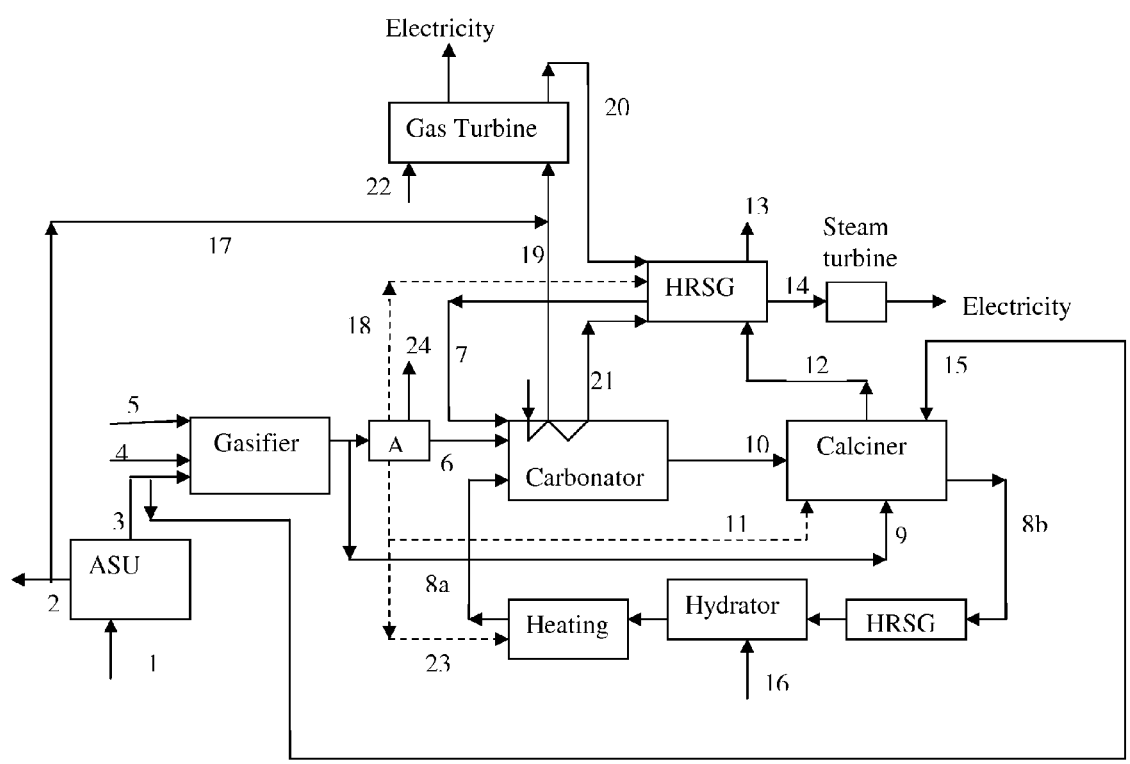
FIG. 45 depicts the scenario for the production of electricity through the calcium looping process.

FIG. 45 depicts the scenario for the production of electricity through the calcium looping process. Coal (Stream 5) is fed into the gasifier with steam (Stream 4) and oxygen (Stream 3). Syngas from the gasifier is cooled to 600 C and depressurized in block A and fed into the carbonator. The energy from the cooling of the Syngas may be routed to either the calciner (Stream 11), to heat the hydrate before it enters the carbonator (Stream 23) or to make steam (Stream 18). Steam (Stream 7) and calcium hydroxide (Stream 8a) are also fed to the carbonator. The exothermic energy from the carbonation reaction is used to generate electricity in a steam turbine. The hydrogen produced (Stream 19) is then mixed with nitrogen (Stream 17) from the ASU and sent to a gas turbine. The nitrogen provides mass to the hydrogen fuel which is then combusted in the turbine with air. The flue gas(Stream 20) produced is then routed to a steam turbine to generate additional electricity. The spent sorbent (Stream 10) from the carbonator is fed to the calciner along with a fraction of Syngas (Stream 9) which provides the energy for calcination. The hot CO2 (Stream 12) from the calciner is cooled to generate steam which is used in a steam turbine to generate electricity. The calcined sorbent (Stream 8b) is then cooled down to ambient temperature and hydrated to reactivate the sorbent. The calcium hydroxide (Stream 8a) from the hydrator is heated to 600 C and fed back to the carbonator.

As shown in FIG. 45 the hydration may be carried out at ambient temperatures in which case the sorbent is cooled down to ambient temperature and the hydration is carried out at atmospheric pressures. By using this scheme the efficiency of the hydrogen production process from coal using a GE gasifier is 58% which is similar to the efficiency obtained in a tradition coal to hydrogen process using solvent technology. In order to improve this efficiency and reduce the parasitic energy consumption the Ohio State University has developed a pressure hydration process in which the sorbent is hydrated at high temperatures of 400-640 C. Hydration can be achieved at these temperatures by operating at high pressures such that the partial pressure of steam is greater than 5 atms. Experimental results have shown that by hydration at 600 C and 10 or 20 atms pressure; more than 90% of the sorbent is hydrated. The reactivity of the sorbent was also found to be very high and very similar to the sorbent obtained from atmospheric hydration. By integrating pressure hydration into the coal to hydrogen process the efficiency of the process was found to increase to 64% which is much higher than the efficiency of the traditional process. In order to integrate the pressure hydration process into the coal to hydrogen process, the sorbent from the calciner is cooled to 600 C and fed to the pressure hydrator. The hydrated sorbent is at a temperature of 600 C and hence at the exit of the pressure hydrator when the sorbent is depressurized a part of it flash calcines and the mixture of solids containing Ca(OH)2, CaO, CaS, CaCl2, CaCO3 is fed to the carbonator. Another mode of operation would be to use a specialized reactor for the hydrator in which the high pressure hydrator reactor is surrounded by an atmospheric pressure dehydration reactor. In this configuration the pressure hydrated sorbent from the hydrator is conveyed to the dehydration reactor surrounding the hydration reaction which is at atmospheric pressure. Since the sorbent is at 600 C and atmospheric pressure it will calcine to form CaO. The exothermic energy from the hydration reaction will be sufficient to supply the endothermic energy required for the dehydration reaction and since the dehydration reactor surrounds the hydration reactor the heat transfer will be very efficient and high reactivity CaO will be produced at 600 C which can be directly fed to the carbonator. These configurations eliminate the cooling and heating of the solids required in atmospheric pressure hydration and hence result in a reduction in the parasitic energy requirement.

Figure 46:
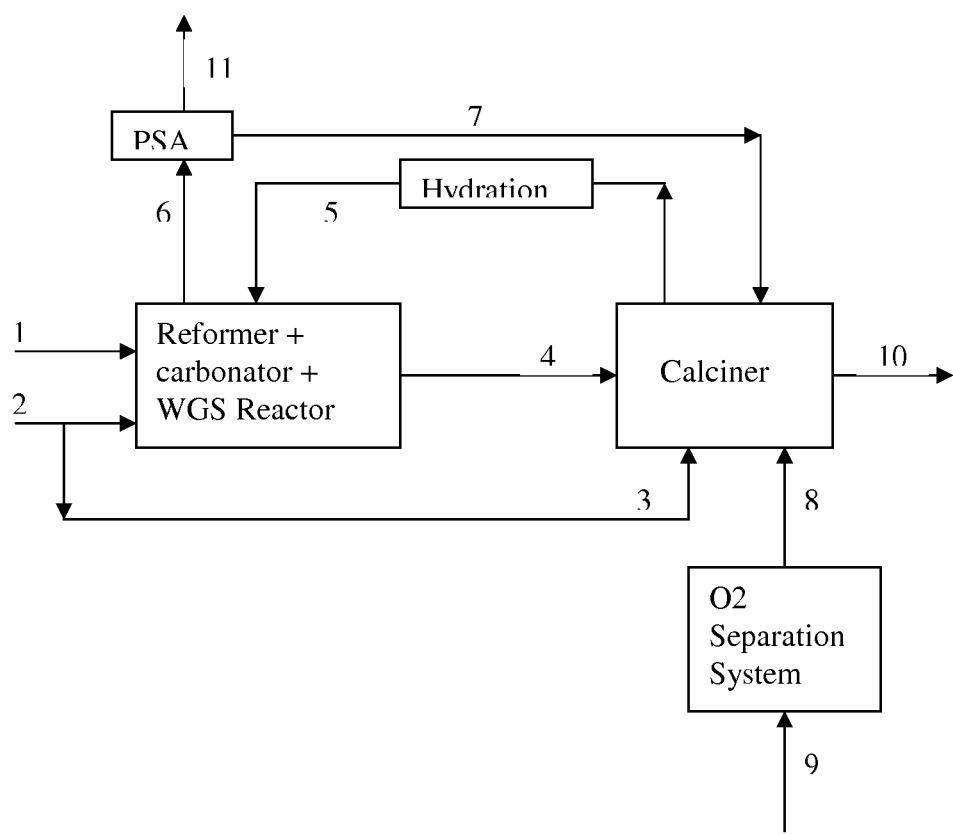
FIG. 46 illustrates the calcium looping process applied to the reforming of natural gas or C1 to C4 hydrocarbons.

FIG. 46 illustrates the calcium looping process applied to the reforming of natural gas or C1 to C4 hydrocarbons. This process obviates the need for water gas shift reactors and catalysts and combines the reforming, water gas shift and carbonation reaction in a single step to produce high purity hydrogen. In addition to this advantage, the carbonation reaction also provides energy for the endothermic reforming reaction thereby making it heat neutral. By making the reforming reaction heat neutral the temperature of operation is also reduced from >990 C to 600-605 C. Natural gas or a C1 to C4 hydrocarbons stream (Stream 2) is fed into the reformer along with steam (Stream 1) and calcium oxide (Stream 5) from the calciner. The product gas (Stream 6) which contains >90% hydrogen is then sent to a Pressure Swing Absorber which produces fuel cell grade hydrogen (Stream 11). The tail gas (Stream 7) from the PSA is sent to the calciner to supply energy for the regeneration of the spent sorbent from the reformer. A portion of the natural gas (Stream 3) is sent to the calciner to supply the additional energy required. The fuel in the calciner is combusted using oxygen (Stream 8) which may be produced in an ASU or using oxygen separation membranes. The pure CO2 stream (Stream 10) produced from the calciner is pressurized and transported for sequestration. The calcined sorbent (Stream 5) is then fed back to the reformer for additional removal of CO2. The sorbent from the calciner may be subjected to hydration before being fed to the carbonator in order to improve the reactivity of the sorbent for CO2 removal.

Figure 47:
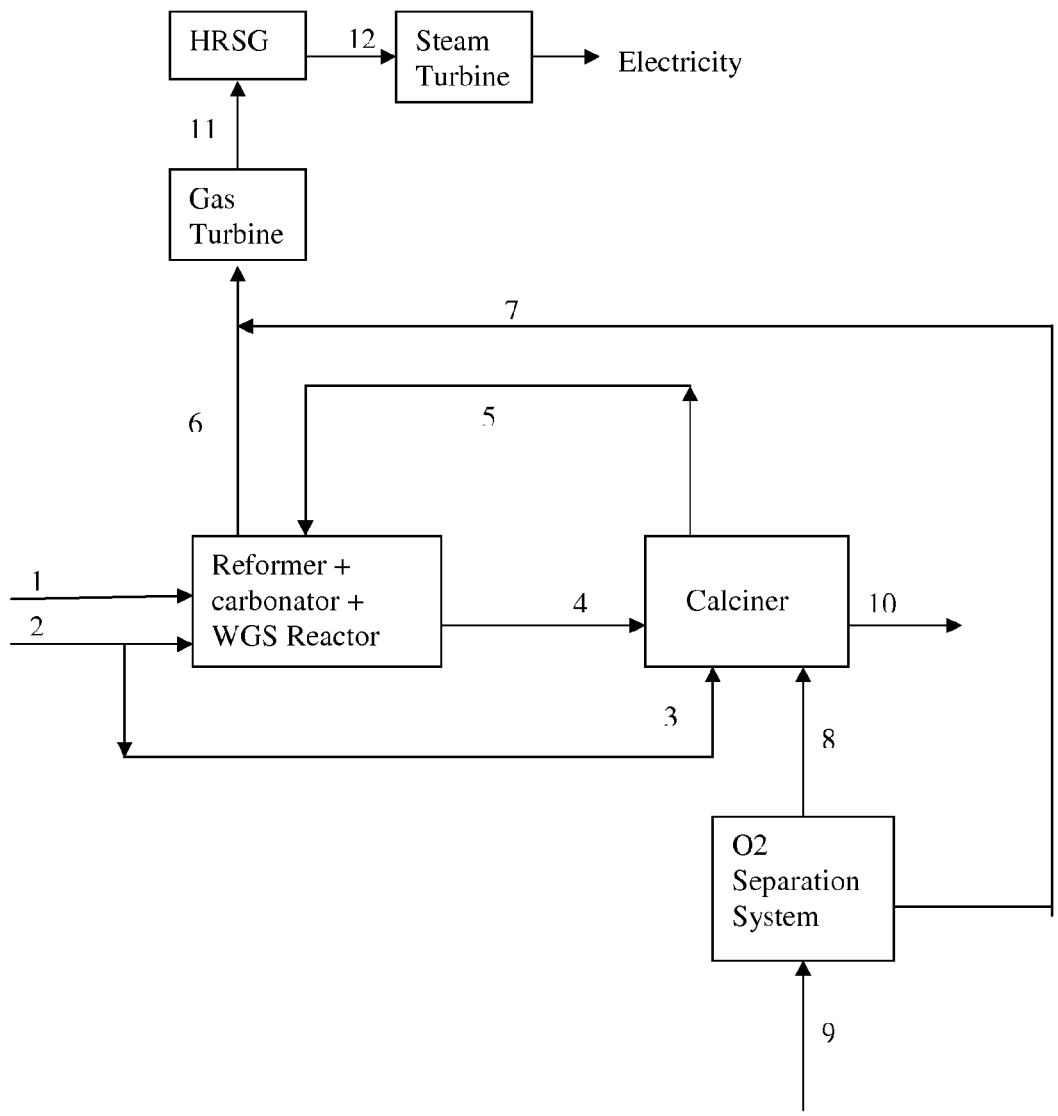
FIG. 47 illustrates the integration of the calcium looping process in an NGCC system for the production of electricity from natural gas.

FIG. 47 illustrates the integration of the calcium looping process in an NGCC system for the production of electricity from natural gas. This is similar to the case shown in FIG. 44 and the hydrogen gas (Stream 6) obtained from the reformer is combusted in a gas turbine to generate electricity. The flue gas (Stream 11) from the gas turbine generates additional energy in a steam turbine.

Figure 48:
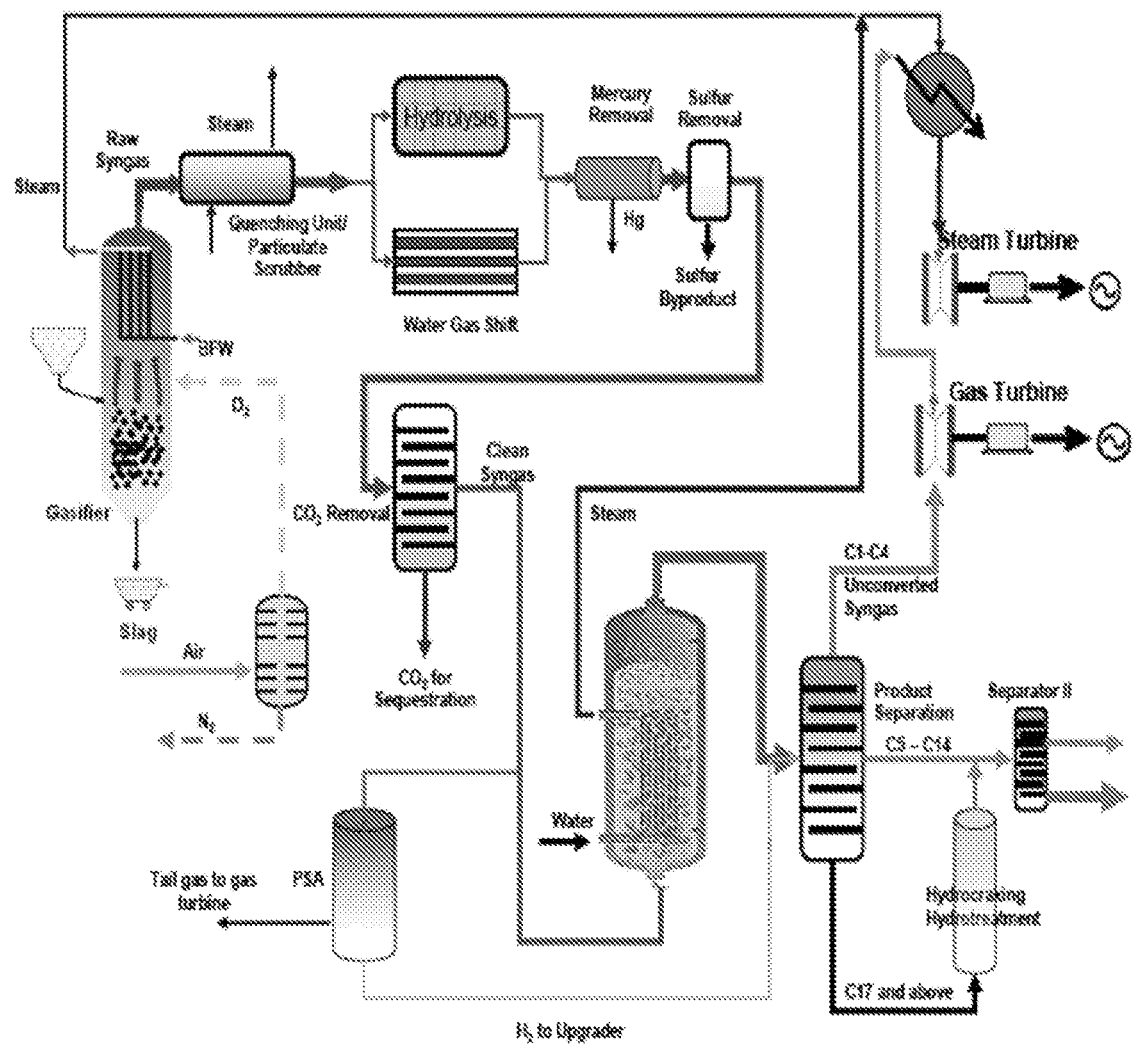
FIG. 48 illustrates the traditional coal to liquids process in which the syngas goes through various gas cleaning units (COS hydrolysis, sulfur capture, CO2 capture) before being sent to the Fisher Tropsch reactor.

FIG. 48 illustrates the traditional coal to liquids process in which the syngas goes through various gas cleaning units (COS hydrolysis, sulfur capture, CO2 capture) before being sent to the Fisher Tropsch reactor. In addition a portion of it is also sent to the water gas shift reactor in increase the H2:CO ratio in the syngas to 2 which is ideal for the Fisher Tropsch reactor. The C1-C4 hydrocarbons as well as unconverted syngas is burnt in turbines and the energy is used to supply the parasitic energy requirement of the process.

Figure 49:
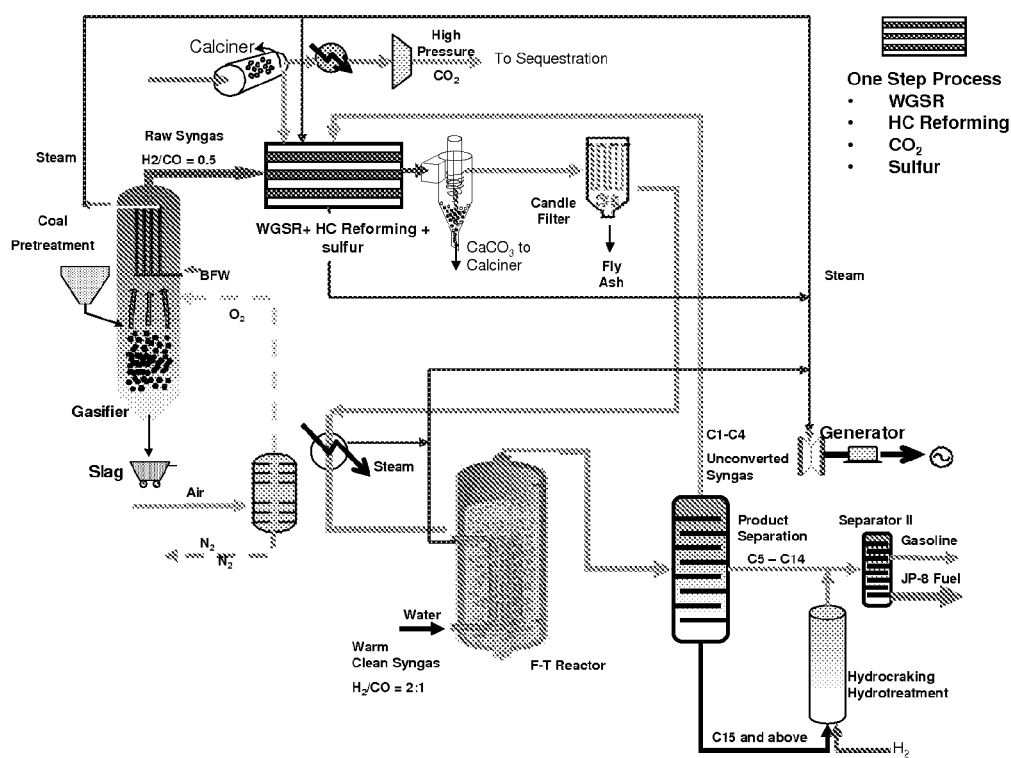
FIG. 49 depicts a method of integration of the calcium looping process in a coal to liquids plant.
Figure 50:
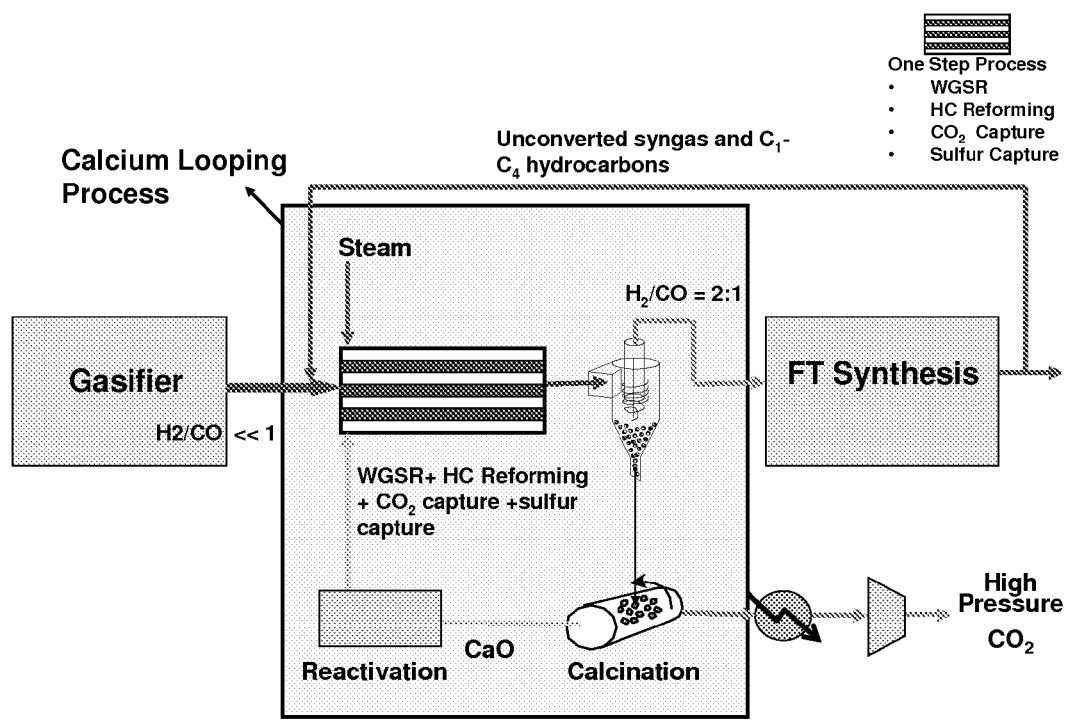
FIG. 50 is a simplified flow diagram of method 1 of integration shown in FIG. 49.
Figure 51:
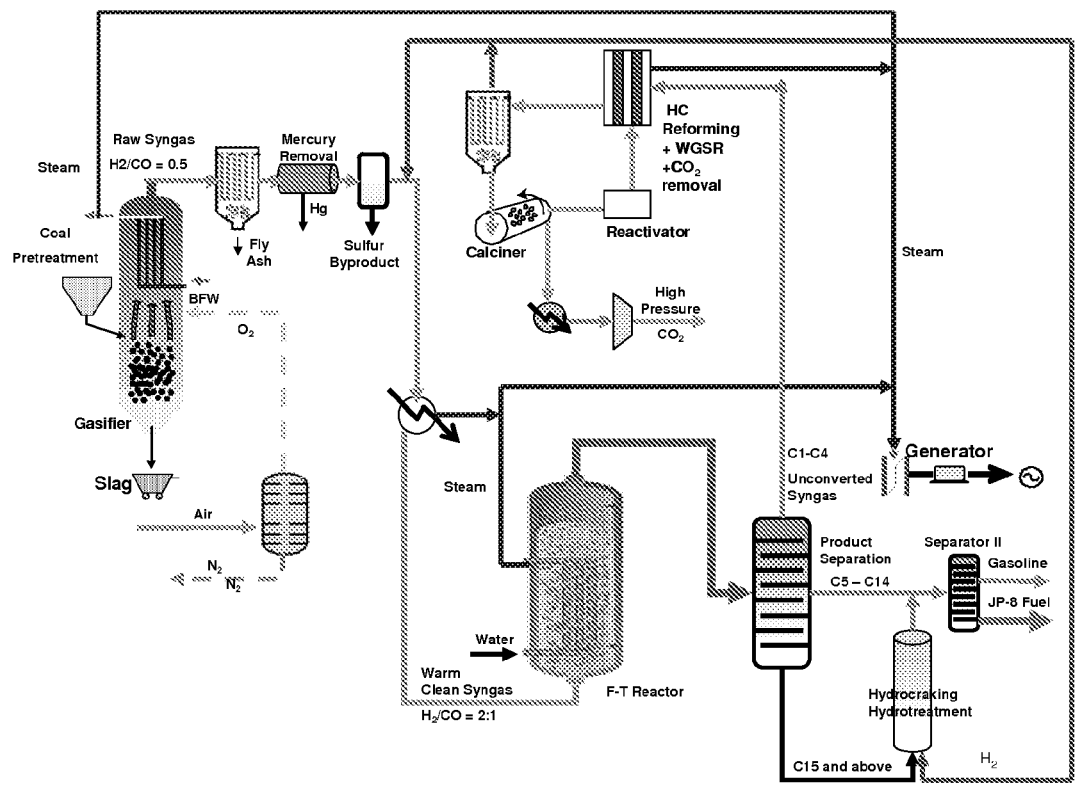
FIG. 51 is a second method of integration of the calcium looping process in a coal to liquids plant.

The number of process units in the tradition liquid fuel plant can be reduced by addition of the calcium looping process. The calcium looping process in addition to achieving gas cleanup, also converts the C1-C4 hydrocarbons and unconverted syngas from the F-T reactor into hydrogen to increase the H2:CO ratio of syngas to 2. Since the FT reactor offgases like C1-C4 hydrocarbons and unconverted syngas are also converted to syngas and used for liquid fuel production, the calcium looping process aids in increasing the yield of liquid fuels. FIGS. 49 and 51 depict two methods of integration of the calcium looping process in a coal to liquids plant. FIG. 50 is a simplified flow diagram of method 1 of integration shown in FIG. 49.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

The invention claimed is:

1. A process for producing hydrogen comprising the steps of:
    gasifying a fuel into a raw synthesis gas comprising CO, hydrogen, steam, sulfur and halide contaminants in the form of $H_2S$, COS, and HX, wherein X is a halide;
    passing the raw synthesis gas through a water gas shift reactor ("WGSR") into which reactivated calcium based sorbent is injected, the reactivated calcium based sorbent being converted to CaO, which reacts with the shifted gas to remove $CO_2$, sulfur and halides in a solid-phase calcium-containing product comprising $CaCO_3$, CaS and $CaX_2$;
    separating the solid-phase calcium-containing product from an enriched gaseous hydrogen product;
    regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof; and
    reactivating the calcined CaO by hydrating it in the presence of at least one of: steam and water.

2. The process of claim 1 wherein:
    the reactivation step is conducted at a temperature at or below the temperature of the water gas shift reactor.

3. The process of claim 1 wherein:
    the reactivation step is conducted at a temperature of 300 to 600 C to improve the efficiency of the hydrogen production process.

4. The process of claim 1 wherein:
    when the temperature of a reactivation unit is in the range from 300° C. to 500° C., the reactivation step is conducted at a pressure of 1 to 3 atm; and
    when the temperature of the reactivation unit is at least 600° C., the reactivation step is conducted at a pressure greater than 4 atm.

5. The process of claim 1 wherein:
    limiting the sorbent fed into the water gas shift reactor to hydrated sorbent, the hydrated sorbent from the reactivation unit is fed to the water gas shift reactor, where the hydrated sorbent dehydrates and captures $CO_2$, and the steam produced from the dehydration of sorbent is used in the water gas shift reaction to produce hydrogen.

6. The process of claim 1 wherein a mixture of hydrated sorbent and steam is injected into the water gas shift reactor.

7. The process of claim 1 wherein the ratio of steam to carbon in the water gas shift reactor is between 1:1 and 3:1.

8. The process of claim 7 wherein the ratio of steam to carbon in the water gas shift reactor is 1:1.

9. The process of claim 8 wherein the pressure of the water gas shift reactor is above 3 atm for production of hydrogen with a purity above 90% and the pressure is above 5 atm for production of hydrogen with a purity of >95%.

10. The process of claim 1, further comprising the step of:
    recycling at least a portion of a product stream from a Fischer-Tropsch ("FT") reactor fed by the WGSR in order to introduce back into the WGSR a chemical species selected from the group consisting of: methane, $C_1$-$C_4$ hydrocarbons, CO, hydrogen and combinations thereof.

11. A process of claim 10 wherein the hydrogen product from the separating step has a $H_2$/CO ratio of at least 2.5:1 with a maximum sulfur ($H_2$S/COS) concentration of less than 10 ppm with only stoichiometric steam requirement.

12. The process of claim 10, wherein a gas clean up unit is used to remove the CO2 and sulfur from the syngas before it enters the FT reactor.

13. The process of claim 1 wherein a catalyst is disposed in the WGSR.

14. The process of claim 13 wherein the catalyst includes a material selected from the group consisting of: Fe, Cu, Co, Mo, W, Cs, Pt, Ph, Pd, oxides thereof, sulfides thereof, and combinations thereof.

15. The process of claim 10 wherein a catalyst is disposed in the WSGR.

16. The process of claim 1 wherein the enriched hydrogen product leaving the WGSR has a purity in the range of from about 70% to about 99.99% H2, a temperature in the range of from about 400 to about 1000 C, and a pressure in the range of from about 1 to about 100 atmosphere.

17. The process of claim 1 wherein the CaO has a sorption capacity of at least 30 grams of $CO_2$ per kilogram of CaO for 5 cycles and higher.

18. The process of claim 1 wherein up to 12% of the sorbent circulating in the process is purged and an equivalent amount of fresh sorbent is added to the calciner.

19. The process of claim 1 wherein the energy of calcination is provided indirectly by the combustion of a fuel with air or directly by the combustion of a fuel with oxygen.

20. The process of claim 19 wherein the fuel could be syngas, natural gas, coal, biomass and other hydrocarbons.

21. The process of claim 20 wherein the enriched hydrogen product leaving the WGSR has a purity in the range of from about 70% to about 99.99% H2, a temperature in the range of from about 400 to about 1000 C, and a pressure in the range of from about 1 to about 100 atmosphere.

22. The process of claim 1 wherein the exothermic energy produced in the water gas shift reactor and a sorbent reactivation unit is used for the production of steam or electricity.

23. The process of claim 1 wherein the exothermic energy released in a reactivation unit is used to heat the solids to the temperature of the water gas shift reactor.

24. The process of claim 1 wherein a Pressure Swing Adsorber (PSA) is used to further purify the hydrogen to 99.99% purity.

25. The process of claim 24 wherein the tail gas from the PSA is combusted in the calciner to provide the energy of calcination.

26. The process of claim 1 wherein the $CO_2$ produced from the calciner has a purity of >90%.

27. The process of claim 26, wherein the gas phase product from the calciner contains some trace amounts of $H_2S$.

28. The process of claim 1 wherein the calcined sorbent from the calciner (>800 C) is contacted with water and the sorbent simultaneously cools and gets hydrated in a reactivation unit.

29. The process of claim 1 wherein the calcined sorbent is cooled to the temperature of the hydrator (<600 C) and contacted with steam in a reactivation unit.

30. The process of claim 29 wherein the energy obtained from cooling the calcined sorbent is used to preheat the hydrated sorbent to the temperature of the water gas shift reactor at the exit of a reactivation unit.

31. A process of claim 1 wherein the hydrogen product from the separating step has a purity of at least 90% $H_2$ with a maximum sulfur ($H_2S$/COS) concentration of less than 10 ppm with three times the stoichiometric steam requirement.

32. A process of claim 1 wherein the hydrogen product from the separating step has a purity of at least 70% $H_2$ with a maximum sulfur ($H_2S$/COS) concentration of less than 1 ppm with only stoichiometric steam requirement.

33. The process of claim 1, wherein the water gas shift reactor is of a type selected from the group consisting of: fluidized bed reactors, entrained flow reactors, moving bed reactors.

34. The process of claim 1 wherein the calciner is of a type selected from the group consisting of: fluidized bed reactors, entrained flow reactors and rotary kilns.

35. The process of claim 1 wherein the hydrator is of a type selected from the group consisting of: fluidized bed reactors, and entrained bed reactors.

36. The process of claim 1, wherein the CaO is provided in a form selected from the group consisting of: pellets, granules, fines, and monoliths or combinations thereof.

37. The process of claim 1, wherein the CaO is obtained by processing chicken eggshells.

38. The process of claim 1 which can produce hydrogen enriched gas mixtures for applications comprising power production from gas turbines, hydrogen for fuel cell, syngas for liquid fuels synthesis and for chemical synthesis.

* * * * *